(12) United States Patent
Garrett

(10) Patent No.: US 6,745,869 B2
(45) Date of Patent: Jun. 8, 2004

(54) ROOFMATES TM ROOFING ACCESSORIES

(75) Inventor: Robert Garrett, Severn, MD (US)

(73) Assignee: Roofmates, Incorporated, Severn, MD (US)

(*) Notice: Subject to any disclaimer, the term of this patent is extended or adjusted under 35 U.S.C. 154(b) by 0 days.

(21) Appl. No.: 10/050,964

(22) Filed: Jan. 22, 2002

(65) Prior Publication Data

US 2002/0096395 A1 Jul. 25, 2002

Related U.S. Application Data

(60) Provisional application No. 60/262,650, filed on Jan. 22, 2001, provisional application No. 60/286,527, filed on Apr. 27, 2001, provisional application No. 60/297,530, filed on Jun. 13, 2001, and provisional application No. 60/304,098, filed on Jul. 11, 2001.

(51) Int. Cl.⁷ ................................................. E04G 3/12
(52) U.S. Cl. ..................................................... 182/45
(58) Field of Search ........................ 182/45, 107, 108, 182/129, 150, 214; 248/148, 237, 210, 211, 230.4, 231.51; 52/749.12, 749.1, 127.5

(56) References Cited

U.S. PATENT DOCUMENTS

| | | | | |
|---|---|---|---|---|
| 960,565 A | * | 6/1910 | Levander | 182/45 X |
| 1,127,173 A | * | 2/1915 | Boyd | 182/45 X |
| 1,267,056 A | * | 5/1918 | Chappius | 182/45 X |
| 2,549,638 A | * | 4/1951 | Rogghe | 182/45 X |
| 4,074,792 A | | 2/1978 | Zaugg et al. | 182/150 |
| 4,398,620 A | | 8/1983 | Townsend | 182/45 |
| 4,412,599 A | | 11/1983 | McCrudden et al. | 182/201 |
| 4,450,935 A | | 5/1984 | Gustavus | 182/45 |
| 4,957,185 A | | 9/1990 | Courchesne et al. | 182/150 |
| 5,249,397 A | | 10/1993 | Monaco | 52/126.1 |
| 5,320,194 A | | 6/1994 | Bredjik | 182/45 |
| 5,379,859 A | | 1/1995 | Pigman | 182/45 |
| 5,474,271 A | * | 12/1995 | Raymond | 182/45 X |
| 5,601,154 A | | 2/1997 | Eisenmneger | 182/45 |
| 5,624,006 A | | 4/1997 | Richardson, Jr. | 182/45 |
| 5,664,391 A | | 9/1997 | Bartholomew | 57/714 |
| 5,862,880 A | | 1/1999 | Nelson et al. | 182/45 |
| 5,979,600 A | | 11/1999 | Bitner | 182/45 |
| 6,167,987 B1 | | 1/2001 | Jensen | 182/45 |
| 6,170,222 B1 | | 1/2001 | Miller | 57/749.12 |
| 6,220,390 B1 | * | 4/2001 | Pike | 182/45 |
| 6,269,905 B1 | * | 8/2001 | Smith | 182/45 |
| 6,490,842 B2 | * | 12/2002 | Emmons | 182/45 X |

FOREIGN PATENT DOCUMENTS

FR 2593542 * 1/1986 ............. 182/108

OTHER PUBLICATIONS

Roofmates™ brochure (undated) Circa 2001, Feb. 2001.
ABC Supply Co. Inc. Spring 2002 Catalog.

* cited by examiner

*Primary Examiner*—Hugh B. Thompson, II
(74) *Attorney, Agent, or Firm*—Robert Platt Bell

(57) ABSTRACT

A number of roofing accessories, including a lightweight adjustable ladder and scaffold support are disclosed. The scaffold support is provided with a pair of rails spaced the standard spacing of most roof joists. Connected to the rails through suitable holes and slots, are rods supporting an adjustable platform. One of the rods may be placed through a corresponding slot to achieve a suitable angle of adjustment corresponding to roof incline. An apparatus is also provided for supporting loads of materials or supplies on an inclined roof, using components and parts in common with the scaffold support, or components and parts similar thereto. A tool tray is provided which may be backed with a layer of foam to prevent the tray from slipping off the roof, while allowing the tray to be freely moved along and up and down the roof, as work progresses.

1 Claim, 90 Drawing Sheets

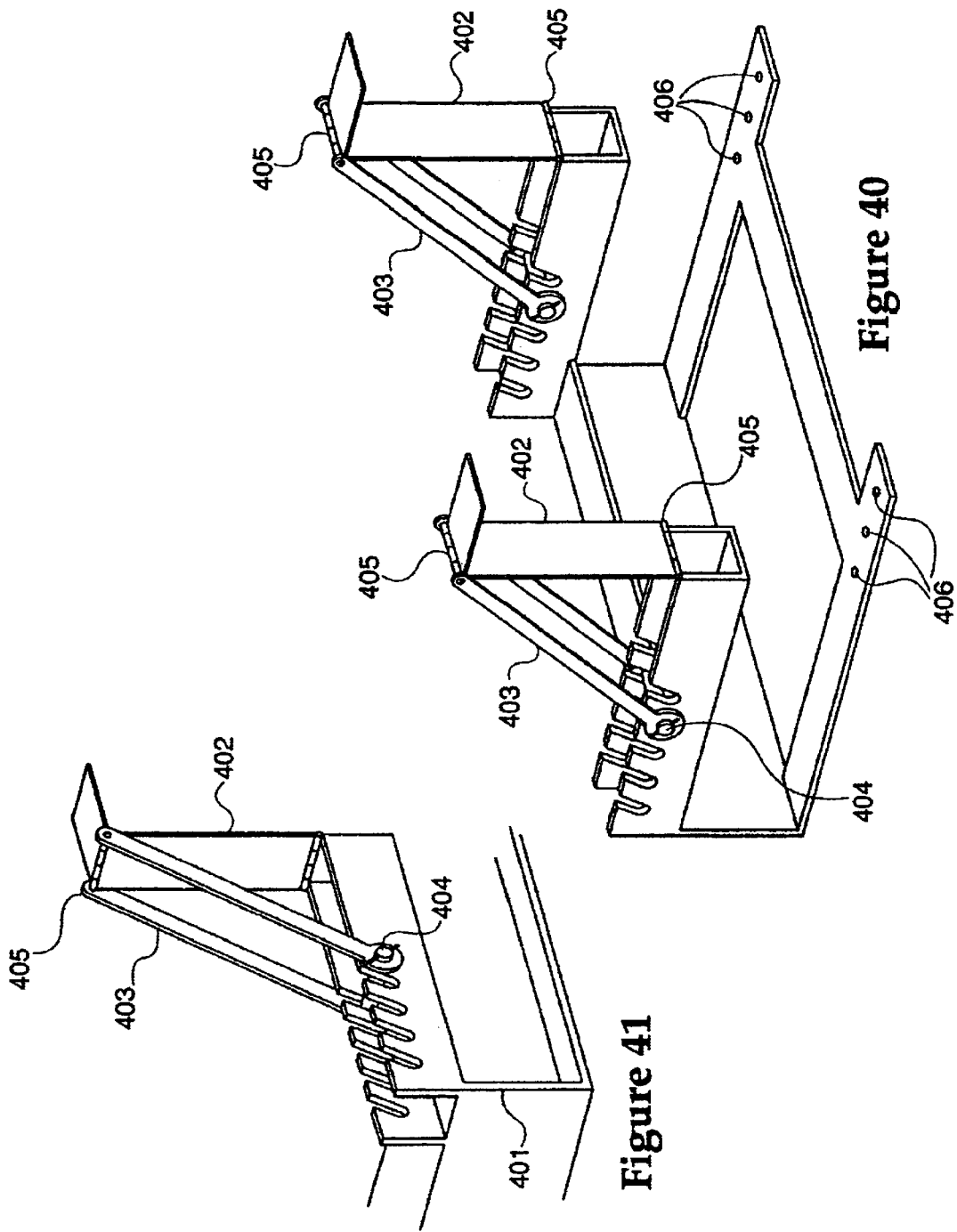

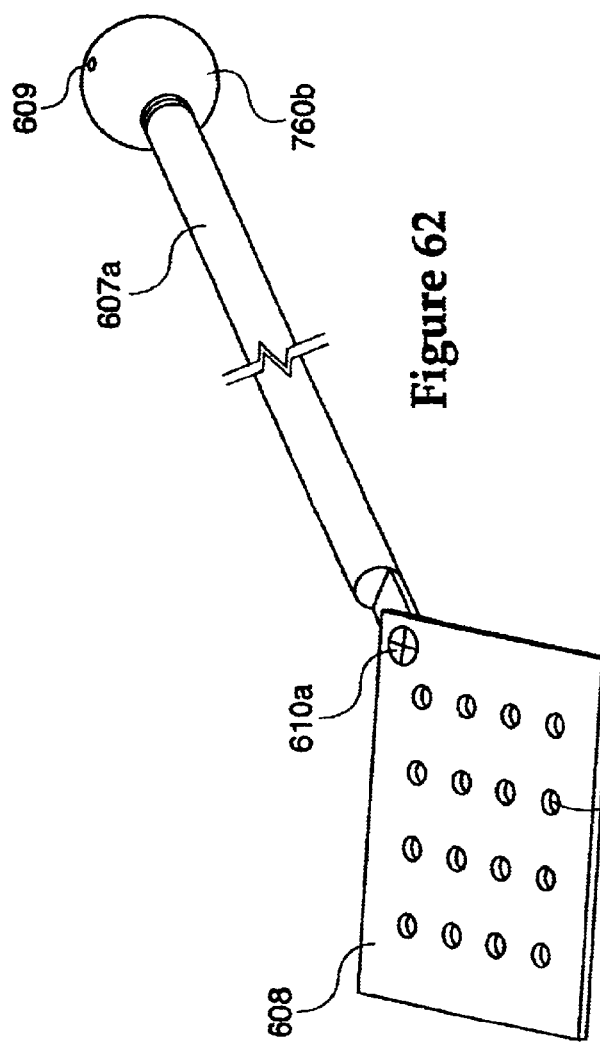
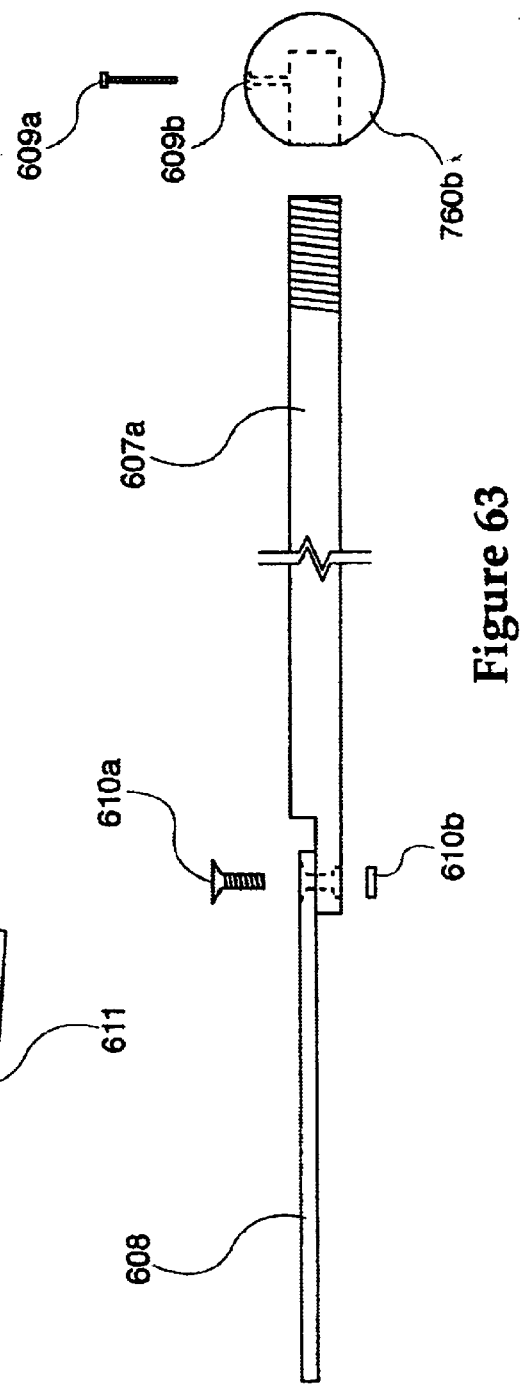

ROOFMATES TM ROOFING ACCESSORIES

CROSS-REFERENCE TO RELATED APPLICATIONS

The present application claims priority from Provisional U.S. Patent Application No. 60/262,650, filed on Jan. 22, 2001, and incorporated herein by reference.

The present application claims priority from Provisional U.S. Patent Application No. 60/286,527, filed on Apr. 27, 2001, and incorporated herein by reference.

The present application claims priority from Provisional U.S. Patent Application No. 60/297,530, filed on Jun. 13, 2001, and incorporated herein by reference.

The present application claims priority from Provisional U.S. Patent Application No. 60/304,098, filed on Jul. 11, 2001, and incorporated herein by reference.

FIELD OF THE INVENTION

The present invention relates to the field of residential and commercial roofing. In particular, the present invention relates to a number of scaffolds, platforms, tools, and accessories for use in pitched roof construction as well as an apparatus for securing ladders and other devices to a ladder rack, luggage rack, or other type of vehicle accessory rack.

BACKGROUND OF THE INVENTION

Safety in pitched roof construction has been an ever increasing concern. An alarming number of construction site accidents are due to falls from pitched roofs by workmen, or injuries sustained by workmen when roofing materials (shingles, felt, nails, flashing, compounds, sealants, and the like) or tools (hammer, nail guns, water jugs, and the like) fall from a roof onto workers or passersby below.

One of the basic difficulties in roof work is transporting the materials up to the roof and storing them there until needed. Typically, roofers will load most, if not all, of the roofing materials onto the roof surface before beginning work. In the past, this may have been accomplished by the use of ladder elevators (e.g., laddervator). However, in new home and large scale construction, a crane or large forklift may be used to transfer entire pallets of roofing material to the roof level upon delivery. Thus, large quantities of shingles, tiles, slates, or the like, may need to be stored on the roof prior to installation.

In some recorded instances, entire pallets or "squares" of roofing materials (e.g., shingles) have fallen off pitched roofs onto the ground below. If a fellow workman or passerby is below when such a large amount of material falls, serious injury or even death can occur. In addition, although probably less hazardous, workers and passersby below are also in danger of serious injury from falling tools, hammers, and smaller amounts of roofing materials and the like. As a result of such accidents, residential as well as commercial roofers are finding increased scrutiny from insurance companies and government agencies (e.g., OSHA).

In addition to such obvious safety concerns, government agencies and insurance companies are seeing more claims of injuries due to repetitive stress disorders (e.g., carpal tunnel syndrome). In the roofing industry, such stresses can occur as a roofer may be forced to reach in one extreme direction (e.g., downward to a scaffold walkboard) to retrieve shingles, tools, or nails, and then reach in another extreme direction (e.g. upward) to secure the shingle to the roof.

In addition to causing stress on the body, such a work environment is inefficient, as such long reaches increase the time needed to install shingles and more readily fatigue the roofer. Moreover, extended reaches may put the roofer at increase risk of falling due to loss of balance and the like. Roofing materials and tools may be more likely to fall off a roof if a roofer has to stretch to reach them.

In the Prior Art, primitive techniques have been used in an attempt to secure materials and persons on a roof. For example, a short length of 2" by 4" wood may be nailed to a roof to provide temporary support for a ladder, materials, or a roofer. Such a primitive technique, commonly used, provides very little purchase for the roofer or materials to rest upon. In addition, it may take time at the jobsite for the roofer to secure such scrap lumber, cut it to size, measure for nail spacing, and install.

A number of Patents have been issued which describe various apparatus in the Prior Art for correcting the deficiencies noted above. However, most, if not all, of these attempts have failed in one or more ways, and none of these patented invention appear to have been commercially successful or readily available in the marketplace. Most of these schemes utilize unnecessarily complicated apparatus, which is too costly for the average roofer to afford, to heavy to lift to the jobsite, and to cumbersome to work with.

For example, Eisenmenger, U.S. Pat. No. 5,601,154, issued Feb. 11, 1997, discloses a portable suspended roof scaffold system. Eisenmenger uses a specialized apparatus (See FIGS. 1, 3, and 4) to secure a ladder to a roof. Once the ladder is secured, an adjustable platform (See FIG. 7) may be secured to the ladder to support a walkboard or the like. The problem with the Eisenmenger system is that it requires that a ladder with specialized fittings first be hauled up to the roof and secured before the platform can be installed.

Moreover, the ladder, once secured, covers a substantial portion of the roof being worked on. Since shingles are generally installed in horizontal rows, the ladder of Eisenmenger necessarily covers a portion of each row at all times (See, FIG. 20). The roofer must either move the entire apparatus or try to install shingles underneath the ladder. In addition, the apparatus, by requiring the use of a ladder, ties up one of the roofer's ladders at the jobsite. As a result, the roofer must purchase a separate ladder for such a purpose, or do without a ladder at another location on the site.

Bitner, U.S. Pat. No. 5,979,600, issued Nov. 9, 1999, discloses a leveling roof platform support. The Bitner device is an improvement over using a nailed-in 2" by 4" and much less complex than the Eisenmenger device. However, it appears that Bitner is limited to a device for supporting a walk-board or plank, and does not explicitly provide support for ladders, tools, supplies, or roofing materials. In addition, the Bitner device utilizes a fairly complex and expensive screw-jack leveling system to provide infinite adjustment of angle. While the screw-jack system may provide more levels of adjustment, it does so at the expense of added cost and complexity. Moreover, the screw-jack of Bitner does not appear to be sufficient to support large loads (e.g., square of shingles). No method of locking the screw jack into place appears to be present.

Thus, it remains a requirement in the art to provide a simple, flexible, lightweight, safe, and inexpensive system for supporting persons, ladders, roofing supplies, shingles, tools, and accessories on an inclined roof without covering up large portions of the roof with such a device.

Miller, U.S. Pat. No. 6,170,222, issued Jan. 9, 2001, discloses a foam rubber wedge pad for placing shingles on a roof. As the pad is made entirely of foam rubber, it may be difficult to grip (no handles). Moreover, the foam pad does not provide storage for small items such as nails or tools.

In addition to the above problems in the Prior Art, injuries have occurred when ladders and scaffolding set up for roof and other work are not properly secured and as a result, fall down. OSHA requires that ladders be "tied-off" prior to work commencing. However, oftentimes a convenient and easy way to tie off a ladder (e.g., to a gutter) is not present, particularly with regard to roofing work.

Thus, it remains a further requirement in the art to provide a safe, easy, convenient, and inexpensive way to allow ladders and scaffolds to be readily attached to a housing or other structure prior to work commencing.

In addition, safety in transporting roofing and construction ladders, as well as other items is also important. An aluminum ladder flying off a construction truck can cause great bodily injury or even death on a crowded superhighway. Such dangers pose huge liabilities for construction companies which may be ultimately responsible for the actions of their employees.

Moreover, securing any load to a vehicle present safety problems. Most commercial over-the road truckers have rather elaborate straps and chains to secure loads. However contractors and homeowners have relied upon straps, ropes and even strings, to secure loads to their vehicles, with limited success and sometimes disastrous results.

Many contractors will leave ladders entirely unsecured on ladder racks, or use only a token string or rope to secure them. In addition to being unsafe, ropes and strings are difficult to tie and untie. Straps (since or ratchet) are one solution, however, they are generally provided with large rubber hooks which may slip on a ladder or luggage rack or may be difficult to secure.

Homeowners may attempt to use luggage racks supplied with their vehicles, or commercially available racks, such as the THULE® or YAKIMA® racks to secure objects to their vehicles. However, the YAKIMA® and THULE® racks may be highly specialized in their purposes and thus require an enormous amount of accessories in order to secure various items. Moreover, accessories for one rack (e.g., YAKIMA®, which uses round tubing) may not fit another rack (e.g., THULE®, which uses square tubing). Luggage racks supplied with cars generally are of little use and provide few or no places for tie-downs or the like.

When installing roofing materials, it is often necessary to cut shingles either before installation, or in situ. For example, when building a roof "Valley", shingles may be installed over the valley, and then later cut to the valley "V" shape. Traditionally, a knife has been used for such cuts. However, there is little precision in depth of cut with a knife, and in addition, such a cut can be laborious and difficult. Too deep a cut may create roof leaks.

Power tools are generally not well suited to cutting shingles. Most are heavy and require electrical power. In addition, large power tools present a hazard to workers below if they fall off the roof. What is needed is a small powered tool which can cut shingles accurately and cleanly.

SUMMARY OF THE INVENTION

The present invention comprises a number of embodiments of apparatus for use in working on an inclined roofing surface, for supporting persons, ladders, scaffolding, tools, roofing materials, shingles, supplies, and accessories. All of the embodiments of the present invention may be marketed under the umbrella name of ROOFMATES™, a trademark of the inventor.

In one embodiment, a lightweight adjustable ladder and scaffold support is provided which may be marketed under the name GABLEMASTER™, a trademark of the inventor. A pair of rails are provided, spaced approximately 24 inches apart, the standard spacing of most roof joists. Connected to the rails through suitable holes and slots, are rods supporting an adjustable platform. One of the rods may be placed through a corresponding slot to achieve a suitable angle of adjustment corresponding to roof incline.

The platform may be provided with a number of aluminum beams drilled with suitable holes, spaced apart and shaped so as to accept the leg of a standard extension ladder or siding jack. Bolts or pins may be passed through the holes to secure the ladder or jack to the platform. In addition, the platform may support a walking board, scaffold, or the like.

In another embodiment of the present invention, an apparatus is provided for supporting loads of materials or supplies on an inclined roof. The apparatus of this embodiment of the present invention may use components and parts in common with other embodiments of the present invention, or components and parts similar thereto.

In this embodiment, a lightweight adjustable material and supply support is provided which may be marketed under the name ROOFSTOCKER™, a trademark of the inventor. A pair (or more) rails are provided, adjustably spaced to fit the standard spacing of most roof joists. Connected to the rails through suitable holes and slots, are rods supporting an adjustable platform. One of the rods may be placed through a corresponding slot to achieve a suitable angle of adjustment corresponding to roof incline.

The platform may be provided as a planar table, with one or more edge rails to prevent materials from falling off the platform. The platform may be sized to accommodate a standard package size of shingles or a shingle "square". Roofing materials stored on a roof may be stored on the platform in a level manner and thus reduce the likelihood that such materials will fall off. Smaller versions of the platform may be provided for holding tools and the like, and specialized version may be provided for specific applications such as holding a 5-gallon IGLOO™ water cooler.

In such a specialized version, the apparatus may be mounted to a plate which is backed with a one-inch layer of foam. The foam may grip the uneven roof surface sufficiently that no nailing, or only a safety nail is required, allowing the unit to be moved freely along the roof.

In another embodiment of ROOFSTOCKER™, two channels having U-shaped cross-sections may be provided, each with an adjustable support pole. Connected to the support poles though a pivot joint is an adjustable platform which has its other end hinged to the channels. The support or poles may be adjusted to achieve a suitable angle of adjustment corresponding to roof incline.

In another embodiment of ROOFSTOCKER™, a U-shaped backing plate is provided with a one or more adjustable support poles. Connected to the support pole though a pivot joint is an adjustable platform which has its other end hinged to the backing plate. The support pole (or poles) may be adjusted to achieve a suitable angle of adjustment corresponding to roof incline.

In another embodiment of the present invention, which may be marketed under the name ROOFER'S TOOLBOX™, a trademark of the inventor, a tool tray is provided which may be backed with a layer of foam to prevent the tray from slipping off the roof, while allowing the tray to be freely moved along and up and down the roof, as work progresses.

The tool tray may comprise a flat lower portion backed with a layer of medium density expanded polyurethane foam, the type commonly sold for upholstery in upholstery and fabric shops. A number of compartments may be provided in the tray for holding nails, shingles, tubes of roofing compound, tools, and the like. A specialized version may be provided for slate work and marketed under the name SLATEMATES™, a trademark of the present inventor.

In yet another embodiment of the present invention, an apparatus is provided to allow ladders and scaffolds to be readily attached to a structure or the like. A clamp is provided which may be bolted to a ladder leg or the like. A rotatable arm is provided attached to the clamp at one end and having a nailing plate attached at the other. In use, the device may be clamped to the ladder leg without any need for drilling or otherwise altering the ladder structure. The other end may be nailed or screw-gunned into a joist, truss, beam, or other structural surface to secure the ladder. The apparatus may have particular use when ladders are used on roofs and uneven or inclined surfaces are present.

In addition, the present invention provides a number of different embodiments of tools, accessories, tie-offs, and braces for use in roofing. In another embodiment, a tie-off called SURE-TETHER™ is provided to allow roofers to secure safety harnesses and ropes.

In another embodiment of the present invention, called SURE-FOOTS™, an apparatus is provided to allow ladders and scaffolds to be readily attached to a structure or the like. A clamp is provided which may be bolted to a ladder leg or the like. A rotatable arm is provided attached to the clamp at one end and having a nailing plate attached at the other. In use, the device may be clamped to the ladder leg without any need for drilling or otherwise altering the ladder structure. The other end may be nailed or screw-gunned into a joist, truss, beam, or other structural surface to secure the ladder. The apparatus may have particular use when ladders are used on roofs and uneven or inclined surfaces are present.

In another embodiment of the present invention, a lightweight adjustable ladder and scaffold support is provided which may be marketed under the name GABLEMASTER™, a trademark of the inventor. A pair of rails are provided, spaced approximately 24 inches apart (or adjustably spaced) to fit the standard spacing of most roof joists. Connected to the rails through suitable holes and slots, are rods supporting an adjustable platform. One of the rods may be placed through a corresponding slot to achieve a suitable angle of adjustment corresponding to roof incline.

The platform may be provided with a number of aluminum beams drilled with suitable holes, spaced apart and shaped so as to accept the leg of a standard extension ladder or siding jack. Bolts or pins may be passed through the holes to secure the ladder or jack to the platform. In addition, the platform may support a walking board, scaffold, or the like.

In another embodiment of the present invention, a bracket for holding a ladder on a sloped roof is provided. Ladder legs may be locked into the bracket using pins, bolts, or the like, such that the ladder will not fall off the sloped roof. This invention has particular application when a roofer needs to climb an existing roof to the peak when no safety rope, guide wire, scaffolding, or ladder is in place. The bracket may be nailed to the roof, a ladder slid up the roof and the bottom of the ladder secured to the ladder bracket.

In another embodiment of the present invention, a jack post roof rack holder is provided as a variation on one invention set forth in related Provisional U.S. Patent Application No. 60/297,530 filed on Jun. 13, 2001. In this embodiment of the present invention, a clamp is provided which may be mounted to a truck ladder rack, car luggage rack, or the like. The clamp may be lined with compressible foam rubber so as to securely grip various rack channel cross-sections without slipping. The use of the foam rubber allows the apparatus to be made for a number of different rack styles.

In another embodiment of this invention, a clamp is provided which may be mounted to a truck ladder rack, car luggage rack, or the like. The clamp may be lined with compressible foam rubber so as to securely grip various rack channel cross-sections without slipping. The use of the foam rubber allows the apparatus to be made for a number of different rack styles.

A draw-tight or ratchet strap may be mounted to the clamp to secure a ladder or other object to the roof rack. Hooks for the strap may thus not be required. In addition, the strap may be locked to prevent loosening of the strap or petty theft or borrowing of the objects secured to the strap.

In an alternative embodiment of the ladder brace set forth in Provisional U.S. Patent Application No. 60/262, 650 filed on Jan. 22, 2001, and Provisional U.S. Patent Application No. 60/286,527 filed on Apr. 27, 2001, a version of the SUREFOOT™ invention is provided with a threaded leg portion.

In an alternative embodiment of one invention set forth in related Provisional U.S. Patent Application No. 60/286,527 filed on Apr. 27, 2001, a tie-off called Sure-Tether is provided to allow roofers to secure safety harnesses and ropes.

In an alternative embodiment of one invention set forth in related Provisional U.S. Patent Application No. 60/297,530 filed on Jun. 13, 2001, the ladder rack apparatus is adapted for use in securing ladders to houses and the like.

In yet another alternative embodiment of one invention set forth in repled Provisional U.S. Patent Application No. 60/297,530 filed on Jun. 13, 2001, a lightweight adjustable scaffold board support is provided. In this variation, a single channel having U-shaped cross-section may be provided, each with an adjustable support pole. Connected to the support pole though a pivot joint is an adjustable support channel which has its other end hinged to single channel. The support pole may be adjusted to achieve a suitable angle of adjustment corresponding to roof incline. A number of these devices may be used to support a scaffold board on a roof by means of a scaffold securing clip.

Another embodiment of the present invention, SHINGLESAW™, comprises a pneumatically powered miniaturized reciprocating saw designed especially for roofing applications. In an alternative embodiment, SHINGLESAW™ may be powered by rechargeable battery packs or the like. SHINGLESAW™ is the size and shape of a Prior Art razor knife, but is powered and provided with a depth gauge to prevent cutting through roofing underlayment or the like.

In another embodiment known as SHINGLESTOCKER™, a small, lightweight movable wedge is provided with a foam backing. When wedged under a shingle or nailed to a roof, the SHINGLESTOCKER™ can be used to prevent bundles of shingles from falling off roofs.

In another embodiment of the SURETETHER™ an adjustable strap is provided which may be used to tie-off safety harnesses used by roofers. The straps are lightweight and inexpensive to use.

BRIEF DESCRIPTION OF THE DRAWINGS

FIG. 40 is a perspective view of the SHINGLESTOCKER™ of the present invention.

FIG. 41 is another perspective view of the SHINGLESTOCKER™ of the present invention from the opposite side of FIG. 40.

FIG. 56 is a perspective view of one version of the SUREFOOT™ embodiment of the present invention shown attached to a ladder, secured to a nailing plate via a bungee chord, cable, or the like.

FIG. 57 is a perspective view of one version of the SUREFOOT™ embodiment of the present invention shown attached to a ladder, secured to a beam using a pressure clamp and a bungee chord, cable or the like.

FIG. 58 is a perspective view of another version of the SUREFOOT™ embodiment of the present invention illustrating the swivel clip for use with a bungee, cable, or the like.

FIG. 62 is a perspective view of another version of the SUREFOOT™ embodiment of the present invention, illustrating the pivot shaft and nailing plate.

FIG. 63 is a side view of another version of the SUREFOOT™ embodiment of the present invention, illustrating the pivot shaft and nailing plate.

FIG. 90 is a perspective view of the SURETETHER™ embodiment of the present invention for walls and the like.

FIG. 92 is a top plan view of the SURETETHER™ embodiment of the present invention for use on walls and the like.

FIG. 101 is a perspective view of another the "soft" version of the SURETETHER™ of FIG. 100 illustrating how safety straps may be clipped on.

DETAILED DESCRIPTION OF THE INVENTION

GABLEMASTER™ is an adjustable, lightweight, fully assembled aluminum platform which easily secures to roof truss layouts of two feet, 18 inches, and 16 inches (or other widths) on center and adjusts from 4/12 to 12/12 or other pitches. The GABLEMASTER™ eliminates makeshift devices or rental lifts because it easily installs on any pitched roof where extension ladders or pump jack poles are needed to set up scaffolding systems.

GABLEMASTER™ provides a level surface that secures ladders with adjustable steel bolts or pins. The product is ensured to provide safety for the user. The standard dimensions for this produce are 30" in length and 54" width, although other dimensional versions are permissible within the spirit and scope of the present invention. The GABLEMASTER™ invention will now be described in connection with FIGS. 1–11.

Figure 1:
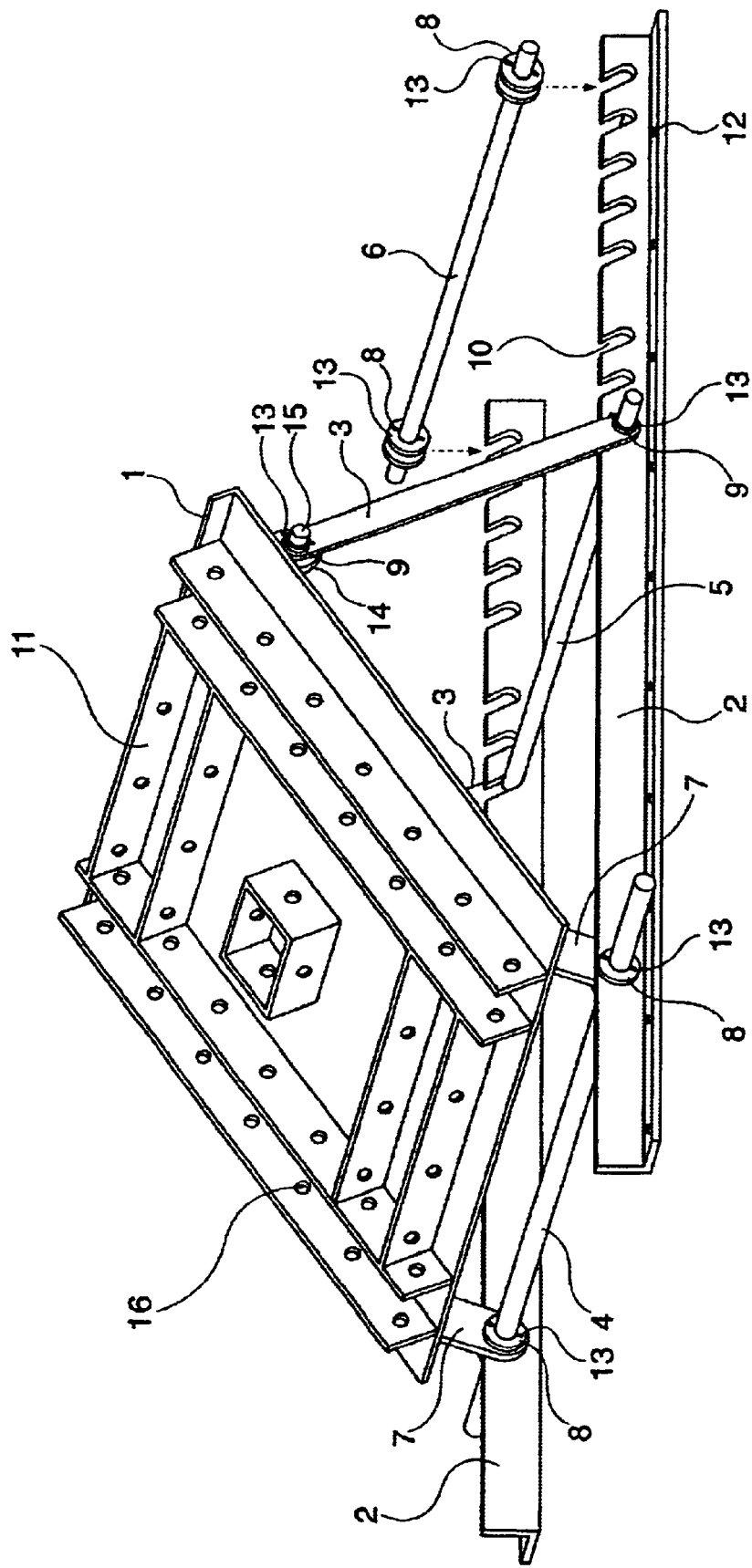
FIG. 1 is a perspective view of the ladder and scaffold support of the first embodiment of the present invention.

FIG. 1 is a perspective view of the ladder and scaffold support of the first embodiment of the present invention. Main support table 1 for the unit may support a ladder, siding jack, walking board, or the like and may be constructed from aluminum sheet of approximately ¼ inch in thickness. Support adjustment plates 11 may be provided from aluminum angle stock or flat plate welded to support table 1. In the alternative, support table 1 and adjustment plates 11 may be constructed from a single piece of cast aluminum.

Materials other than aluminum may be used, of course. However, for high strength and low weight, the inventor has found aluminum construction to work well. The apparatus of the present invention could be conceivably made of other metals (e.g., steel) or even from plastics or composites (e.g., fiberglass and/or carbon fiber construction) without departing from the spirit and scope of the present invention.

Pre-drilled holes 16 may be provided in support adjustment plates 11 at predetermined locations to secure a ladder leg, siding jack, or the like, as will be discussed below in connection with FIG. 5.

Main support bars 2 may be fabricated from aluminum channel and are designed to be fastened to a roof truss on 24" centers. Although not illustrated here, an additional support bar 2 may be provided in a slidable fashion on connecting rods 4 and 5. Such an additional support bar or bars may be used to secure the device to roof trusses which are not on 24" centers (e.g., 12" or 16" centers). Main support bars 2 may be secured to roof trusses by nailing or screwing through pre-drilled holes 12. If nails are used, double-headed nails are preferred, as they may be readily removed without damaging or marring the roof surface.

Typically, four to eight double-headed nails may be used to secure main support bars 2 to a roof truss. Eight or more pre-drilled nail holes may be provided in each of main support bars 2 in the preferred embodiment.

A plurality of grooves or notches 10 may be cut into support bars 2 to allow angle adjustment of main support table 1 to compensate for different roof pitches. Connecting rod 5 may be adjusted to a corresponding one of the notches 10 to provide correct support to main support table 1 via support bars 3. Support bars 3 may in turn be connected to main support table 1 via rod pin 15 and plate 14 in a pivoting fashion. Connecting rod 4 may rotate within the holes provided in main support bars 2 and rotatably support platform 1 via plates 7 to allow for rotation with angle adjustment.

Connecting rod 5 may be provided with spacers 9 and carter pins 13 to lock spacers 9 in place. Spacers 9 may provide proper alignment between connecting rod 5 and main support bars 2 to provide correct spacing for 24" (or the like) roof truss centers. In an alternative embodiment, multiple spacers or spacer positions may be provided to allow the apparatus to adjust to different roof truss spacings.

An additional connecting rod may be provided as safety rod 6, also provided with carter pins 13 and spacers 8. Safety rod 6 may be used to attach a tether line or the like. Such a tether line may be used to allow workers to secure themselves or materials, tools, supplies, or the like, to the apparatus. If the worker falls from the roof, the tether line may help break or interrupt their fall.

Figure 2:
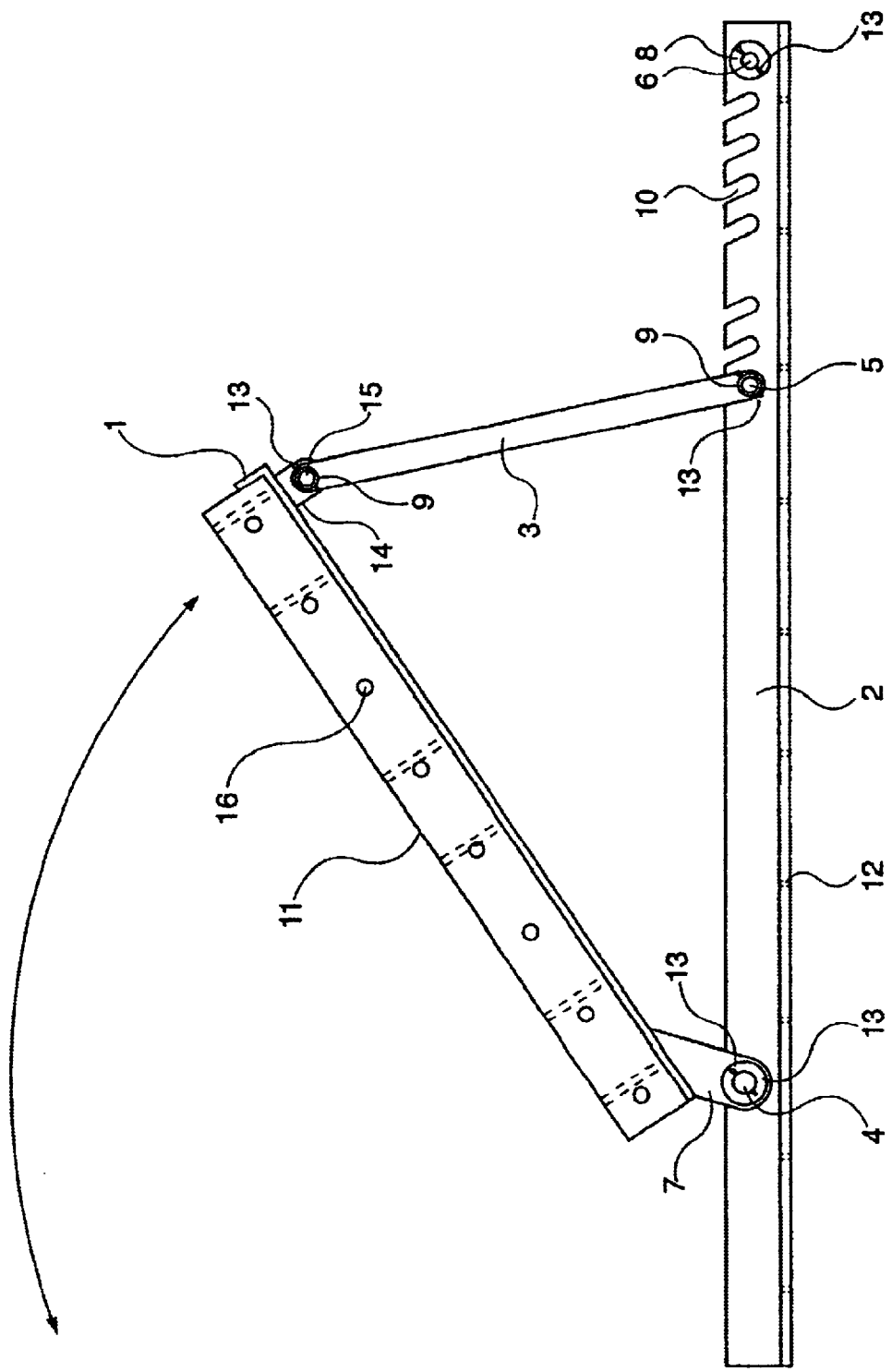
FIG. 2 is a side view of the ladder and scaffold support of the first embodiment of the present invention.

FIG. 2 is a side view of the ladder and scaffold support of the first embodiment of the present invention, illustrating how the angle of main support table 1 may be changed. The location and spacing of notches 10 is set to correspond to typical and popular roof pitches, and may allow adjustment from pitches from 4/12 to 12/12.

Figure 3:
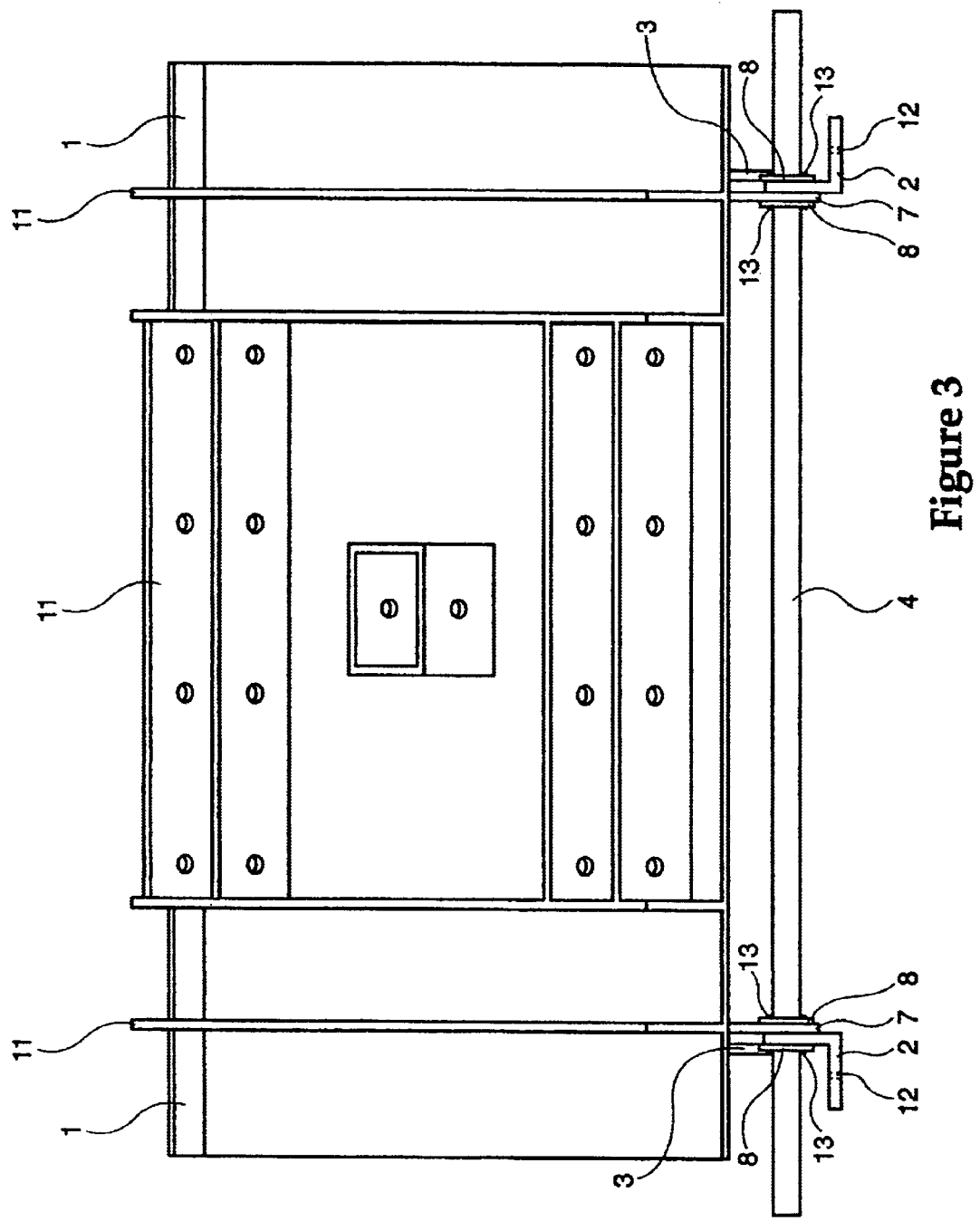
FIG. 3 is a top perspective view of the ladder and scaffold support of the first embodiment of the present invention.

FIG. 3 is a top perspective view of the ladder and scaffold support of the first embodiment of the present invention, providing another illustration of the arrangement of support adjustment plates 11. It should be noted that the particular arrangement of support adjustment plates 11 is by way of example only. Other configurations may be provided without departing from the spirit and scope of the present invention.

Figure 4:
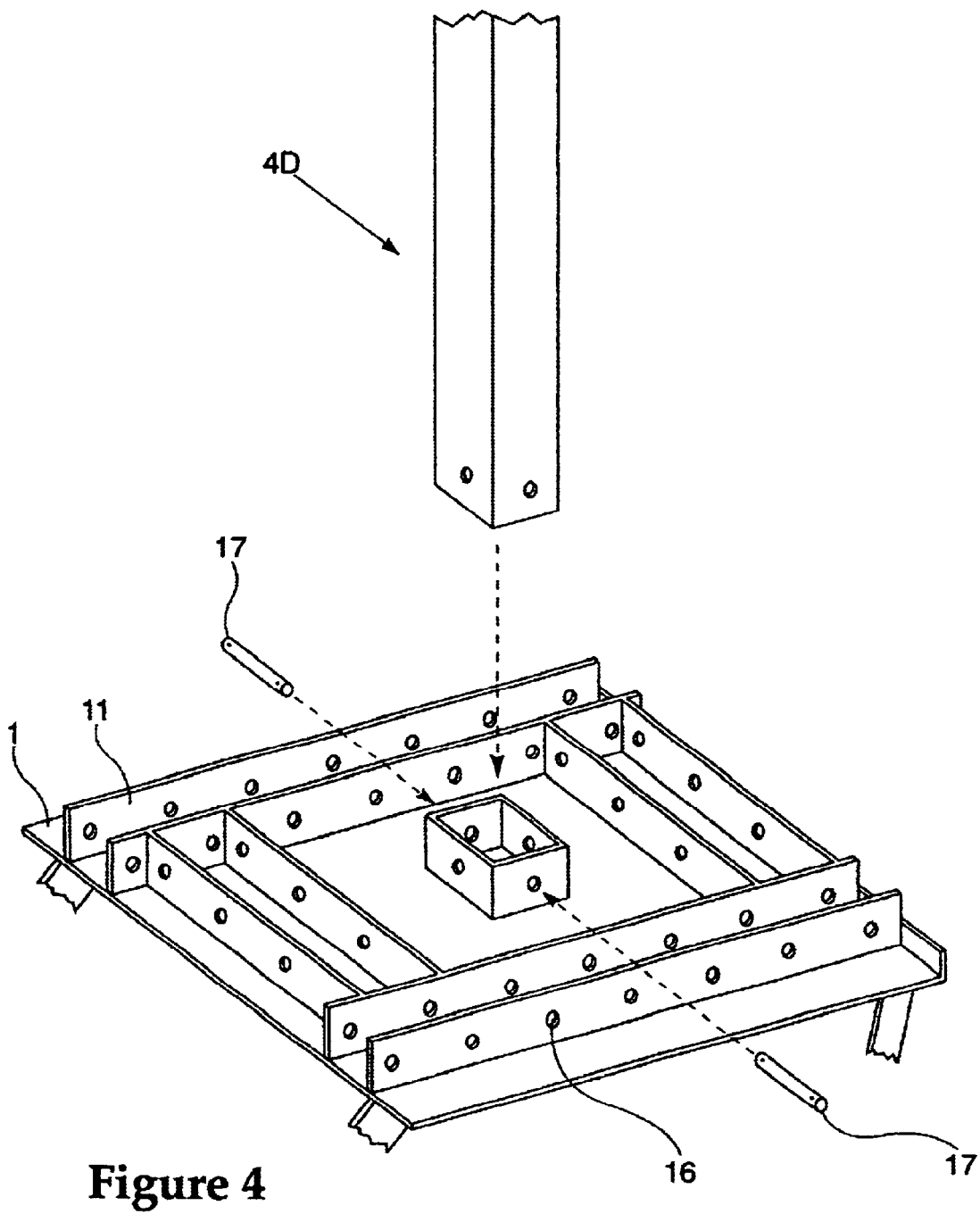
FIG. 4 is another perspective view of the ladder and scaffold support of the first embodiment of the present invention, illustrating how a siding jack post may be attached.

FIG. 4 is another perspective view of the ladder and scaffold support of the first embodiment of the present invention, illustrating how a siding jack post may be attached. Jack post d may comprise a portion of a scaffold assembly typically used in the industry for installing siding or the like. In some instances, it may be necessary to install siding or perform other siding work on a wall portion above an inclined roof section.

The present invention allows Prior Art scaffolding to be safely and easily installed above an inclined roof section. Other types of scaffolding and supports may also be supported by the present invention. As illustrated in FIG. 4, jack post D may be inserted between support adjustment plates 11 and secured with a pin or pins 17. The use of pins 17 and support adjustment plates 11 prevents ladder legs from slipping or other movement.

Figure 5:
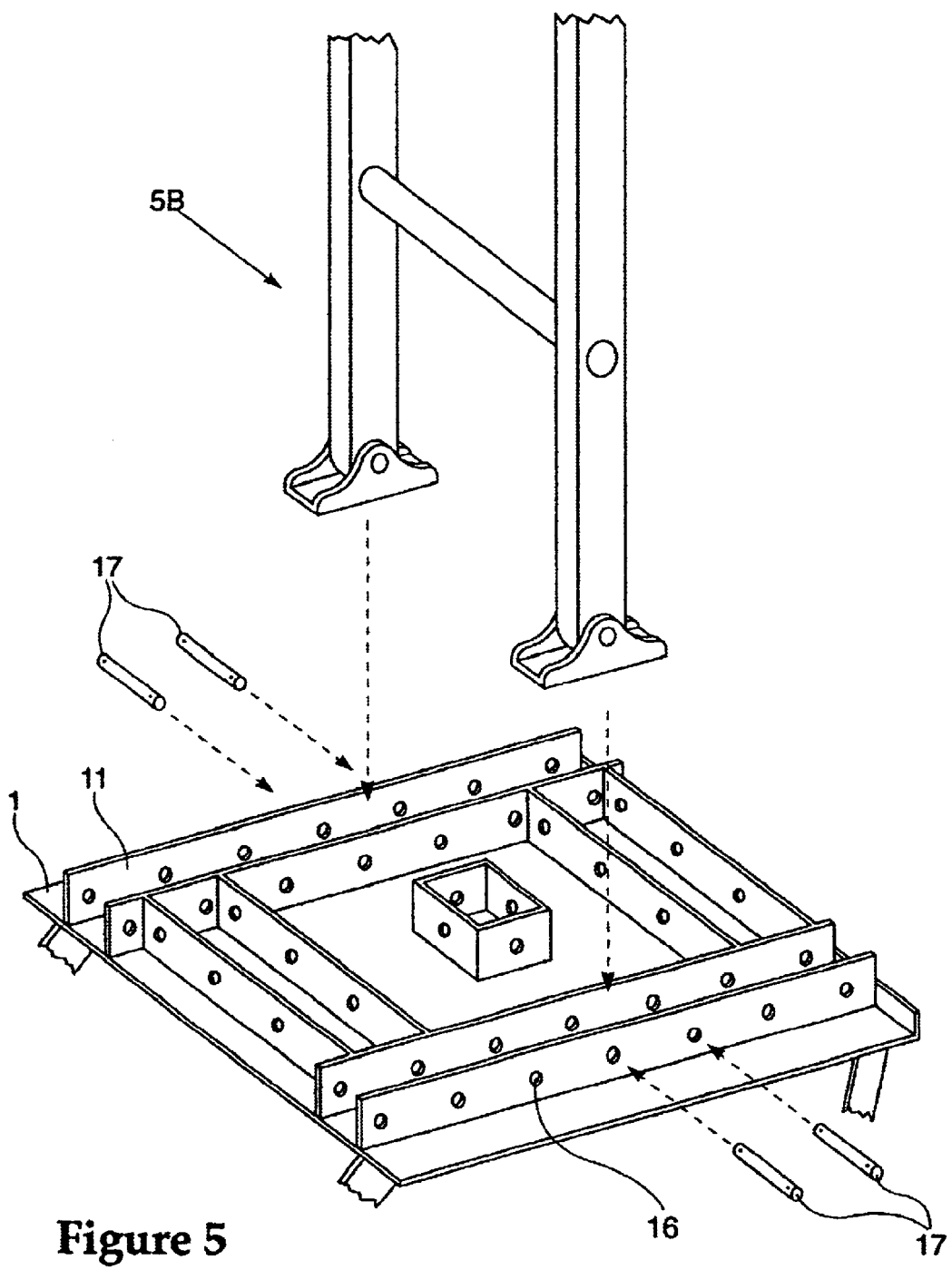
FIG. 5 is another perspective view of the ladder and scaffold support of the first embodiment of the present invention, illustrating how a ladder may be attached.
Figure 6:
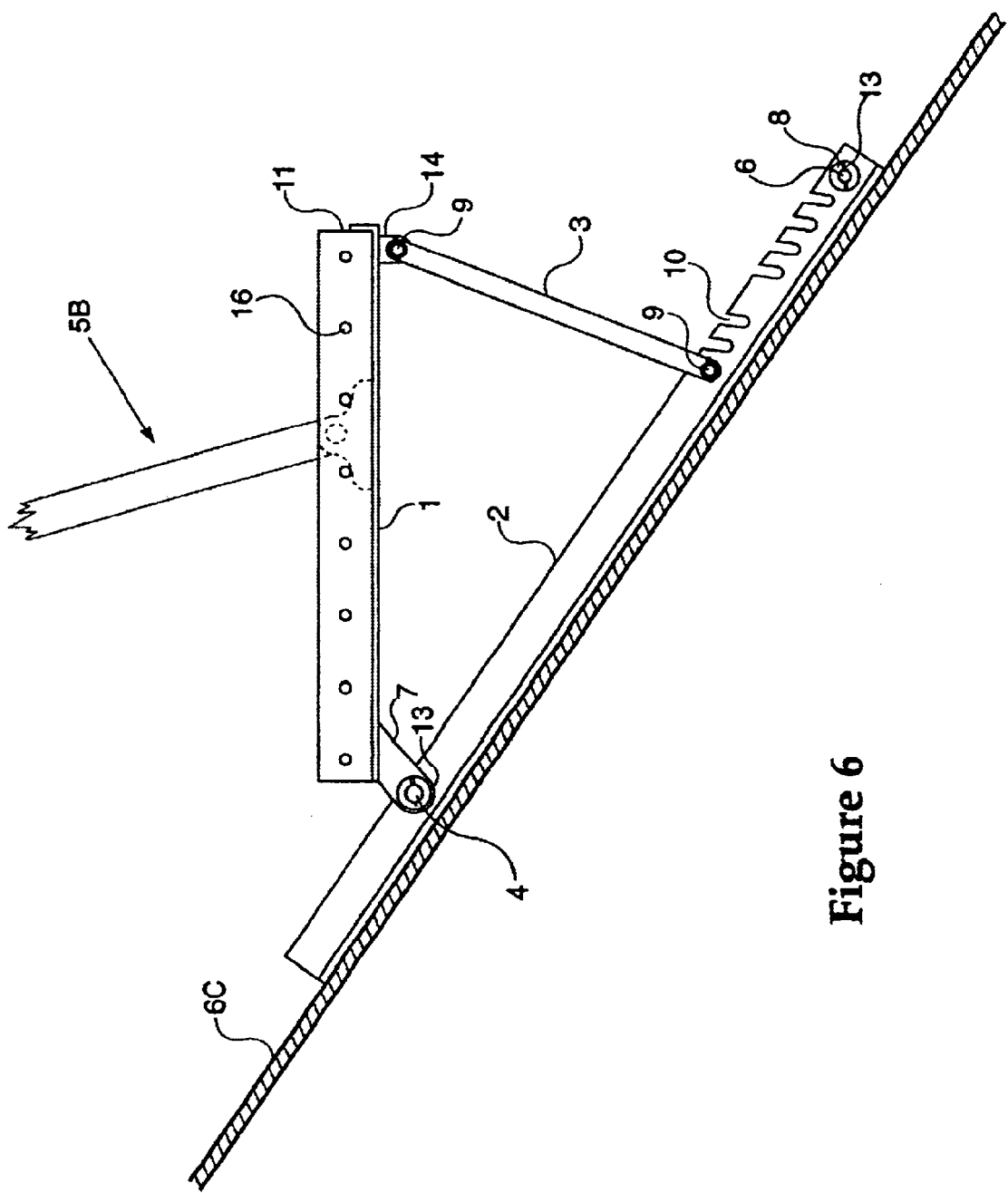
FIG. 6 is a side view of the ladder and scaffold support of another embodiment of the present invention, illustrating how a ladder may be attached.

FIG. 5 is another perspective view of the ladder and scaffold support of the first embodiment of the present invention, illustrating how a ladder may be attached. FIG. 6 is a side view of the ladder and scaffold support of the first embodiment of the present invention, illustrating how a ladder may be attached. As illustrated in FIGS. 5 and 6, Legs of ladder B may rest between support adjustment plates 11. Support adjustment plates 11 may be spaced apart a standard distance of a typical aluminum, wood, or fiberglass construction ladder so as to readily accommodate such a ladder.

Lock pins 17 may be inserted into pre-drilled holes 16 to secure ladder B. As illustrated in FIG. 5, ladder B may be provided with feet (as is typical of such Prior Art ladders) which are locked into place between support adjustment plates 11 via lock pins 17. The use of lock pins 17 and support adjustment plates 11 prevents ladder B from slipping or other movement. Note that the ladder structure need not be modified by drilling or other changes which might void the ladder warranty or alter the structural characteristics of the ladder.

Legs of ladder B may rest between support adjustment plates 11. Support adjustment plates 11 may be spaced apart a standard distance of a typical aluminum, wood, or fiberglass construction ladder so as to readily accommodate such a ladder.

Other features may be added to the apparatus of the first embodiment of the present invention. For example, additional support adjustment plates 11 may be provided to secure a horizontal walkboard, scaffold, or the like to the apparatus.

Figure 7:
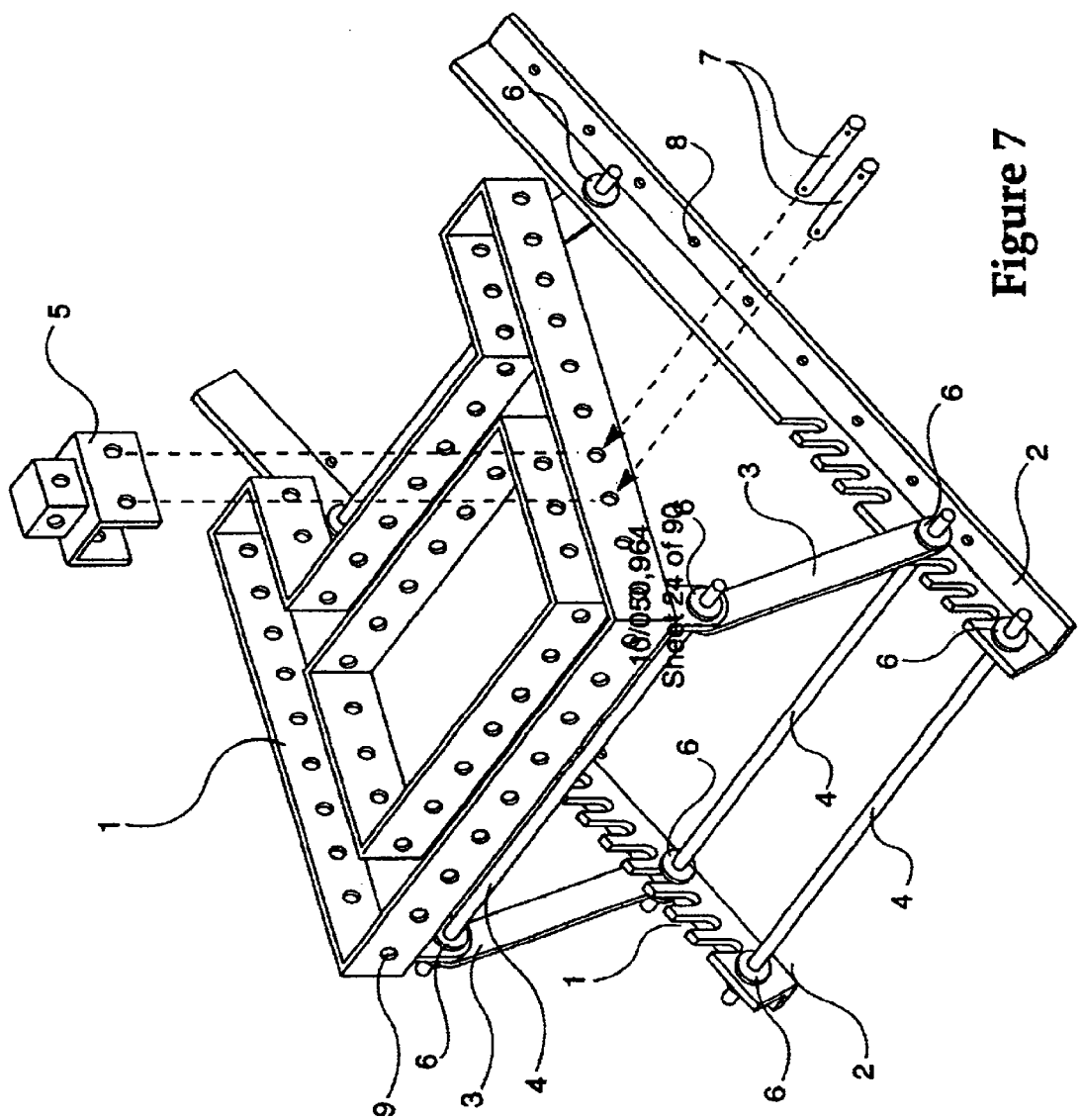
FIG. 7 is a perspective view of a modified version of FIGS. 1–6 with a movable jack post support.
Figure 8:
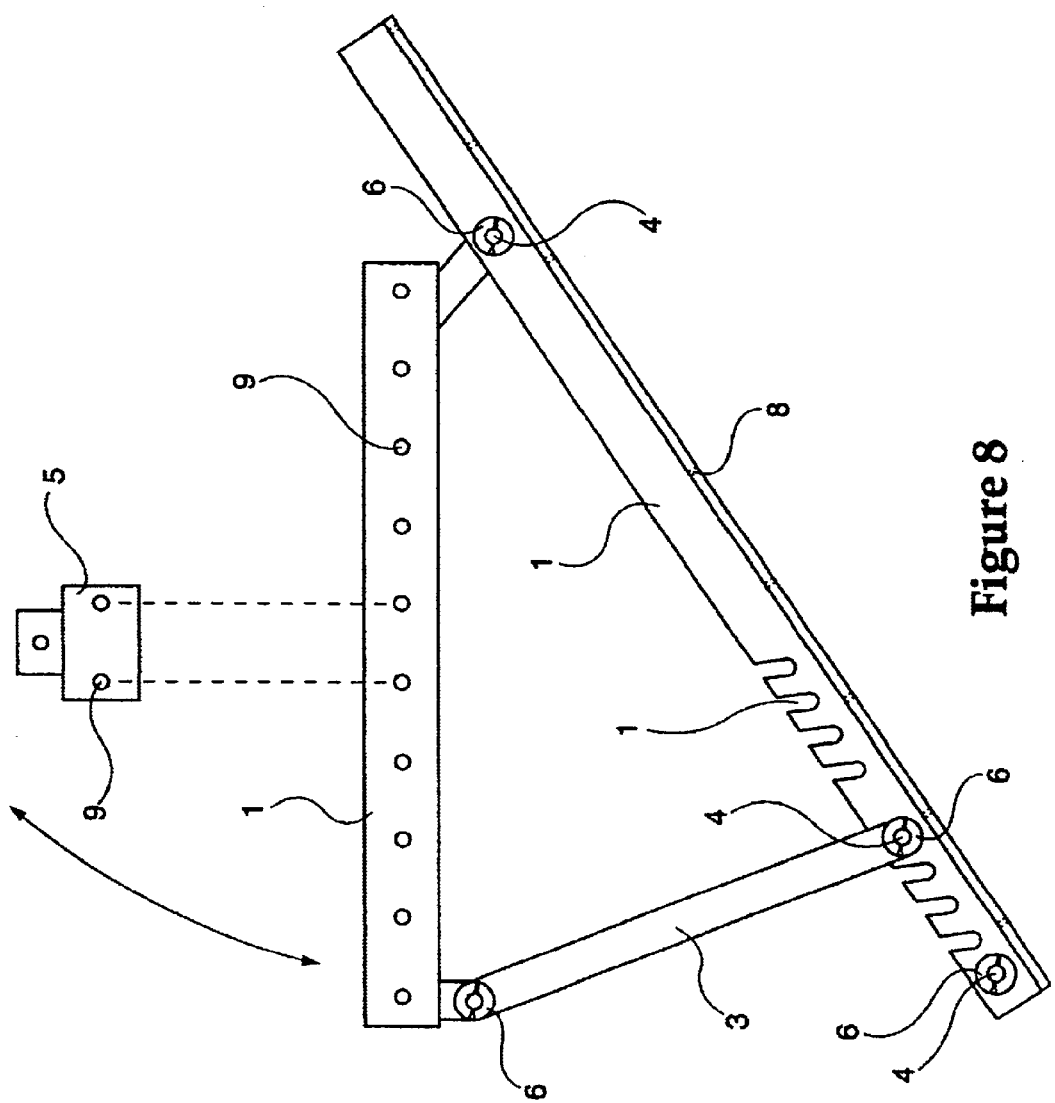
FIG. 8 is a side view of a modified version of FIGS. 1–6 with a movable jack post support.
Figure 9:
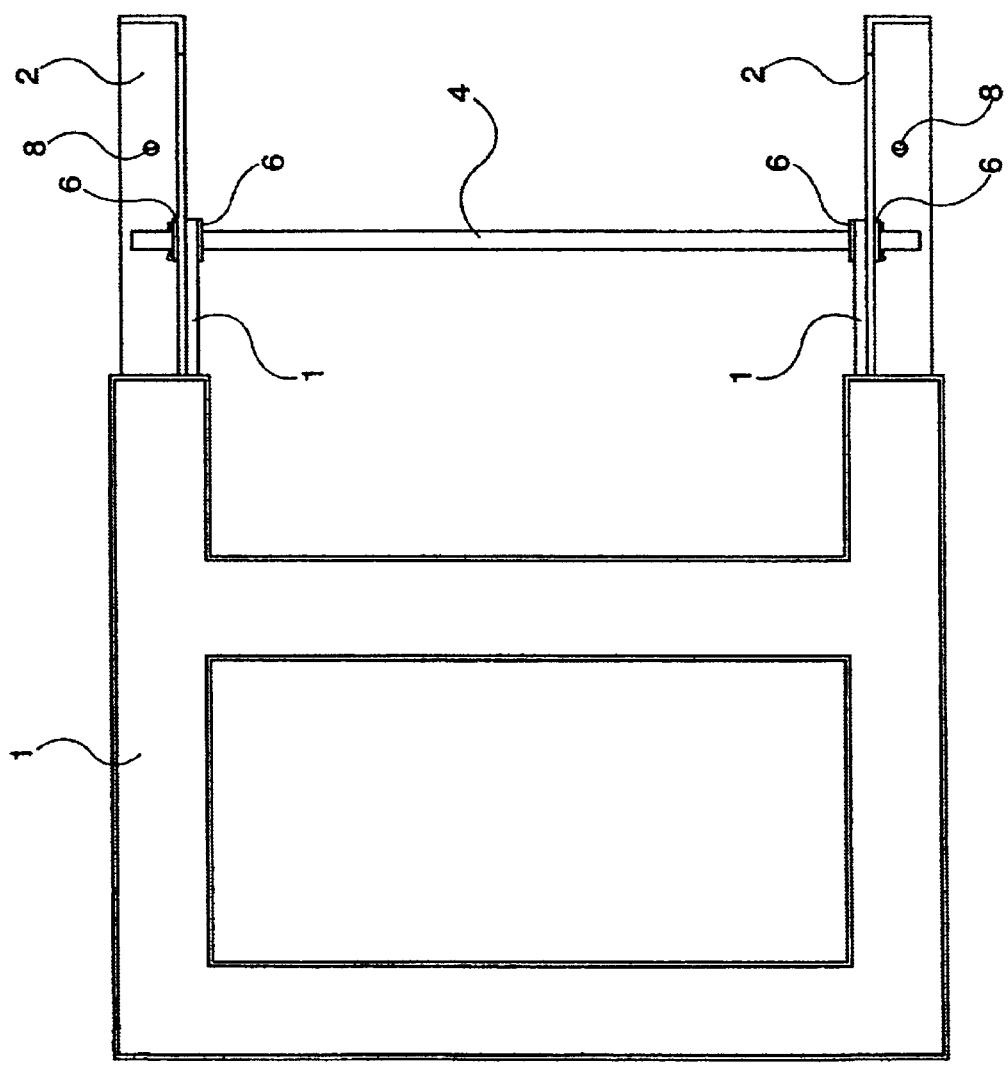
FIG. 9 is a top view of a modified version of FIGS. 1–6 with a movable jack post support.
Figure 10:
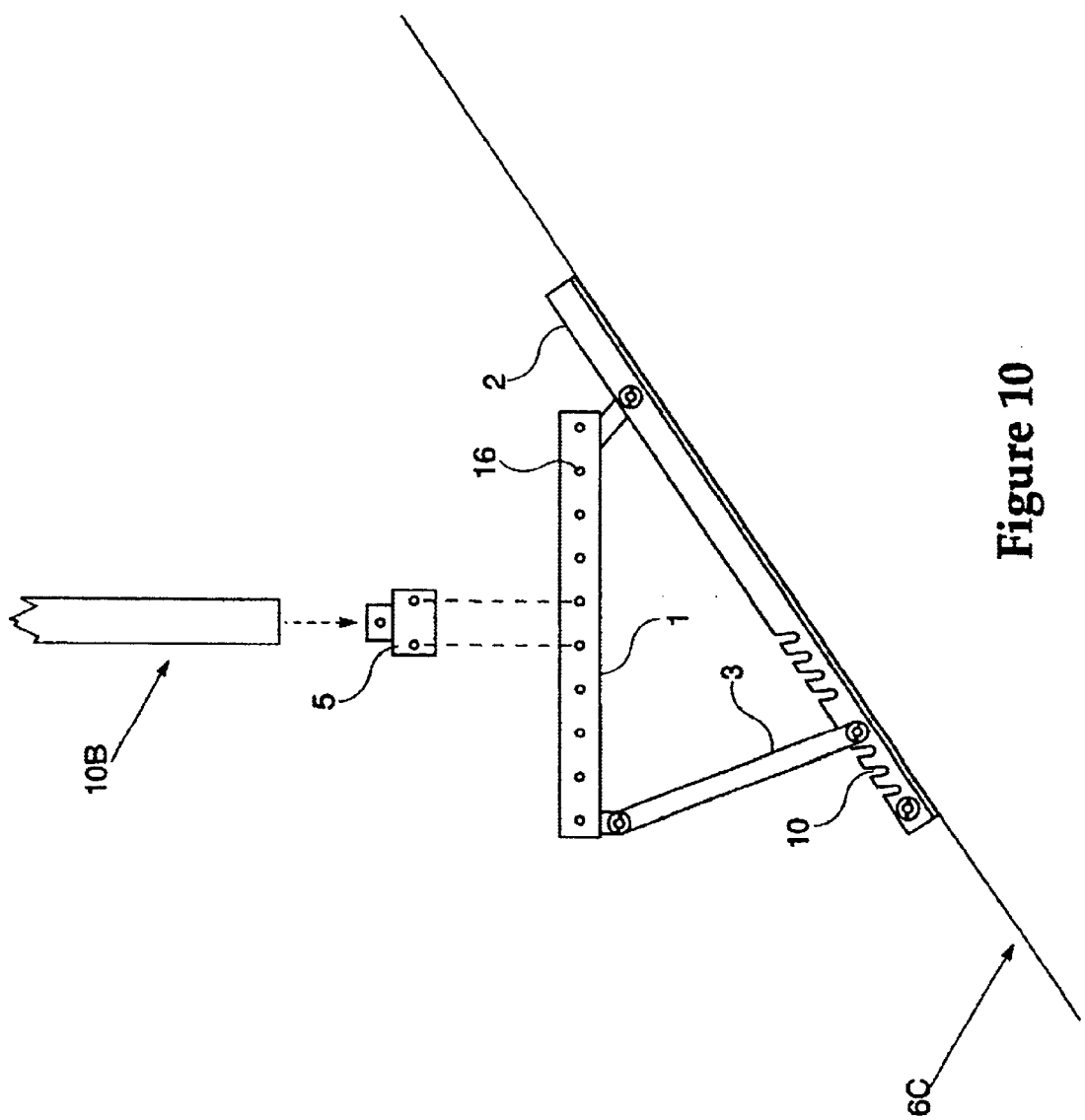
FIG. 10 is a top view of a modified version of FIGS. 1–6 with a movable jack post support.

FIG. 7 is a perspective view of a modified version of FIGS. 1–6 with a movable jack post support. FIG. 8 is a side view of a modified version of FIGS. 1–6 with a movable jack post support. FIG. 9 is a top view of a modified version of FIGS. 1–6 with a movable jack post support. FIG. 10 is a top view of a modified version of FIGS. 1–6 with a movable jack post support.

In this modified version of FIGS. 7–10, a jack post mount 5 may be provided. Jack post mount 5 may be advantageously mounted to a number of positions within rails 1, secured by pins 7. Thus, the device need not be relocated if a jack post needs to be moved or positioned a few inches from the center portion of the platform (as in FIGS. 1–6).

It should be noted that the GABLEMASTER™ may also be used to support materials and supplies in addition to, or in when not being used as, a scaffold or ladder support. Squares of shingles, water coolers, tools, and other supplies may be placed upon the surface of the GABLEMASTER™ of FIGS. 1–10, which may be adjusted to prevent such materials from sliding off the roof.

Figure 11:
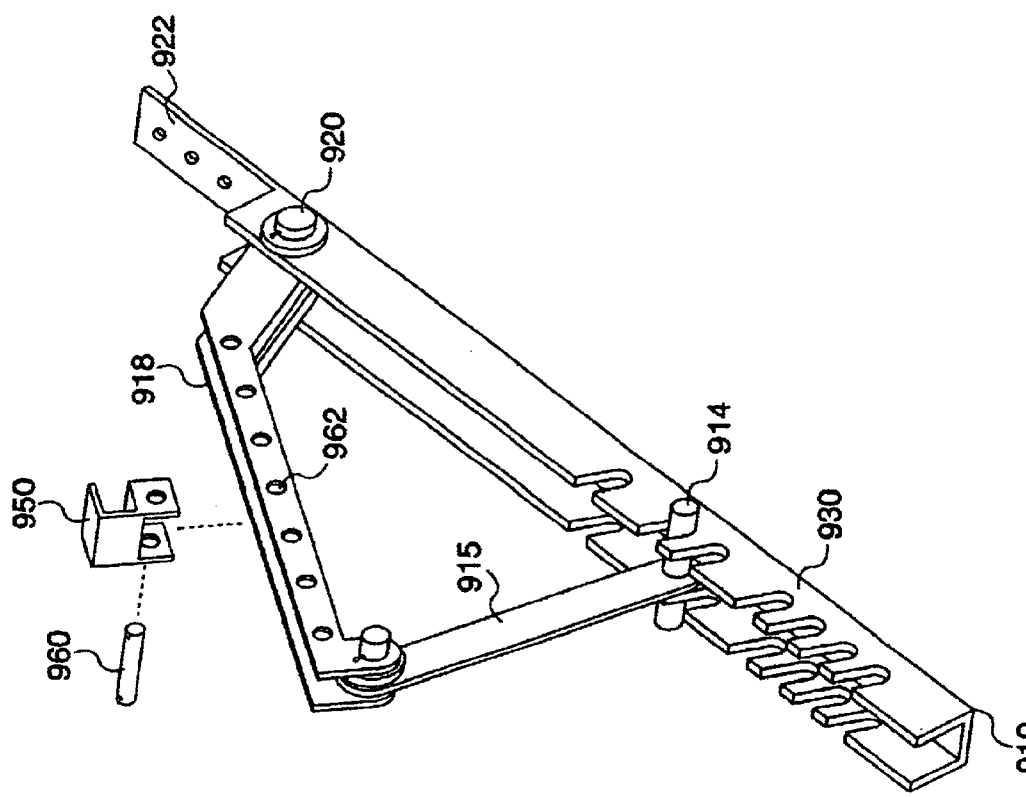
FIG. 11 is a perspective view of another embodiment of the material and supply support of the present invention, wherein a lightweight adjustable material and supply or scaffold board support is provided

FIG. 11 is a perspective view of yet another alternative embodiment of the invention, wherein a lightweight adjustable material and supply or scaffold support is provided. In this variation, a single channel having U-shaped cross-section may be provided, each with an adjustable support pole. Connected to the support pole though a pivot joint is an adjustable support channel which has its other end hinged to single channel. The support pole may be adjusted to achieve a suitable angle of adjustment corresponding to roof incline. A number of these devices may be used to support a scaffold board on a roof by means of a scaffold securing clip.

Referring to FIG. 11, a number of channels 910 having a U-shaped cross-section may be provided, each with an adjustable support pole 915. Connected to the support pole 915 though a pivot joint 950 is an adjustable platform support channel 918 which has its other end hinged to channel 910 through pivot 920. The support poles 915 may be adjusted to achieve a suitable angle of adjustment corresponding to roof incline by inserting bar 914 into one of notches 930. Notches 930 may be provided at intervals corresponding to standard roof pitches.

Support channel 918 may be used to support a scaffold platform, which could be a plank or board, or a specialized platform (e.g., aluminum scaffold platform) constructed for such purpose. When a number of the devices of FIG. 11 are attached to a roof via nailing holes 922, at the same height, a platform or board may be placed atop support channel 918, secured by clip 850 held in place by pin 960 though one of holes 962. Holes 962 may be spaced at regular intervals corresponding to plank or platform sizes and/or roof pitch. In use, the other side of the plank or platform would be held in place by the roof itself.

ROOFSTOCKER™ and ROOFER'S RACK™ provide adjustable platforms which allow a roofer to store materials safely on an inclined roof surface. The ROOFER'S RACK™ is an adjustable platform system designed to hold slate tiles, cedar shakes, terra cotta tiles, and other roofing accessories, tools, and materials. It may be placed at shoulder level, eliminating the up-and-down motion associated with prior art use of a scaffold board for material storage, thereby also eliminating the fatigue factor associated with installing these types of roofing materials. The ROOFER'S RACK™, because of its compact and lightweight design can be moved freely as work progresses, allowing for quicker installation time.

In its preferred embodiment, the ROOFSTOCKER™ is a lightweight, fully assembled aluminum platform composed of two units which can be used individually or in combination. Individually, the unit may support up to 2000 pounds of materials in one embodiment, whereas combined units may support up to 4000 pounds in another embodiment.

The addition of fourteen inch safety rails prevents materials such as tile and slate from falling off the roof. The platform easily adjusts to roof truss layouts of two feet, 18-inch and 16-inch on center, as well as other dimensions. The ROOFSTOCKER™ increases safety for employees and customers and decreases liability to the contractor. A custom tarp may be made to cover materials on the ROOFSTOCKER™. Standard size in the preferred embodiment is 54" in length and 42" in width.

Figure 12:
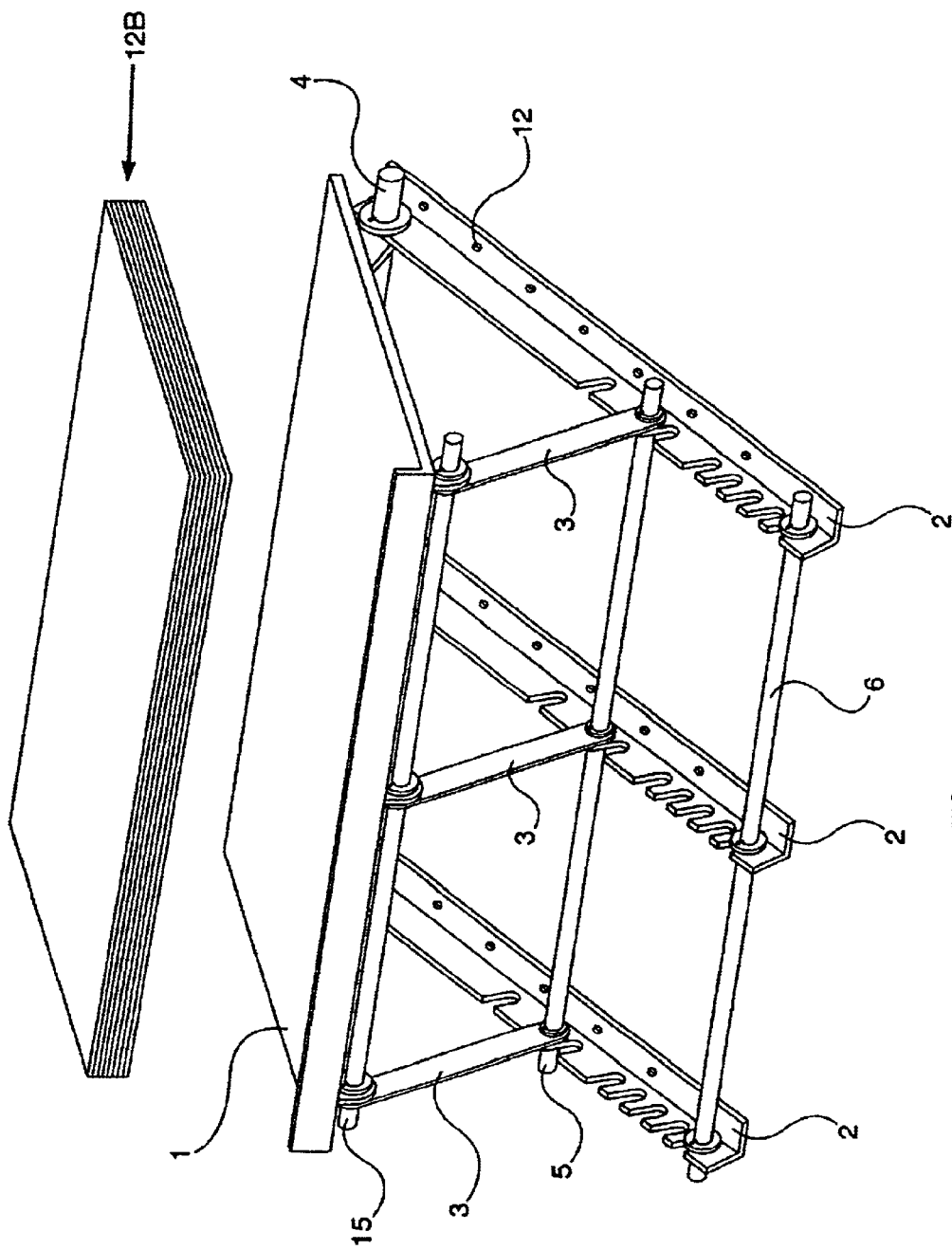
FIG. 12 is a perspective view of another embodiment of the material and supply support of the present invention.

Both the ROOFER'S RACK™ and ROOFSTOCKER™ will now be described in more detail in connection with FIGS. 12–26. FIG. 12 is a perspective view of the material and supply support of the second embodiment of the present invention. Main support table 1 for the unit may be used to support a package or packages of roofing shingles, tools, roofing materials, or the like represented by element B in FIG. 12.

Main support table 1 may be constructed from aluminum sheet of approximately ¼ inch in thickness. A lip or lips may be added, preferably as shown, on the outboard side of the apparatus, to prevent materials B from slipping off the surface of support table 1. Support table 1 and the lip or lips 11 may also be constructed from a single piece of cast aluminum. A texture (e.g., ribbing, cross-checking, or the like) may be applied to the surface of support table 1 to prevent materials from slipping off the surface.

Materials other than aluminum may be used, of course. However, for high strength and low weight, the inventor has found aluminum construction to work well. The apparatus of the present invention could be conceivably made of other metals (e.g., steel) or even from plastics or composites (e.g., fiberglass and/or carbon fiber construction) without departing from the spirit and scope of the present invention.

Main support bars 2 may be fabricated from aluminum channel and are designed to be fastened to a roof truss on 24" centers. The center support bar 2 may be provided in a slidable fashion on connecting rods 4 and 5. Such a slidable support bar or bars 2 may be used to secure the device to roof trusses which are not on 24" centers (e.g., 12" or 16" centers). Main support bars 2 may be secured to roof trusses by nailing or screwing through pre-drilled holes 12. If nails are used, double-headed nails are preferred, as they may be readily removed without damaging or marring the roof surface.

Typically, four to eight double-headed nails may be used to secure main support bars 2 to a roof truss. Eight or more pre-drilled nail holes may be provided in each of main support bars 2 in the preferred embodiment. Other numbers of support bars 2 may be used (e.g., 2, 4, 5, 6, or more) to alter the size and width of the apparatus. For example, a larger apparatus may be made with four support bars. However, to maintain lightweight construction and to limit the amount of roof obscured by the apparatus, the inventor has found that three support bars on 24 inch centers to be the preferred embodiment.

A plurality of grooves or notches 10 may be cut into support bars 2 to allow angle adjustment of main support table 1 to compensate for different roof pitches. Connecting rod 5 may be adjusted to a corresponding one of the notches 10 to provide correct support to main support table 1 via support bars 3. Support bars 3 may in turn be connected to main support table 1 via rod pin 15 and plate 14 in a pivoting fashion. Connecting rod 4 may rotate within the holes provided in main support bars 2 and rotatably support platform 1 via plates 7 to allow for rotation with angle adjustment.

Connecting rod 5 may be provided with spacers 9 and carter pins 13 to lock spacers 9 in place. Spacers 9 may provide proper alignment between connecting rod 5 and main support bars 2 to provide correct spacing for 24" (or the like) roof truss centers. In an alternative embodiment, multiple spacers or spacer positions may be provided to allow the apparatus to adjust to different roof truss spacings.

An additional connecting rod may be provided as safety rod 6, also provided with carter pins 13 and spacers 8. Safety rod 6 may be used to attach a tether line or the like. Such a tether line may be used to allow workers to secure themselves or materials, tools, supplies, or the like, to the apparatus. If the worker falls from the roof, the tether line may help break or interrupt their fall.

Figure 13:
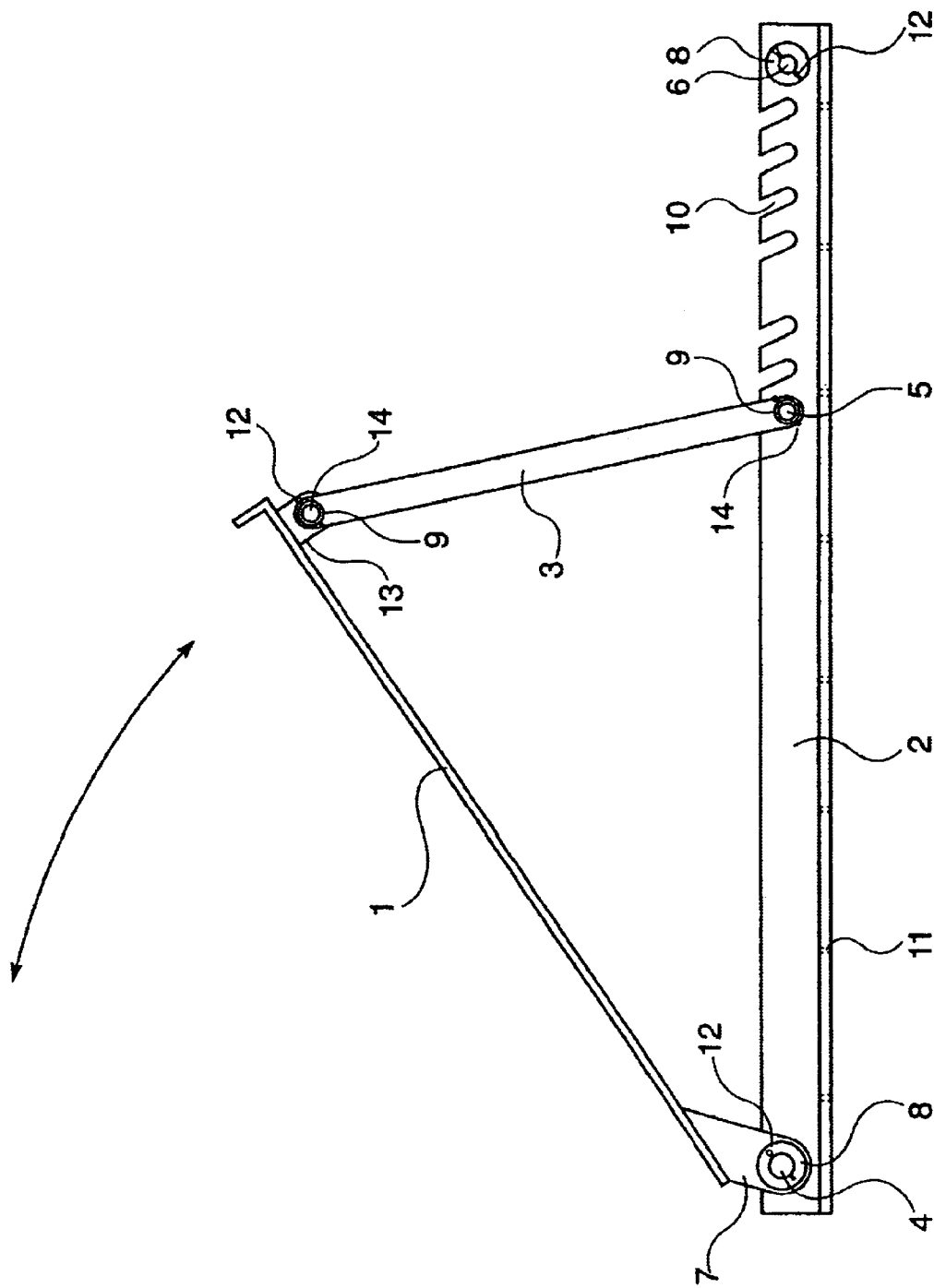
FIG. 13 is a side view of the material and supply support of the second embodiment of the present invention.

FIG. 13 is a side view of the material and supply support of the second embodiment of the present invention, illustrating how the angle of main support table 1 may be changed. The location and spacing of notches 10 is set to correspond to typical and popular roof pitches, and may allow adjustment from pitches from 4/12 to 12/12.

Figure 14:
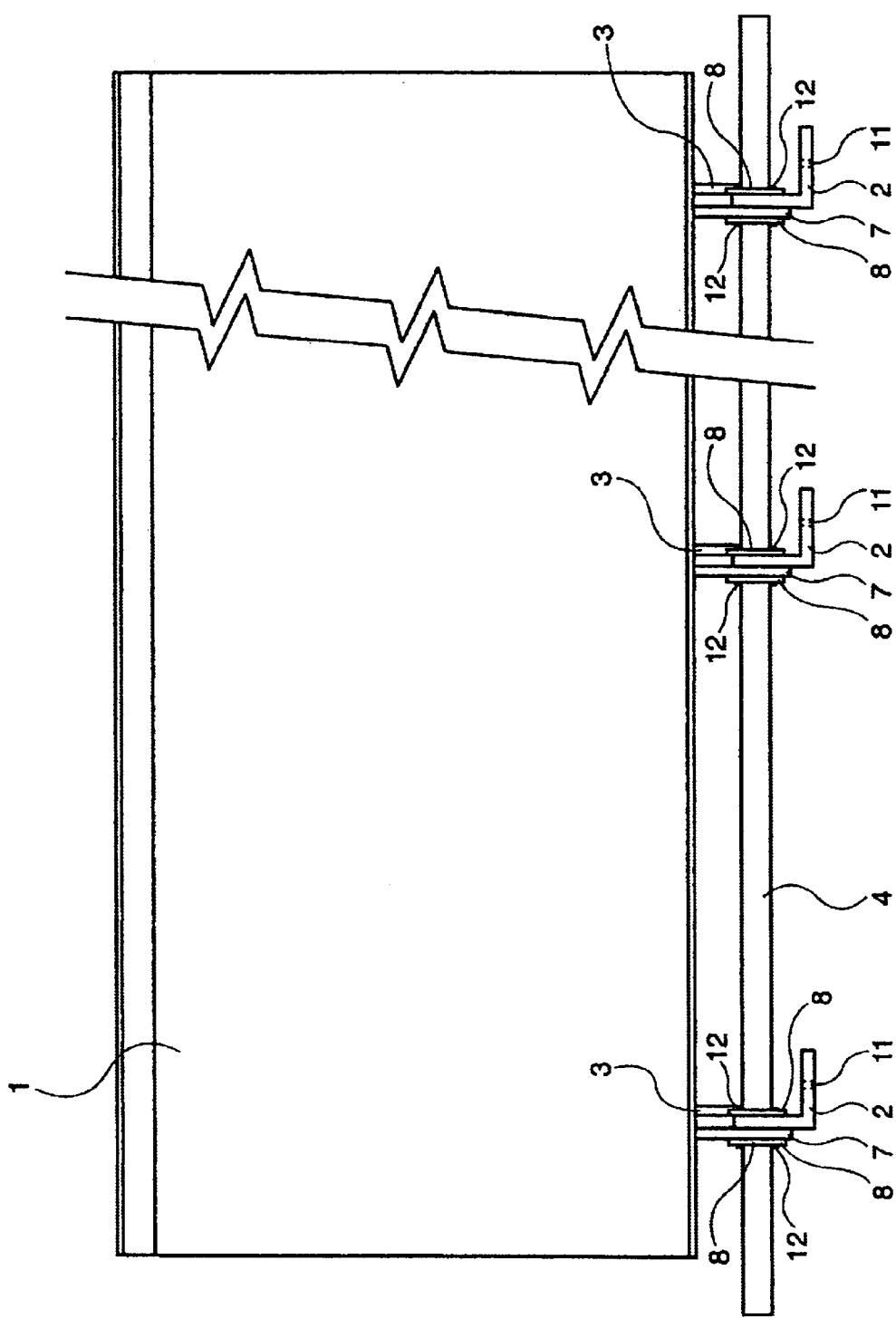
FIG. 14 is a top perspective view of the material and supply support of the second embodiment of the present invention.

FIG. 14 is a top perspective view of the material and supply support of the second embodiment of the present invention, providing another illustration of the apparatus. It should be noted that the particular arrangement of the lip on main support table 1 is by way of example only. Other configurations may be provided without departing from the spirit and scope of the present invention.

Figure 15:
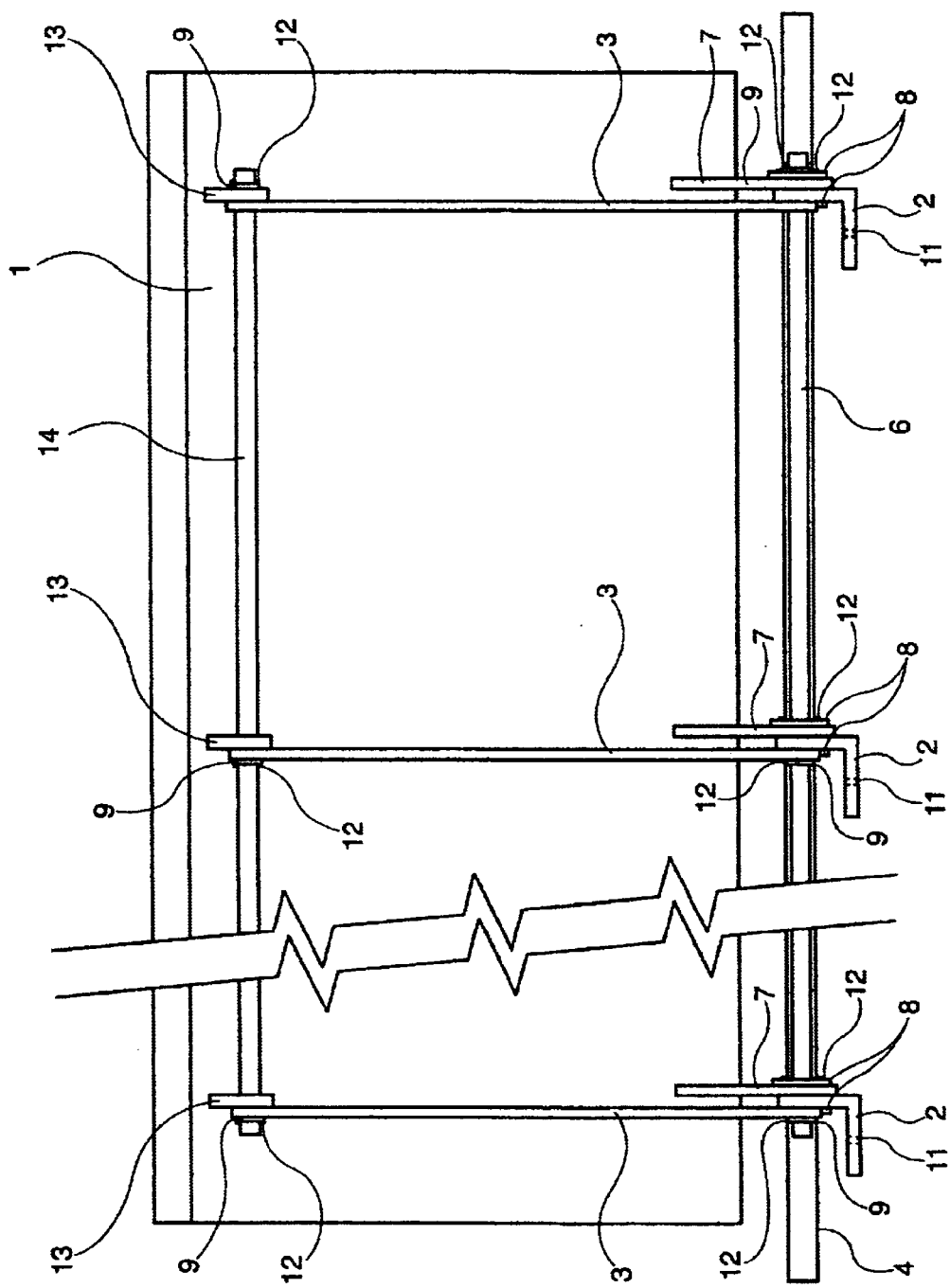
FIG. 15 is a bottom perspective view of the material and supply support of the second embodiment of the present invention.
Figure 16:
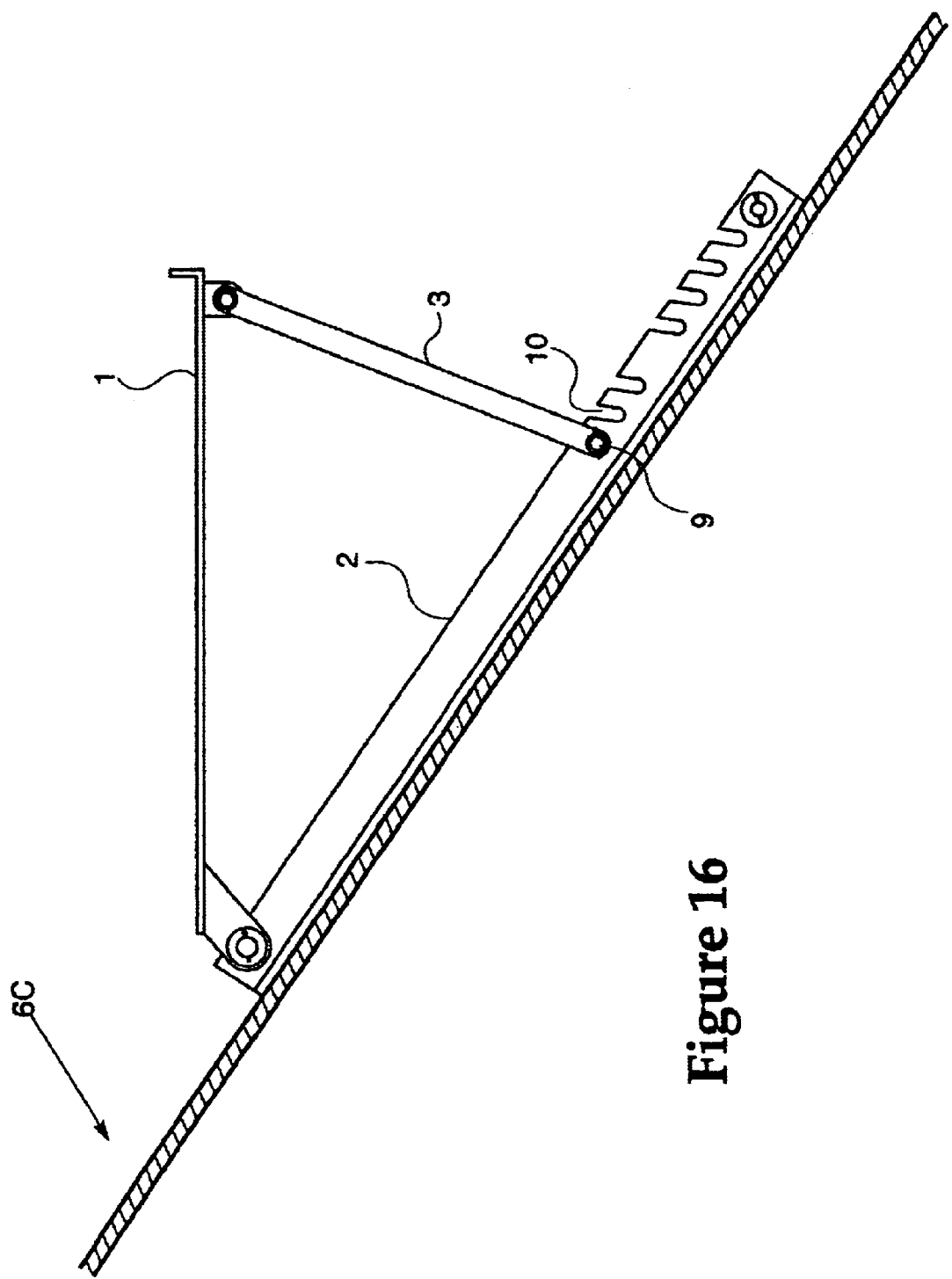
FIG. 16 is another side view of the material and supply support of the second embodiment of the present invention.

FIG. 15 is a bottom view of the material and supply support of the second embodiment of the present invention. FIG. 16 is another side view of the material and supply support of the second embodiment of the present invention, as installed on a roof.

Figure 17:
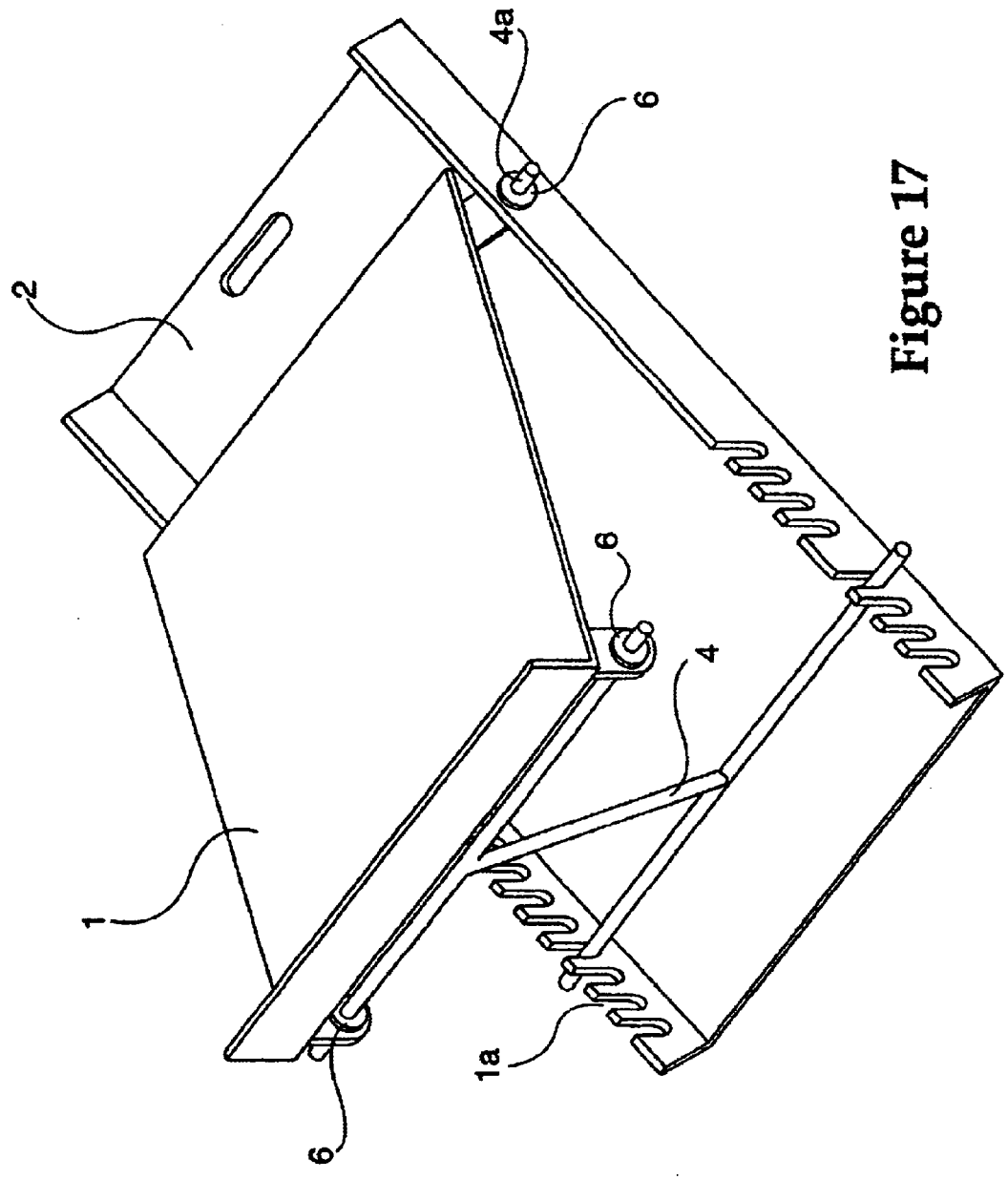
FIG. 17 is a perspective view of a material holder in another embodiment of the present invention.

FIG. 17 is a perspective view of a material holder in another embodiment of the present invention. The water cooler support may be marketed under the name WATERMATE™, a trademark of the inventor. Roof plate 2 may be backed with a layer of rubber foam (not shown) (e.g., 1" thick, medium density foamed polyurethane or upholstery type foam commonly found in fabric stores). Roof plate 2, having a substantial surface area and being backed with the foam layer, will tend to grip the roof surface and not slide off. The Foam layer tends to conform to the rough surface of the roof and thus does not readily slip off. Foam layer may be sufficient to support a water jug which may comprise, for example, a five gallon IGLOO™ water cooler.

By using a layer of foam as opposed to nailing or screwing, the support of FIG. 17 may be readily moved from place to place on the roof. Alternately, one or more nail holes may be provided to secure the apparatus or act as a safety backup to the foam layer.

Figure 18:
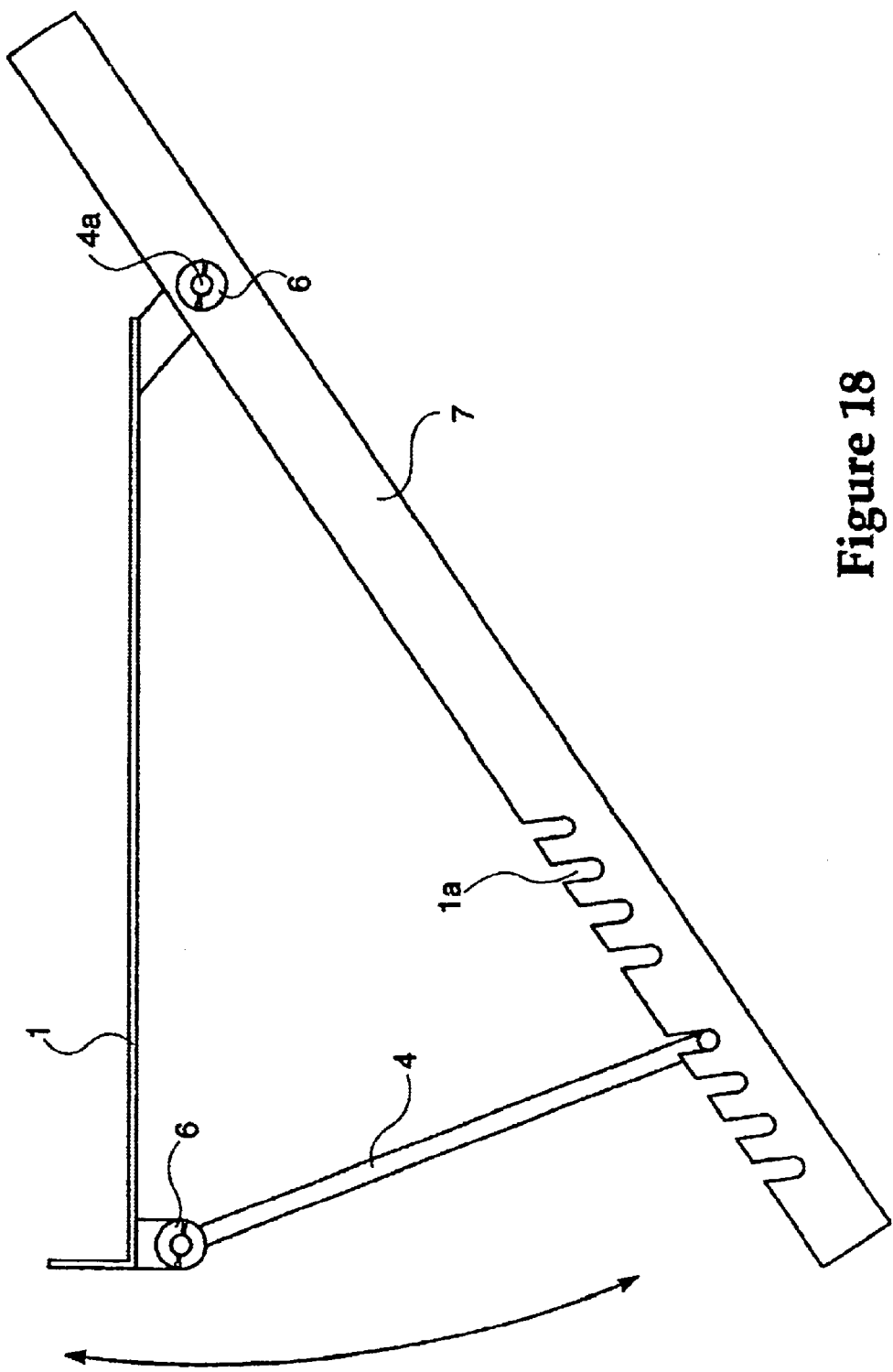
FIG. 18 is a side view of a material holder in another embodiment of the present invention.
Figure 19:
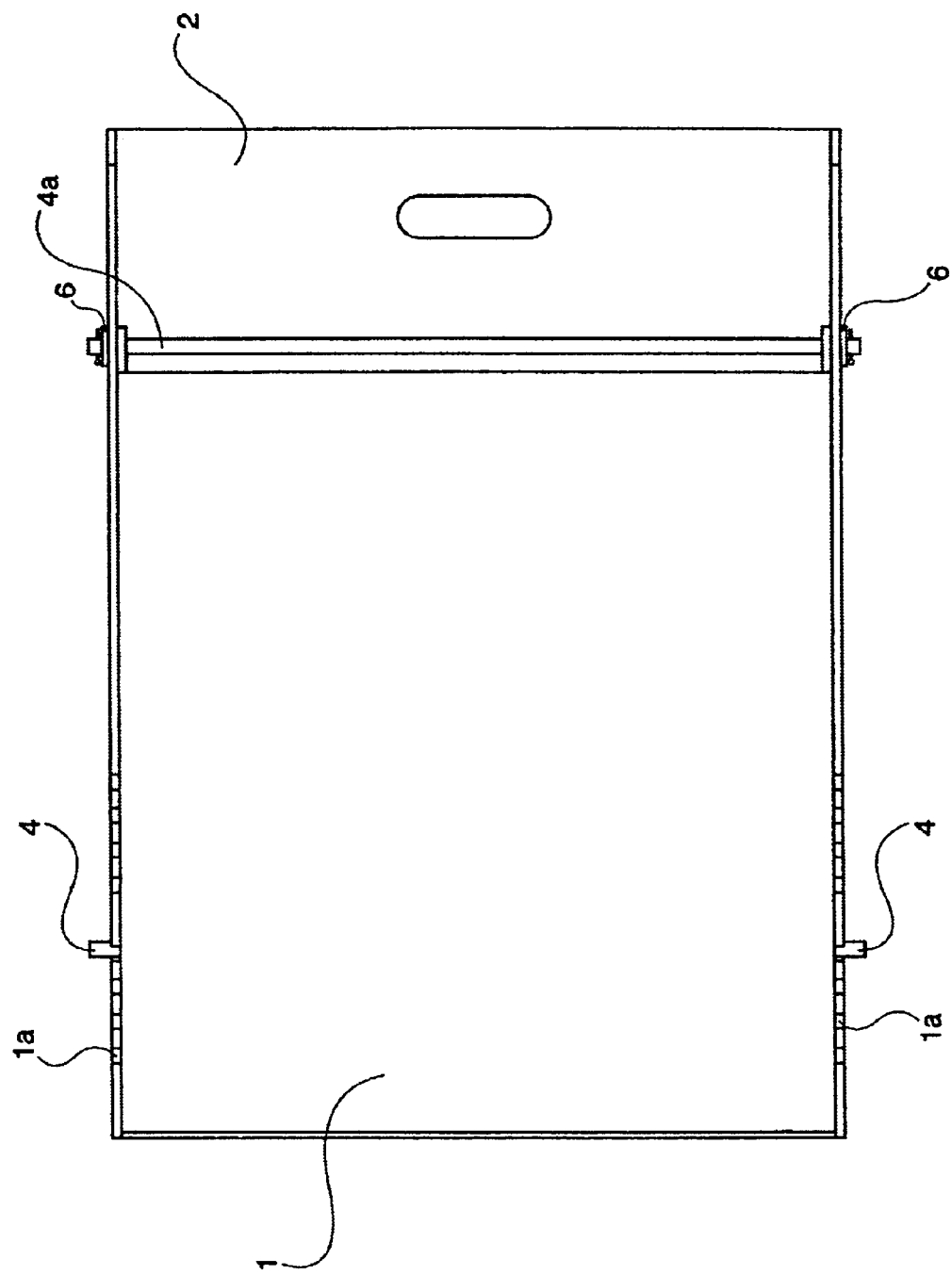
FIG. 19 is a top view of a material holder in another embodiment of the present invention.
Figure 20:
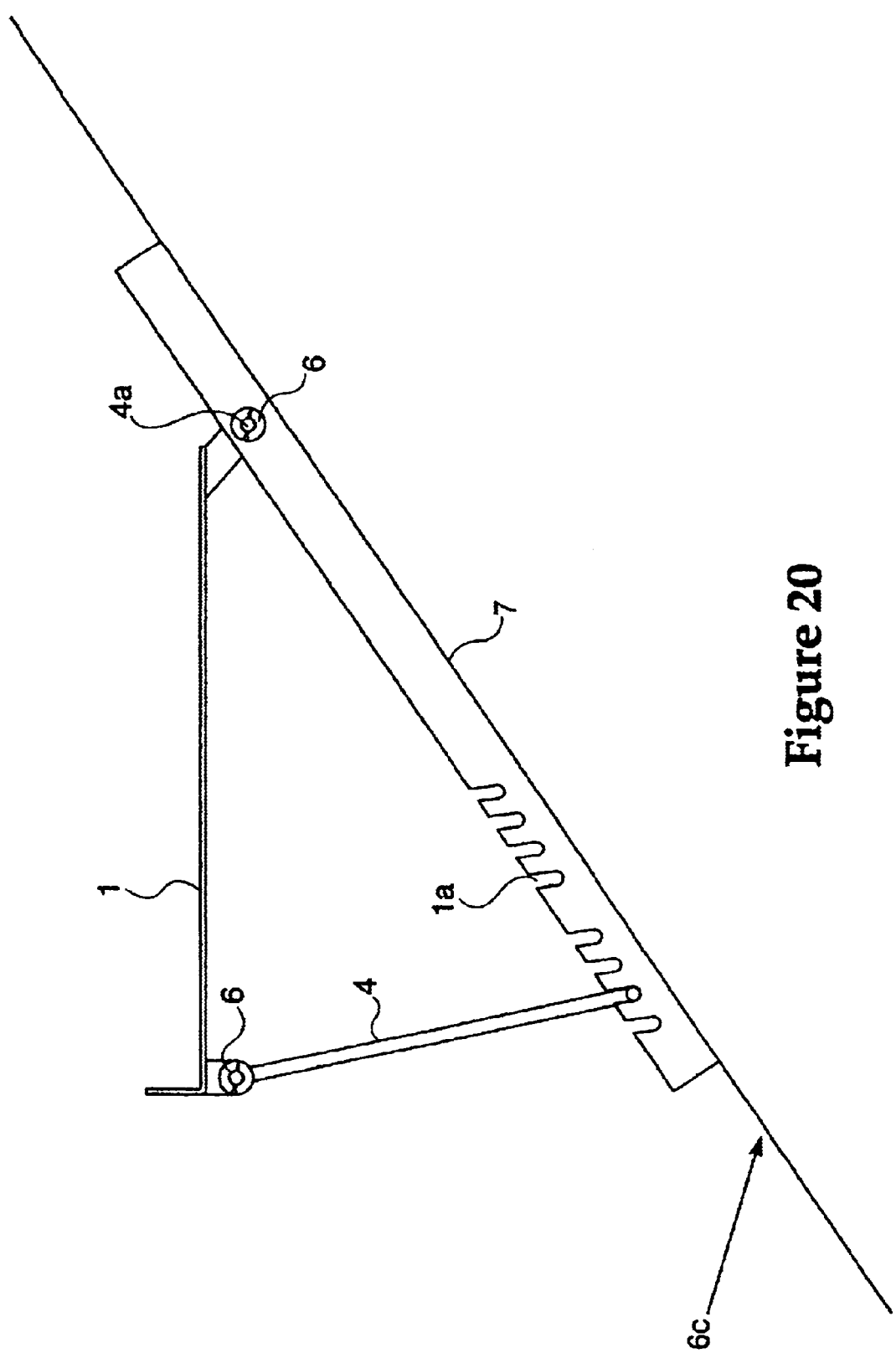
FIG. 20 is another side view of a material holder in another embodiment of the present invention.
Figure 22:
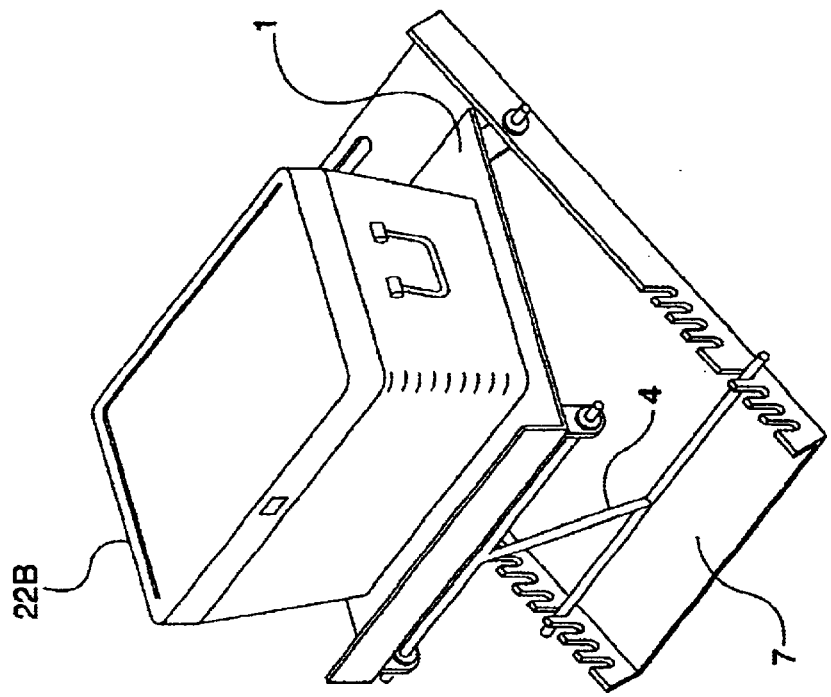
FIG. 22 is a perspective view of the material holder of the present invention illustrating the apparatus supporting a cooler.
Figure 21:
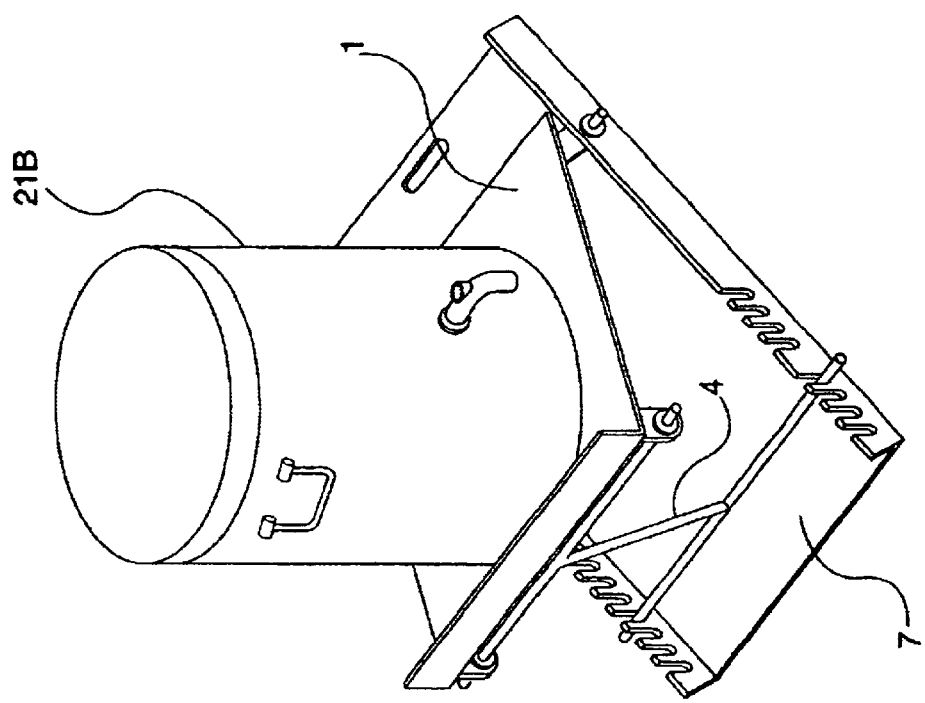
FIG. 21 is a perspective view of the material holder of the present invention illustrating the apparatus supporting a water jug.

FIG. 18 is a side view of a material holder in another embodiment of the present invention. Support platform 1 may support materials, a cooler, or a water jug. Pivots 6 hold adjustment bar 4 which may be plated into notches 1a in roof plate 2. The other end of platform 1 may rotate with respect to roof plate 2 via shaft 4a. FIG. 19 is a top view of a material holder in another embodiment of the present invention. FIG. 20 is another side view of a material holder in another embodiment of the present invention. FIG. 21 is a perspective view of the material holder of the present invention illustrating the apparatus supporting a water jug. FIG. 22 is a perspective view of the material holder of the present invention illustrating the apparatus supporting a cooler.

Figure 23:
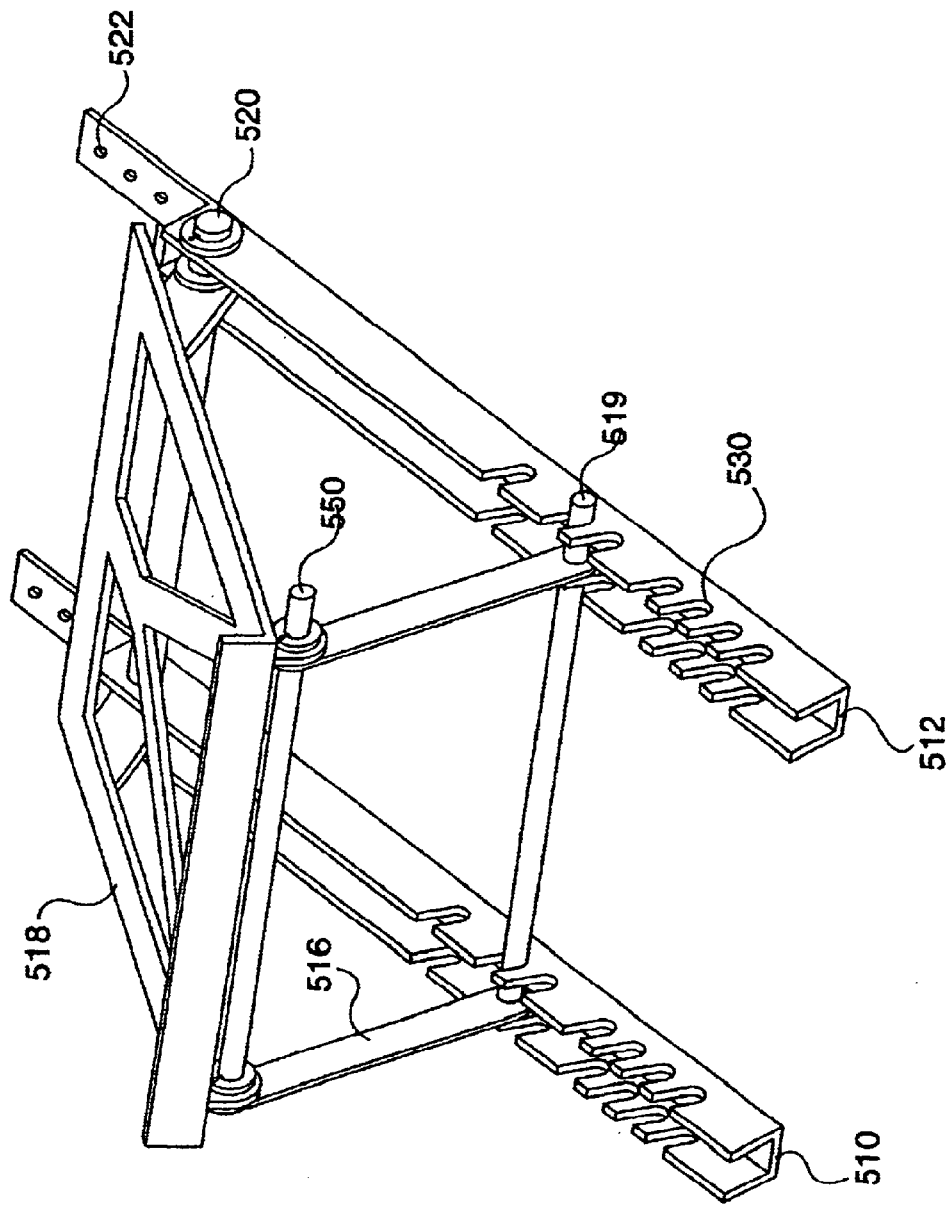
FIG. 23 is a perspective view of another embodiment of the material holder of the present invention, in which two channels having U-shaped cross-sections may be provided, each with an adjustable support pole.
Figure 24:
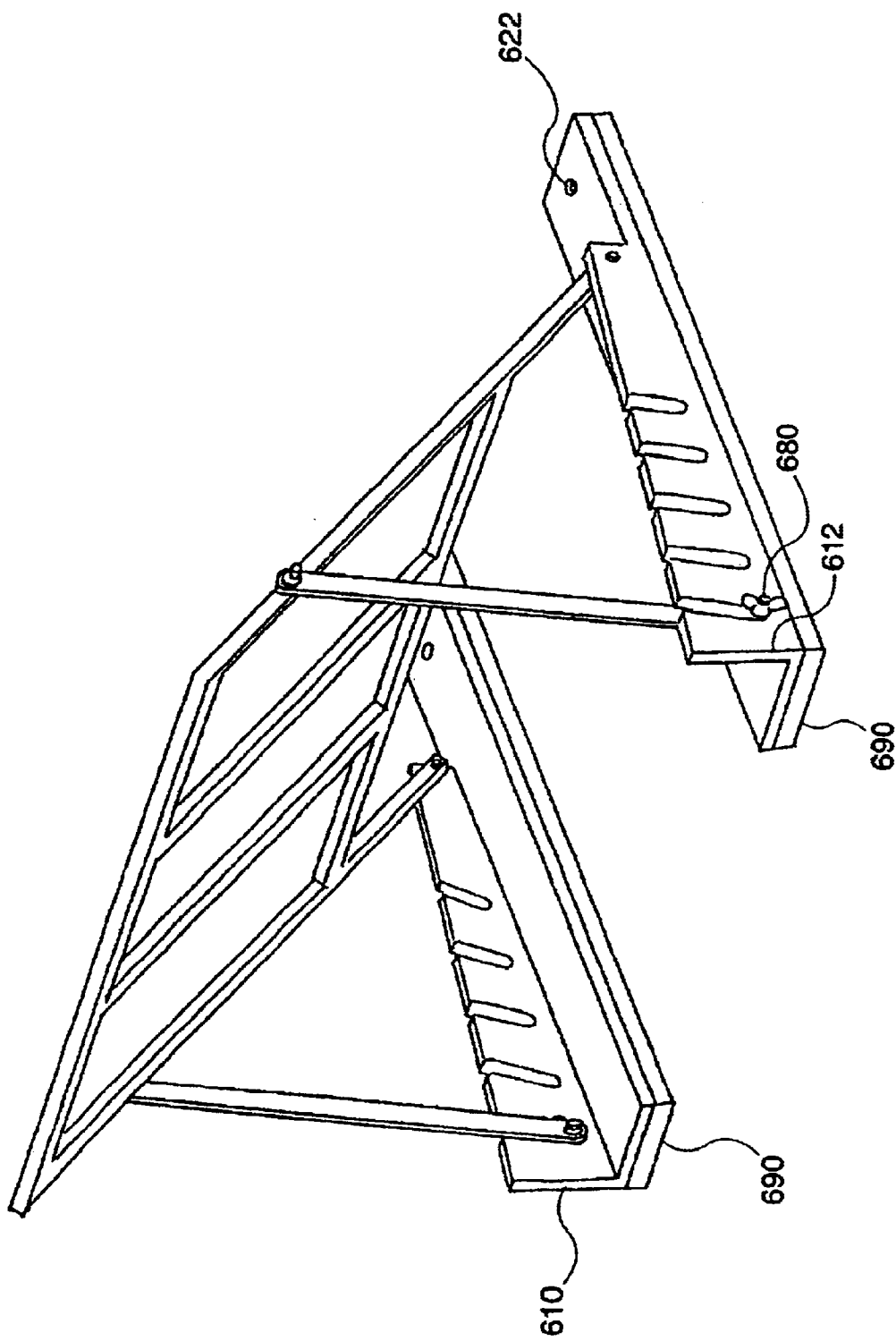
FIG. 24 is perspective view of an alternative version of the apparatus of FIG. 23.

FIG. 23 is a perspective view of another embodiment of the material support of the present invention, in which two channels having U-shaped cross-sections may be provided, each with an adjustable support pole. FIG. 24 is an alternative version of the apparatus of FIG. 23.

Referring to FIGS. 23 and 24, a lightweight adjustable material and supply support is provided which may be marketed under the name ROOFSTOCKER™, a trademark of the inventor. In this variation, two channels 510, 512 having U-shaped cross-sections may be provided, each with an adjustable support pole 515, and 516, respectively.

Connected to the support poles though a pivot joint 550 is an adjustable platform 518 which has its other end hinged to the channels 510, 512, through pivot 520. The support or poles 515, 516 may be adjusted to achieve a suitable angle of adjustment corresponding to roof incline by inserting bar 514 into one of notches 530. Notches 530 may be provided at intervals corresponding to standard roof pitches.

Platform 518 may be provided as a planar table, with one or more edge rails to prevent materials from falling off the platform. The platform may be sized to accommodate a standard package size of shingles or a shingle "square". Roofing materials stored on a roof may be stored on the platform in a level manner and thus reduce the likelihood that such materials will fall off. Smaller versions of the platform may be provided for holding tools and the like, and specialized version may be provided for specific applications such as holding a 5-gallon IGLOO™ water cooler.

In the particular version of this embodiment, the device is designed with light weight construction in mind. Platform 518 may be made of tubing or may be provided with lightening holes. The use of the channels 510, 512 (as opposed to a flat base) further reduces weight. Overall weight of the apparatus may be reduced as much as 40%. Nailing holes 522 may be provided to secure the apparatus to a roof.

In the embodiment of FIG. 24, L-shaped channels 610, 612 are provided in place of the U-shaped channels of FIG.

23. In addition, polyurethane foam layers 690 may be provided in addition to nailing holes 622. Note also the alternative use of wingnuts 680 to secure the legs to the slots.

Figure 25:
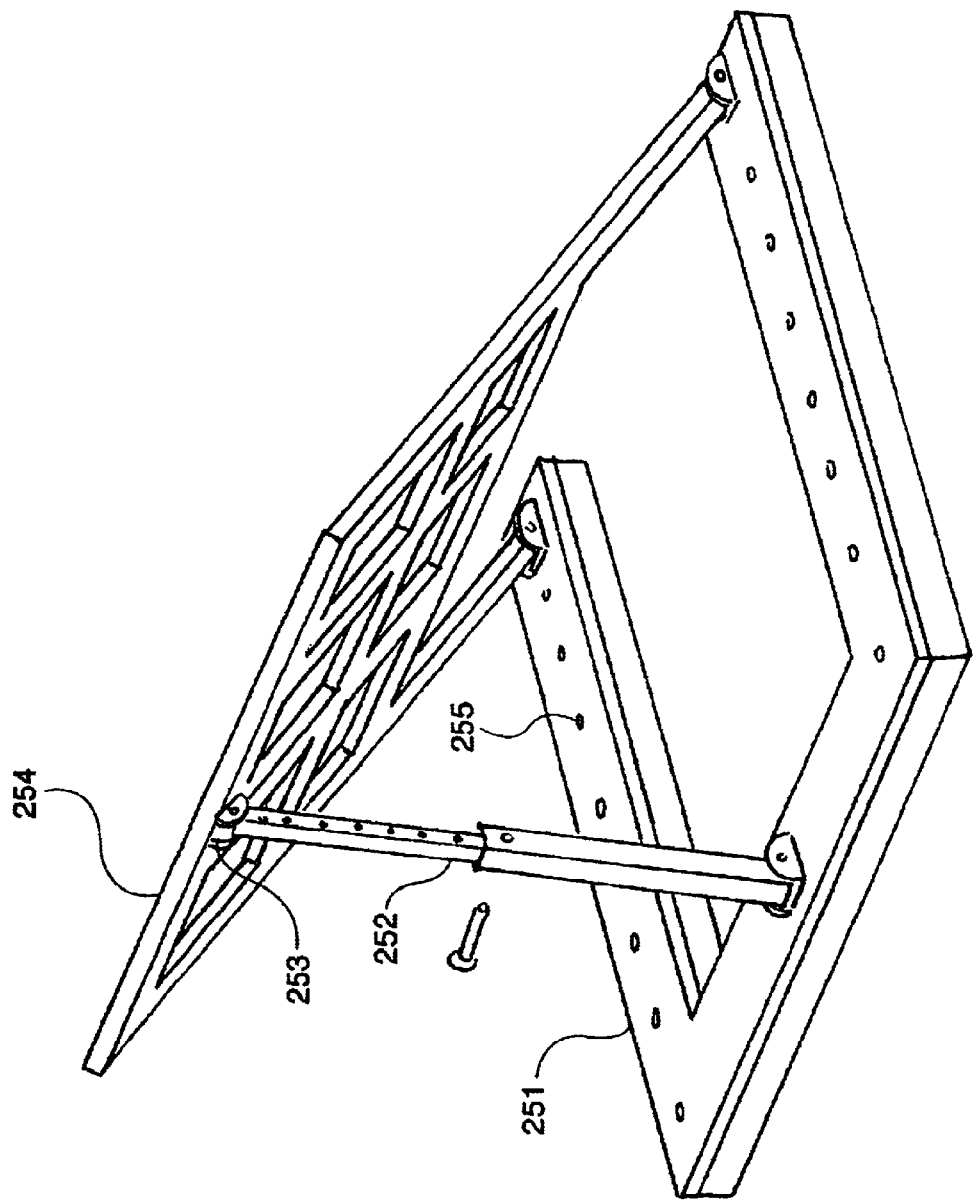
FIG. 25 is a perspective view of another embodiment of the material holder of the present invention.
Figure 26:
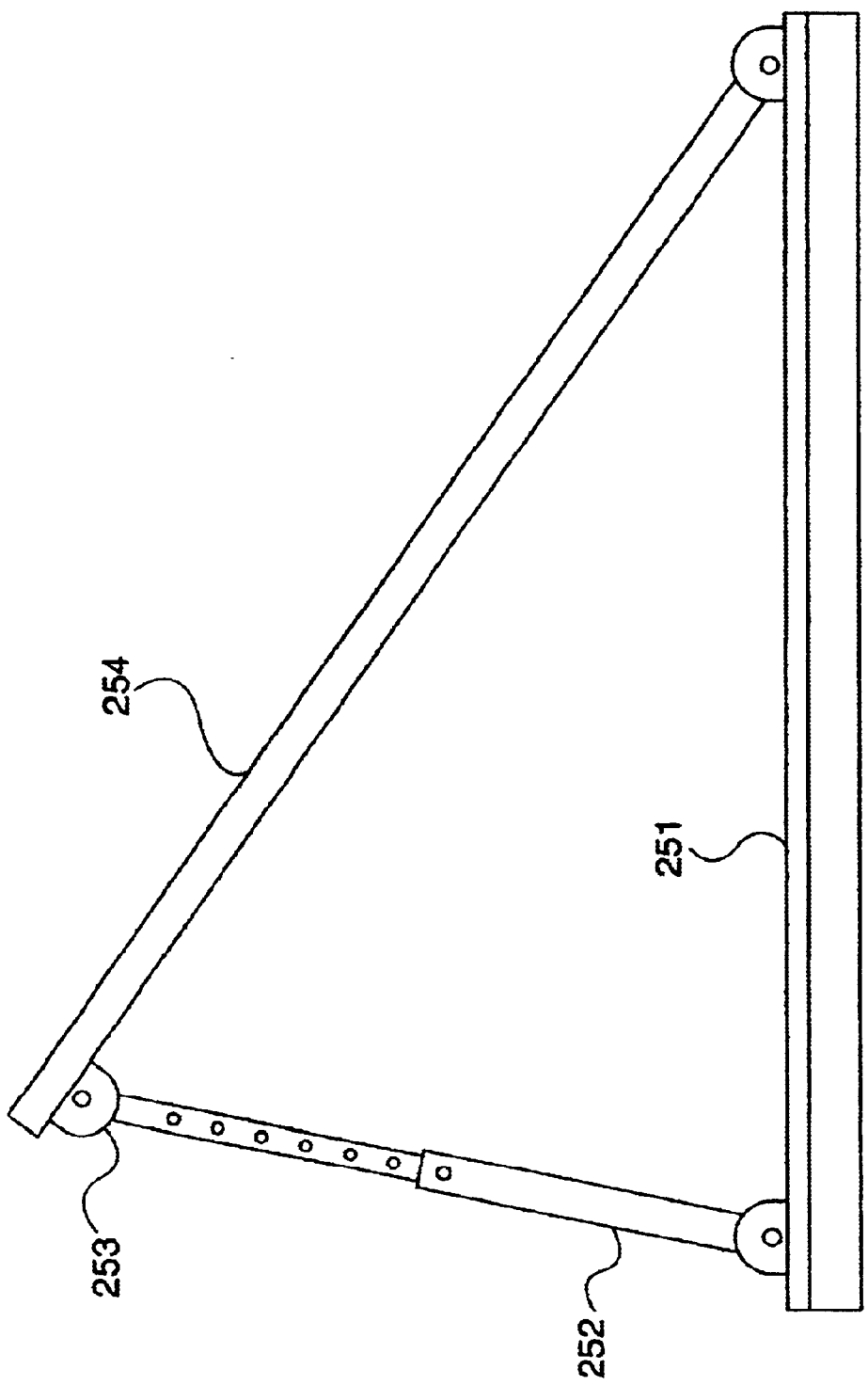
FIG. 26 is a side view of the embodiment of FIG. 25.

FIG. 25 is a perspective view of the second embodiment of the present invention. FIG. 26 is a side view of the second embodiment of the present invention. In a second embodiment of the present invention, a lightweight adjustable material and supply support is provided which may be marketed under the name ROOFSTOCKER™, a trademark of the inventor. A U-shaped backing plate is provided with a one or more adjustable support poles. Connected to the support pole though a pivot joint is an adjustable platform which has its other end hinged to the backing plate. The support pole (or poles) may be adjusted to achieve a suitable angle of adjustment corresponding to roof incline.

The platform may be provided as a planar table, with one or more edge rails to prevent materials from falling off the platform. The platform may be sized to accommodate a standard package size of shingles or a shingle "square". Roofing materials stored on a roof may be stored on the platform in a level manner and thus reduce the likelihood that such materials will fall off. Smaller versions of the platform may be provided for holding tools and the like, and specialized version may be provided for specific applications such as holding a 5-gallon IGLOO™ water cooler.

In the particular version of this embodiment, the device is designed with light weight construction in mind. The platform may be made of tubing or may be provided with lightening holes. The use of a U-shaped base (as opposed to a flat base) further reduces weight. Overall weight of the apparatus may be reduced as much as 40%.

Nail holes are provided on the U-shapes channel to allow the device to be secured to a roof by use of hardened nails, screws, or the like. The size of the U-shaped portion corresponds to the spacing of roof trusses.

UTILITYMATE™ ROOFER'S TOOLBOX holds enough materials to complete roof repairs and most counter flashing in a one-step process, increasing worker productivity by eliminating repeated trips for more supplies. The roofer's toolbox can be placed on a pitched roof without required fastening devices such as nails or screws, to prevent it from sliding off the roof. It is lightweight and can be freely moved to any location on the roof. In the preferred embodiment it is approximately 38" in length and 12" in width. The UTILITYMATE™ ROOFER'S TOOLBOX will now be described in connection with FIGS. 27–32.

Figure 27:
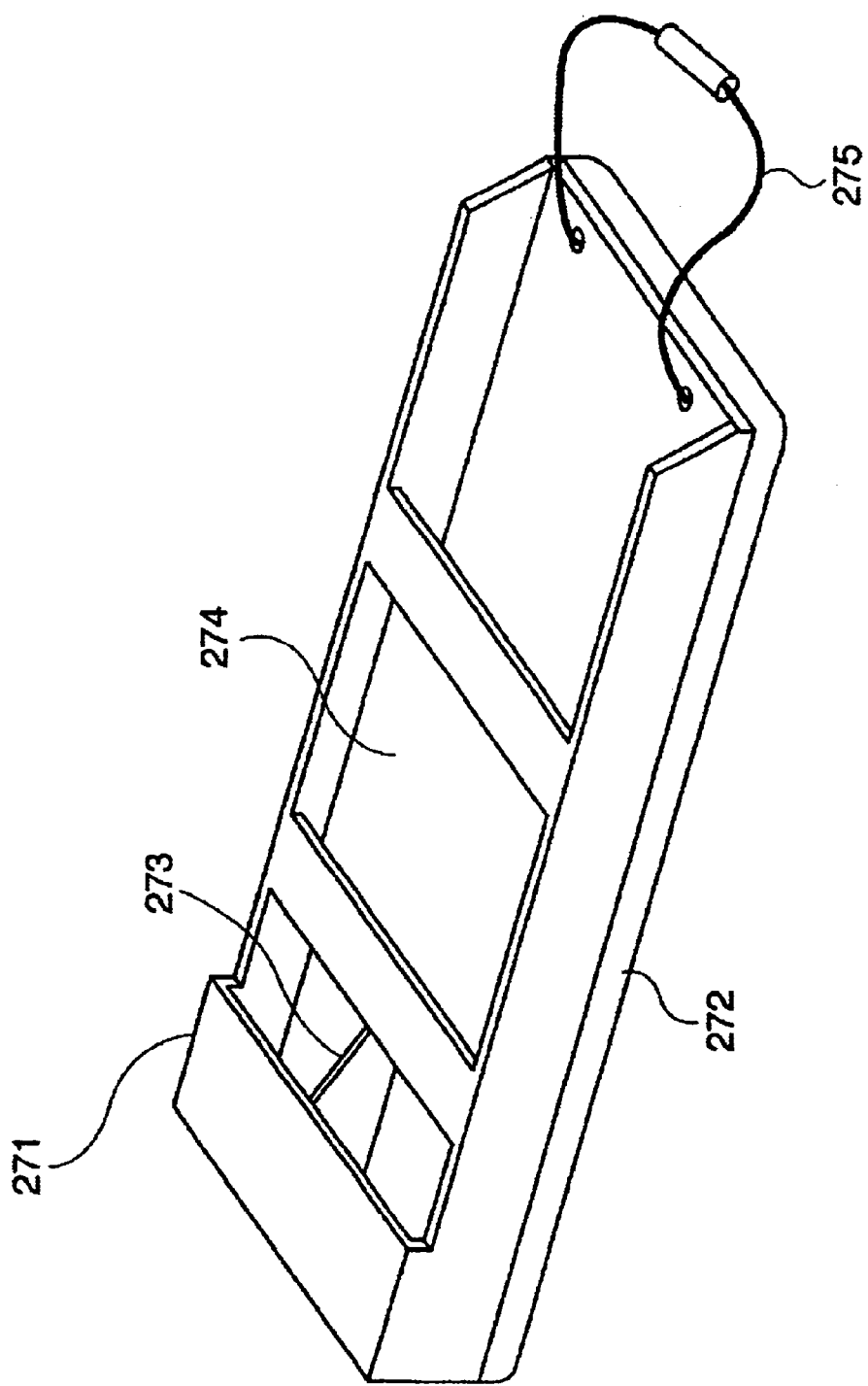
FIG. 27 is a perspective view of one embodiment of the material and supply tray of the present invention.

FIG. 27 is a perspective view of the material and supply tray of the third embodiment of the present invention. In the third embodiment of the present invention, which may be marketed under the name UTILITYMATE™, a trademark of the inventor, a tool tray 271 is provided which may be backed with a layer of foam 272 to prevent the tray from slipping off the roof, while allowing the tray to be freely moved along and up and down the roof, as work progresses.

The tool tray may comprise a flat lower portion backed with a layer of medium density expanded polyurethane foam 272, the type commonly sold for upholstery in upholstery and fabric shops, although other types of foam or elastic material may be used without departing from the spirit and scope of the present invention. A number of compartments with or without dividers 273 may be provided in the tray for holding nails, shingles, tubes of roofing compound, tools, and the like.

Lower compartments may be divided by divider 273 for holding nails, small tools, and the like. The middle compartment may be lined with another layer of foam 274 in order to secure tubes of roofing mastic, cement, caulk, or the like. Such tubes are constantly tending to roll off a pitched roof, and the use of the foam secures such tubes in the center compartment regardless of whether one tube or a multiple number of tubes are present. A nylon rope and handle 275 may be provided to allow the tray to be carried up a ladder and also slid across the roof surface.

Figure 28:
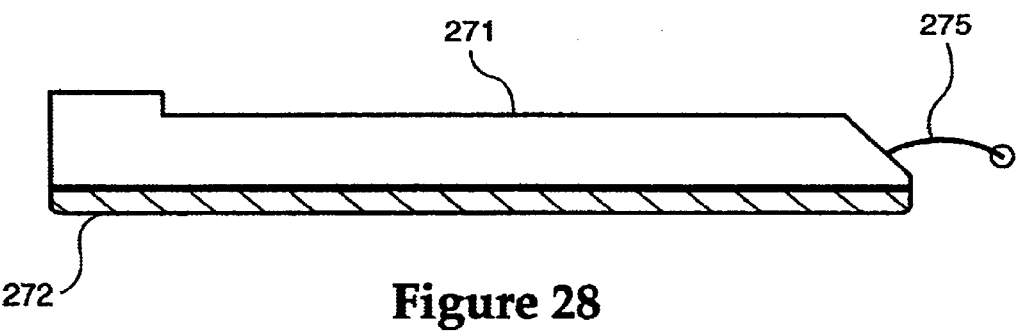
FIG. 28 is a side view of the material and supply tray of FIG. 27.

FIG. 28 is a side view of the material and supply tray of the third embodiment of the present invention. This side view better illustrates foam layer 272.

Figure 29:
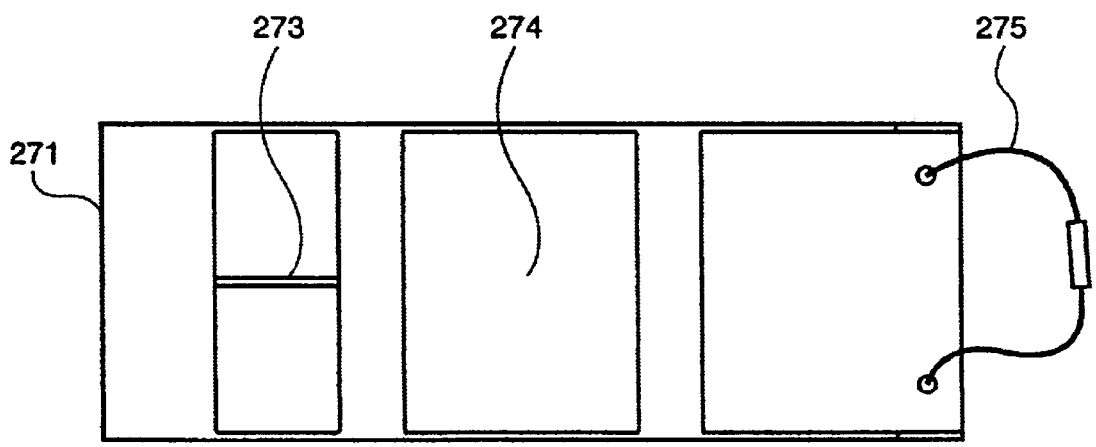
FIG. 29 is a top view of the material and supply tray of the FIG. 27.
Figure 30:
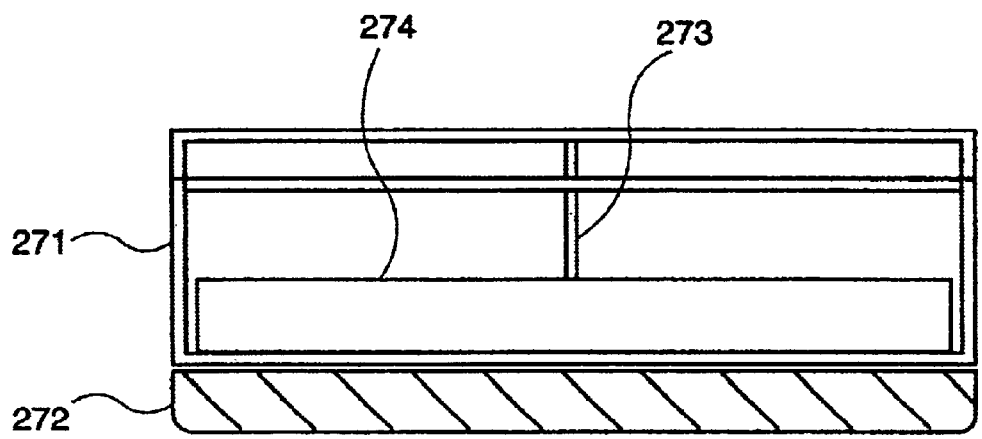
FIG. 30 is an end view of one end of the material and supply tray of FIG. 27.
Figure 31:
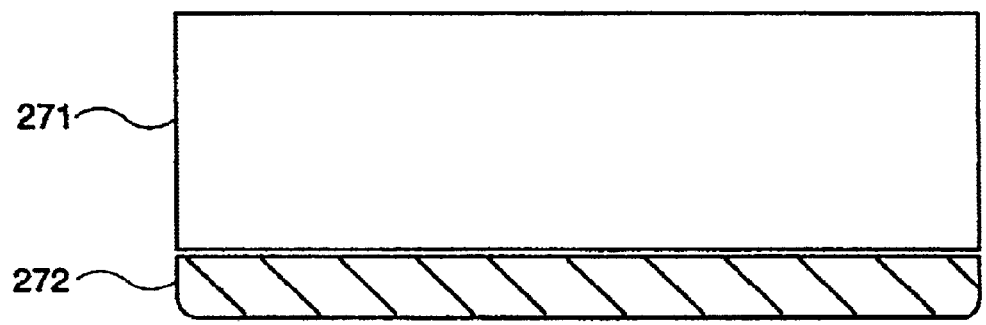
FIG. 31 is an end view of another end of the material and supply tray of FIG. 27.

FIG. 29 is a top view of the material and supply tray of the third embodiment of the present invention. FIG. 30 is an end view of one end of the material and supply tray of the third embodiment of the present invention. This view better illustrates the arrangement of the compartments and the interior foam layer 274. FIG. 31 is an end view of another end of the material and supply tray of the third embodiment of the present invention.

Figure 32:
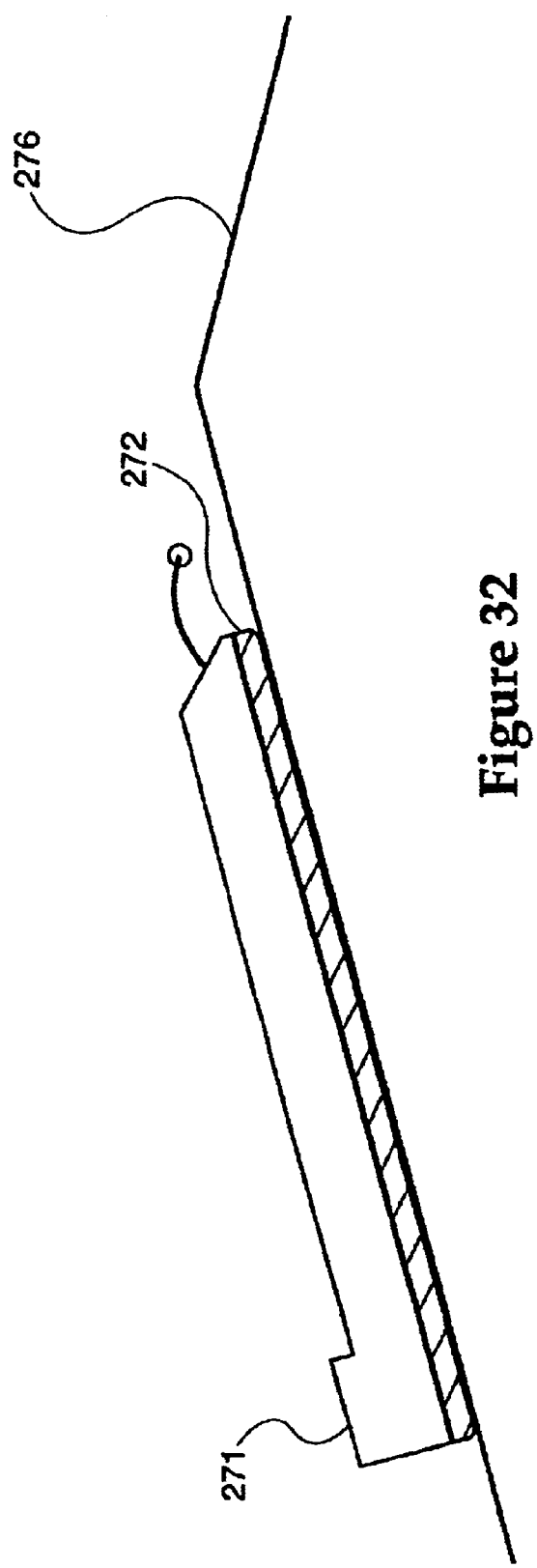
FIG. 32 is a side view of the material and supply tray of FIG. 27, illustrating the invention in place on a roof.

FIG. 32 is a side view of the material and supply tray of the third embodiment of the present invention, illustrating the invention in place on a roof. When placed on a roof 276 of reasonable pitch, the foam layer 272 matches the contours of the rough roofing surface, providing increased surface area in which to grip the roof. As a result, tray 271 will not tend to slip or slide off of roof 276 as would a tray with a smooth lower surface (e.g., metal or wood tool tray).

The material and supply tray of FIGS. 27–32 may be suitably modified for working with slate. A specialized version may be provided for slate work and marketed under the name SLATEMATE™, a trademark of the present inventor. Working with slate presents special problems for a roofer. Specialized slate nails must be used and slates need to be carefully stored and moved, lest they crack. Also, specialized slate tools may be required for slate work. Slate work is time consuming and thus expensive. Any time saved on a slate job can significantly reduce the costs of using slate as a roofing material.

The SLATEMATE™ may be sized slightly larger than the version in FIGS. 27–32. The unit may be made, for example, 28 inches wide and 30 inches tall to accommodate slate "shingles" as well as slate nails. The unit may be lined with foam to secure the slates as well as to help prevent them from cracking.

An even longer version of the SLATEMATE™ may be provided with an external holder for a slate tool, which is used for removing slate nails. Such an apparatus may allow a roofer to move about a slate roof, repairing broken slates, without having to make multiple trips to a toolbox and without having to reach down to a Prior Art toolbox on a scaffolding or the like. The SLATEMATE™ can be placed right on the roof, adjacent or next to the place being repaired or installed. Little reaching is thus required, improving the worksite ergonomics considerably.

SHINGLE SLED™ is an aluminum sled which may be provided with wheels. SHINGLE SLED™ may hold an entire bundle of shingles in place during installation. Optional wheels allow the unit to be moved with ease as work progresses, saving time and money. IN the preferred embodiment, SHINGLE SLED™ is approximately 41 inches in length and 13 inches wide. SHINGLE SLED™ will now be described in more detail in connection with FIGS. 33–39.

Figure 33:
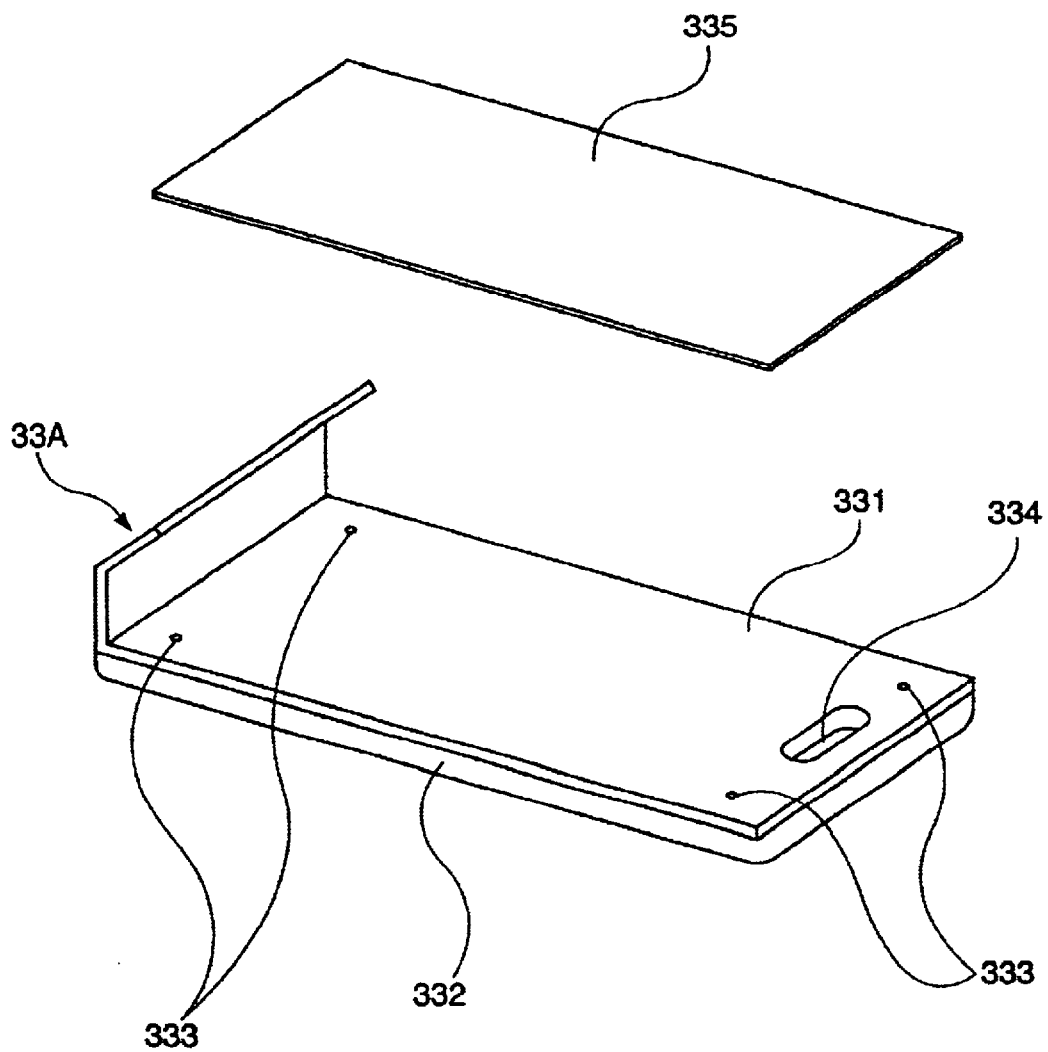
FIG. 33 is a perspective view of a material holding apparatus of the present invention.

FIG. 33 is a perspective view of a material holding apparatus of the present invention. In this embodiment of the present invention, which may also be marketed under the name UTILITYMATE™, a trademark of the inventor, a tool tray 1 is provided which may be backed with a layer of foam 332 to prevent the tray from slipping off the roof, while allowing the tray to be freely moved along and up and down the roof, as work progresses. The tool tray may comprise a flat lower portion 331 backed with a layer of medium density expanded polyurethane foam 332, the type commonly sold for upholstery in upholstery and fabric shops. Other types of elastic foam may be used within the spirit and scope of the present invention.

A handle hole 334 may be provided to allow the tray to be moved readily from one place to another. A lip 33A may be formed to prevent materials (e.g., shingle 335) from falling off tray 331. Hole 333 may be provided for nailing or to secure foam 332 to tray 331. Note that foam 332 may be attached to tray 331 via a velcro backing or the like to facilitate replacement of foam 332 in the event foam 332 becomes worn from use on a roof.

Figure 34:
FIG. 34 is a side view of a portion of material holding apparatus of the present invention.
Figure 35:
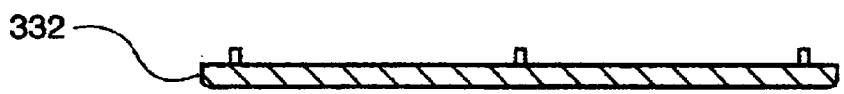
FIG. 35 is a side view of a portion of a material holding apparatus of the present invention.
Figure 36:
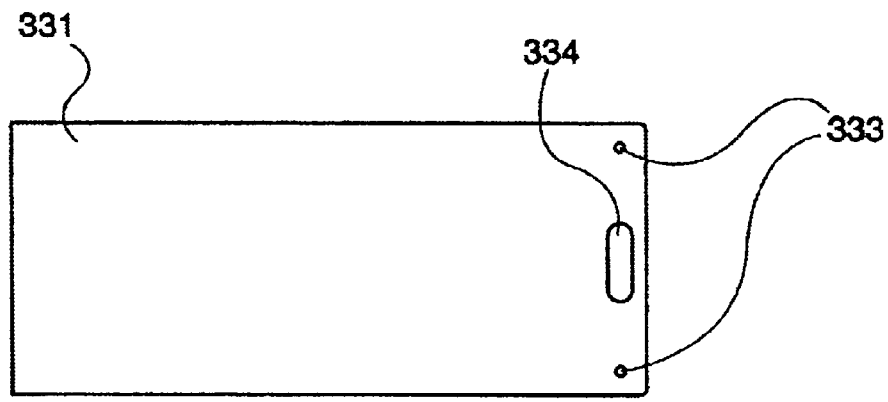
FIG. 36 is a top view of a material holding apparatus of the present invention.
Figure 37:
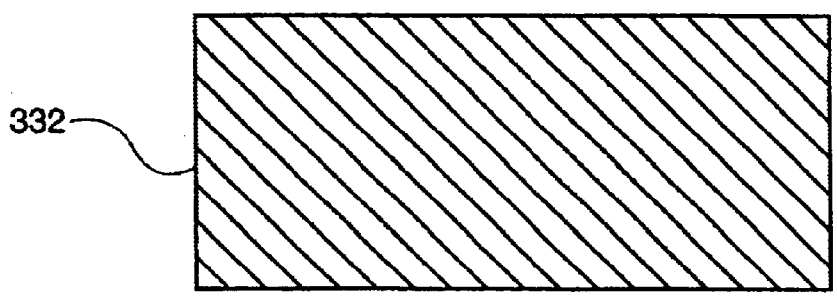
FIG. 37 is a bottom view of a material holding apparatus of the present invention.

FIG. 34 is a side view of a portion of material holding apparatus of the present invention showing tray 331. FIG. 35 is a side view of a portion of a material holding apparatus of the present invention showing foam layer 332. FIG. 36 is a top view of a material holding apparatus of the present invention. FIG. 37 is a bottom view of a material holding apparatus of the present invention.

Figure 38:
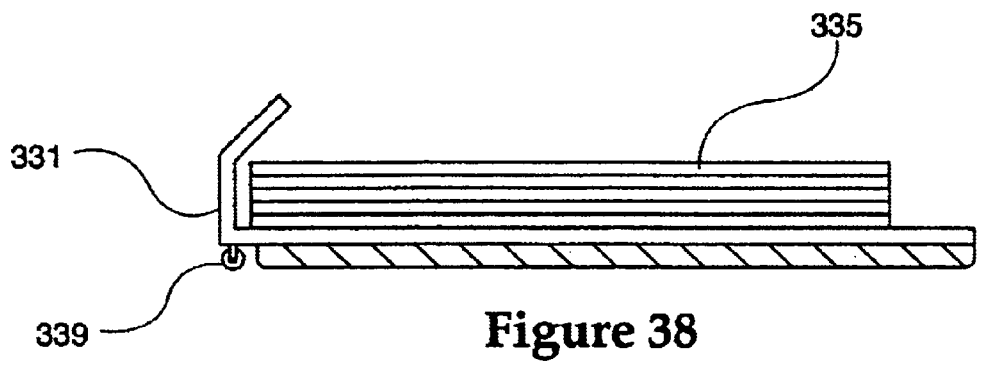
FIG. 38 is a side view of a material holding apparatus of the present invention showing materials loaded on the device.
Figure 39:
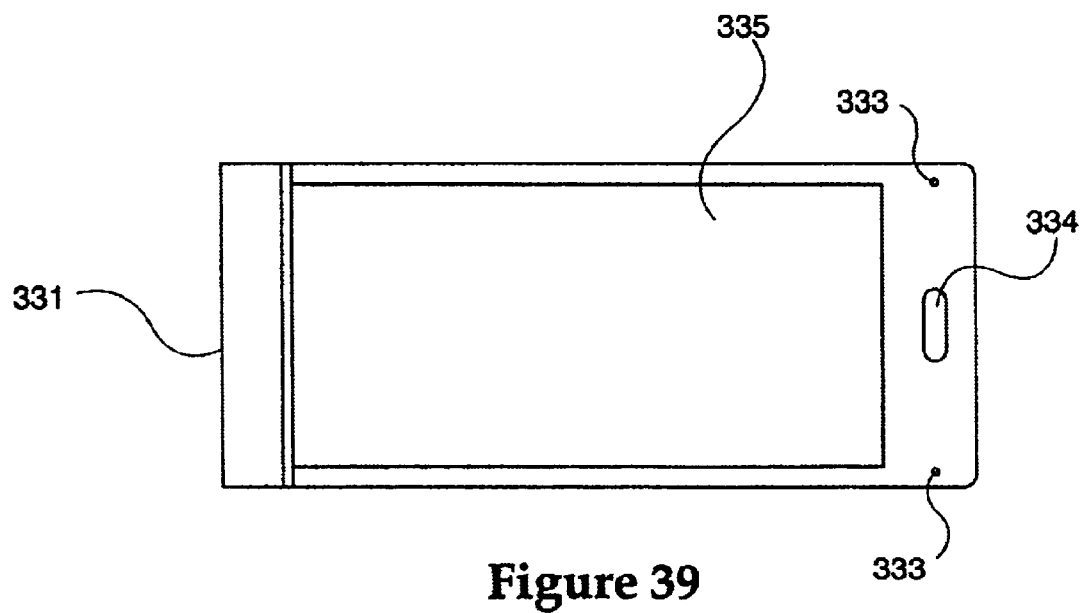
FIG. 39 is a top view of a material holding apparatus of the present invention showing materials loaded on the device.

FIG. 38 is a side view of a material holding apparatus of the present invention showing shingles 335 loaded on the device. FIG. 38 also illustrates how optional wheels or rollers 339 may be mounted to the underside of the device at one end to allow the opposite end to be lifted and the entire assembly rolled across a roof surface. FIG. 39 is a top view of a material holding apparatus of the present invention showing materials loaded on the device.

SHINGLESTOCKER™ provides a means for securing bundles of shingles on a roof in a manner which prevents them from blowing or falling off. A bundle of shingles may be placed inside the C-channel shape of SHINGLESTOCKER™ and additional shingle bundles stacked on top of the device, preferably at the peak of a roof, where two of such devices are provided, on one each side of the peak. The SHINGLESTOCKER™ will now be described in connection with FIGS. 40–43.

FIG. 40 is a perspective view of the SHINGLESTOCKER™ of the present invention. FIG. 41 is another perspective view of a portion of the SHINGLESTOCKER™ of the present invention from the reverse side of FIG. 40. Shingles in the Prior art may be stocked to a roof structure by placing shingle packages on either side of a roof peak, securing the packages with nails or a 2"×4" nailed to the roof structure, and then stacking the shingle packages atop the two packages into a square or rectangular pile. In more than one instance, the weight of the shingles causes the lower packages to come unnailed or even pull up the 2"×4"'s and the whole pile falls to the ground.

Figure 42:
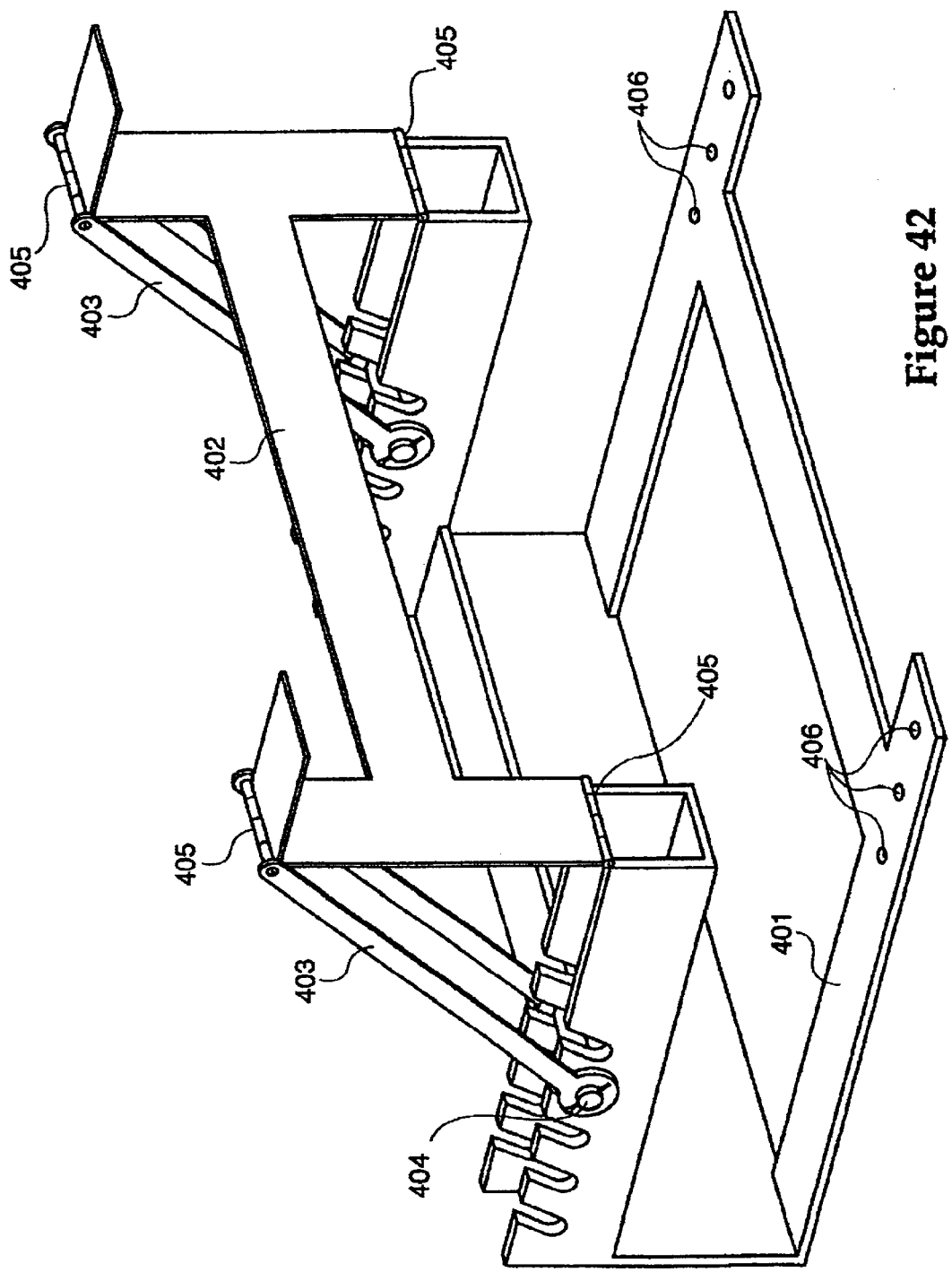
FIG. 42 is another perspective view of the SHINGLESTOCKER™ of the present invention.
Figure 43:
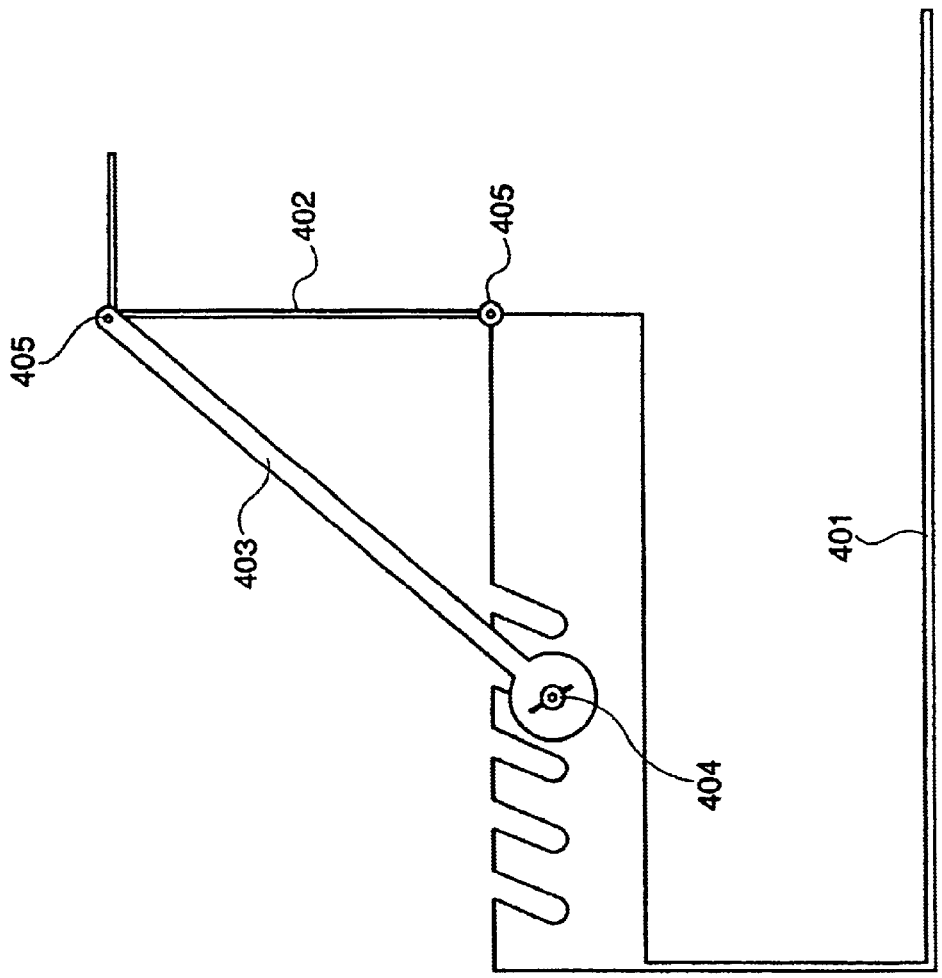
FIG. 43 is a side view of the SHINGLESTOCKER™ of the present invention.

In the embodiment of FIGS. 40–43, a bracket is provided to secure these lower stacks to the roof structure. FIG. 42 is a prospective view of the SHINGLESTOCKER™ of the present invention. Nail holes 406 may be provided 24" or 16" on center (or other roof joist width). A pair of these brackets may be secured to either side of the roof peak and a package of shingles placed therein. Support 402 may be adjusted for roof pitch via arms 403 in notches 404 pivoted by hinges 405. Once in place on either side of the roof peak, the brackets provide a flat and stable platform for additional packages of shingles. FIG. 43 is a side view of the SHINGLESTOCKER™ of the present invention.

ROOFER'S BRACKET™ is a one-piece bracket designed to secure roofing materials and scaffolding boards to any pitched roof. ROOFER'S BRACKET™ can be nailed to all roof truss systems, including 16 inch on center, 18 inch on center, and 2 foot on center. This bracket is very versatile and can be used to safely secure roofing materials to the peak of a roof, or two together can serve as a scaffolding system for installing a roof. This product insures a safe environment for employees and customers at low cost. The ROOFER'S BRACKET™ is the safest product of its kind in the roofing industry as it is designed to be nailed to two trusses versus the standard one truss system. In the preferred embodiment it is 34 inches in length and 10.5 inches in width. The ROOFER'S BRACKET™ will now be described in connection with FIGS. 44–47.

Figure 44:
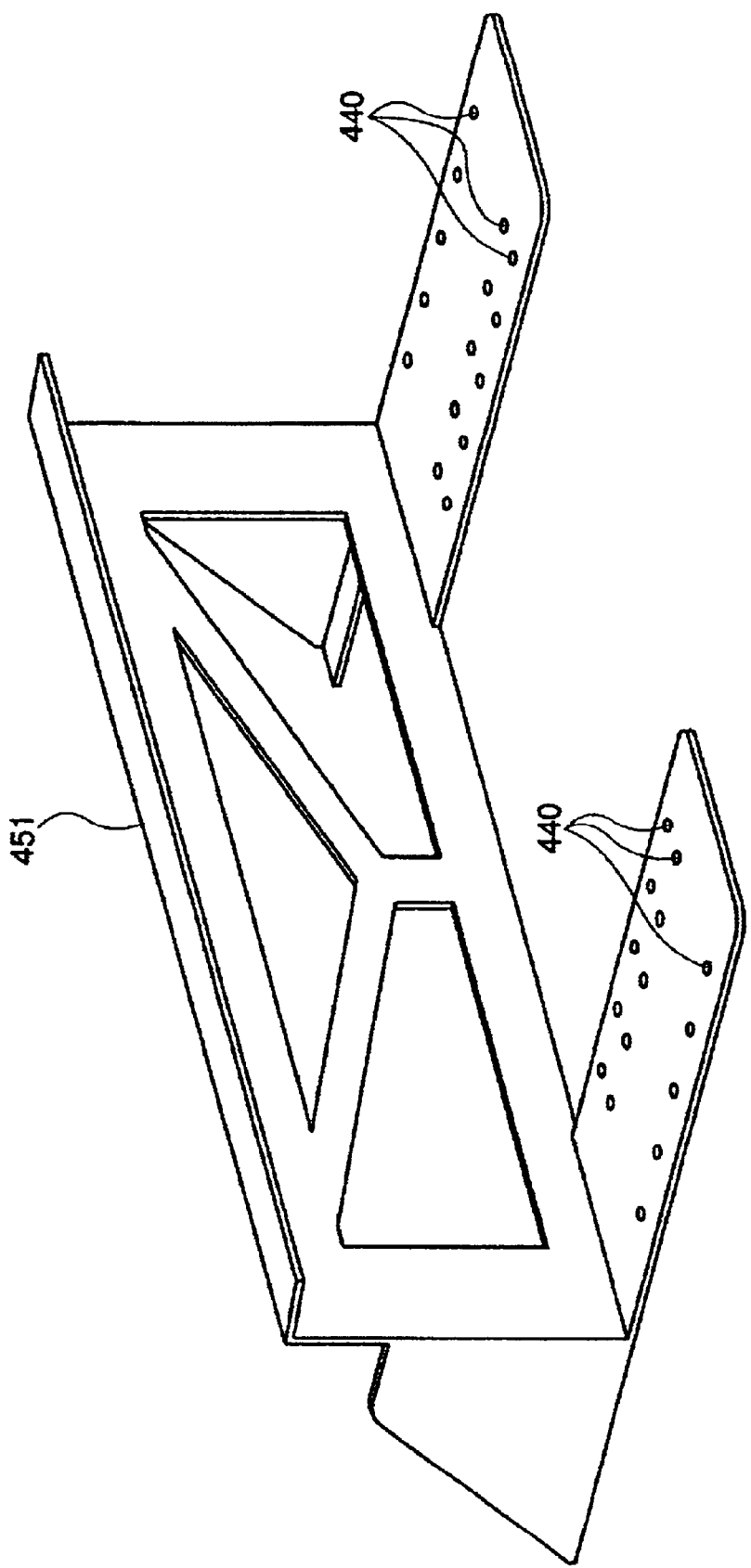
FIG. 44 is a perspective view of the ROOFER'S BRACKET™ of the present invention.
Figure 45:
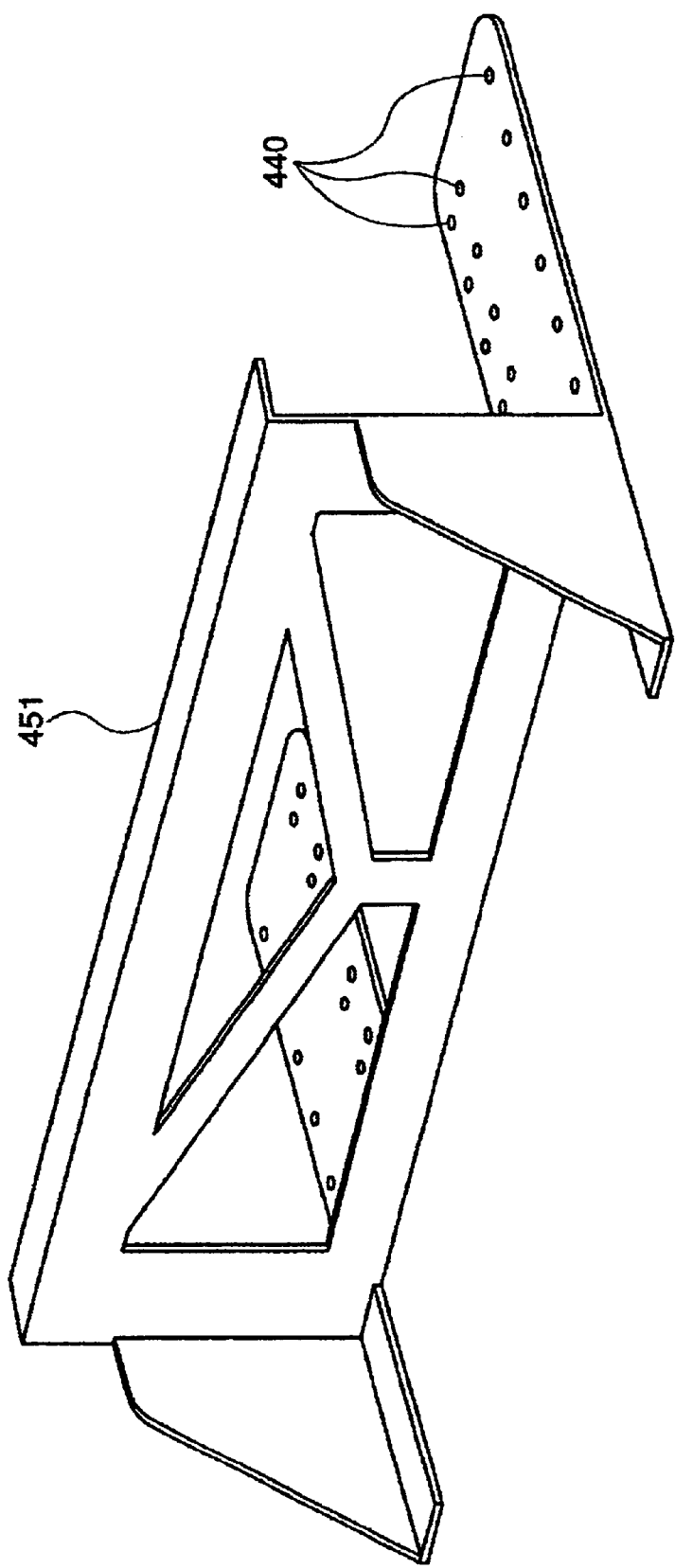
FIG. 45 is another perspective view of the ROOFER'S BRACKET™ of the present invention.
Figure 46:
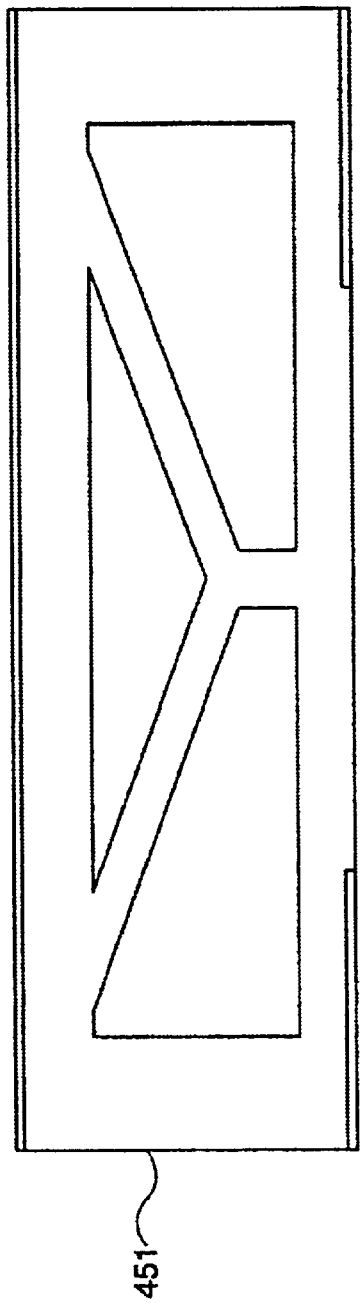
FIG. 46 is a front view of the ROOFER'S BRACKET™ of the present invention.
Figure 47:
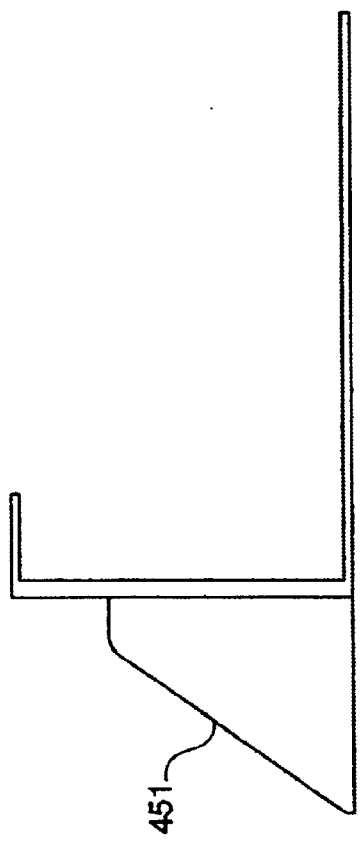
FIG. 47 is a side view of the ROOFER'S BRACKET™ the present invention.

FIG. 44 is a perspective view of the ROOFER'S BRACKET™ of the present invention. FIG. 45 is another perspective view of the ROOFER'S BRACKET™ of the present invention. FIG. 46 is a front view of the ROOFER'S BRACKET™ of the present invention. FIG. 47 is a side view of the ROOFER'S BRACKET™ of the present invention.

The ROOFER'S BRACKET™ apparatus may be used in a similar manner to the apparatus of FIGS. 40–43. Multiple nail holes 440 may be provided at different roof joist spacings (e.g., 16, 18, 20 inches) so that the devices can be readily secured to roof trusses with a few nails or screws. The apparatus may be re-sized for cedar or other type shingles, as well as traditional asphalt (fiberglass) shingles, and moreover is not provided with an adjustable hinging mechanism. Once one bracket is placed on either side of a roof peak, a package or bundle of shingles may be placed in the bracket. Additional bundles of shingles may be stacked in a square or rectangle atop these shingles.

LADDER BRACKET™ is a one piece bracket designed to secure extension ladders to any pitched roof. LADDER BRACKET™ eliminates the need to set up scaffolding when doing roof repairs or working on steep pitched roofs. LADDER BRACKET™ can be moved quickly to new work areas and is safer to use than nailed wood. It holds the ladder securely so it can't jump out of or bounce off its footing. In the preferred embodiment, LADDER BRACKET™ is 34 inches in length and 6.5 inches wide. LADDER BRACKET™ will be described in more detail in connection with FIG. 48.

Figure 48:
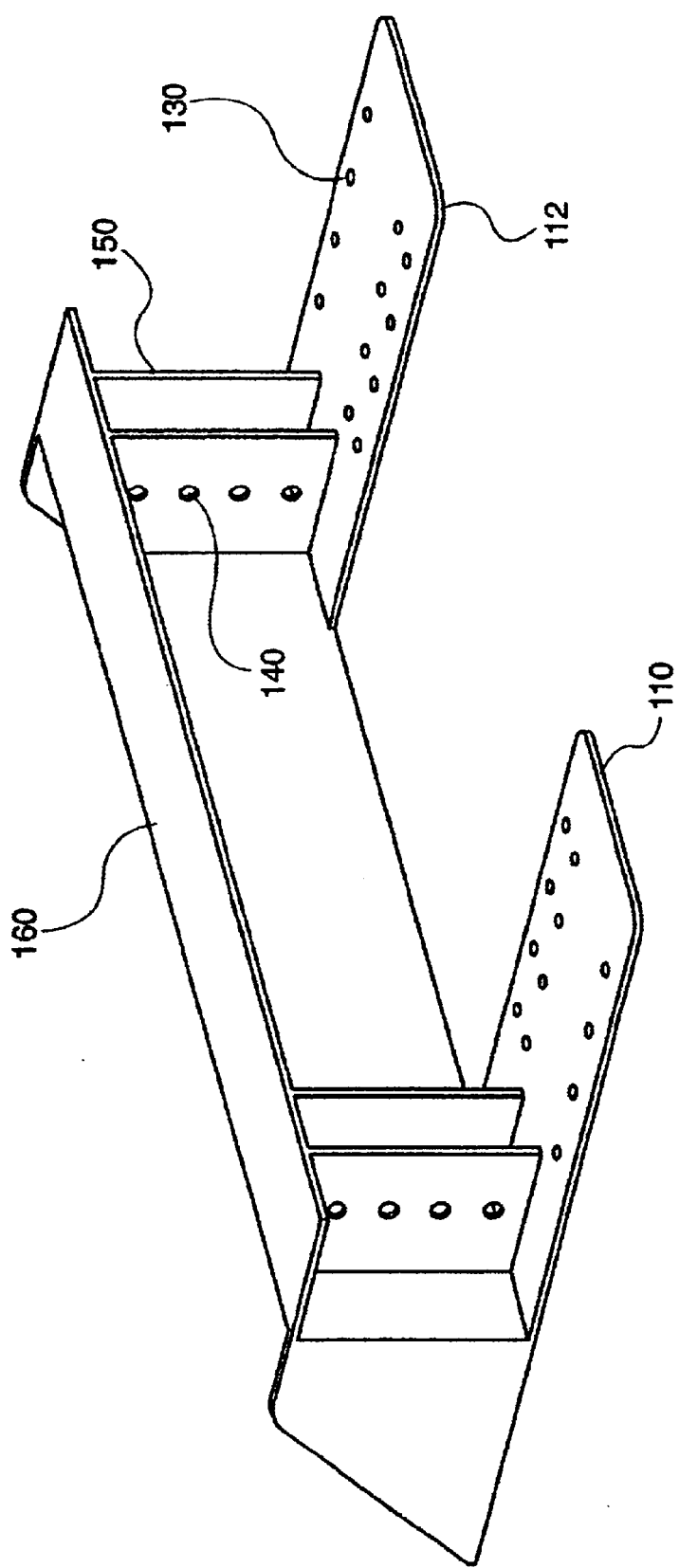
FIG. 48 is a perspective view of a roof ladder holder of the present invention.

FIG. 48 is a perspective view of a roof ladder holder of the present invention. In this embodiment, a bracket for holding a ladder on a sloped roof is provided. Ladder legs may be locked into the bracket using pins, bolts, or the like, such that the ladder will not fall off the sloped roof. This invention has particular application when a roofer needs to climb an existing roof to the peak when no safety rope, guide wire, scaffolding, or ladder is in place. The bracket may be nailed to the roof, a ladder slid up the roof and the bottom of the ladder secured to the ladder bracket.

Ladder bracket may comprise nailing plates 110 and 112 provided with nailing holes 130. A cross-beam 160 may connect nailing plates 110 and 130, which may be suitably spaced at an interval corresponding to roof truss spacings (e.g., 18", 24" or the like). Plates 150 may be provided on each nailing plate 110, 112, and attached to cross-beam 160. Plates 150 may be in pairs on each of nailing plate 110, 112, respectively, and each pair may be spaced apart by an amount slightly larger than a standard aluminum ladder size. Holes 140 may be provided to allow bolts or pins to be used to secure a ladder leg between plates 150.

The SUREFOOT™ series of products are designed to secure ladders to roofs, ground, walls, and the like, to prevent the numerous ladder injuries which occur every year. SUREFOOT™ products are a series of safety devices designed to secure all types of ladders used in all types of situations. These products are easily attached to ladders without the need of installing nuts and bolts or drilling into the ladders, and potentially weakening them. They can be quickly transferred from one ladder to another. SUREFOOTS™ equipment ensures stability, thereby preventing accidents, which can result in liability claims for the business owner. The SUREFOOTS™ products will now be described in connection with FIGS. 49–69.

Figure 49:
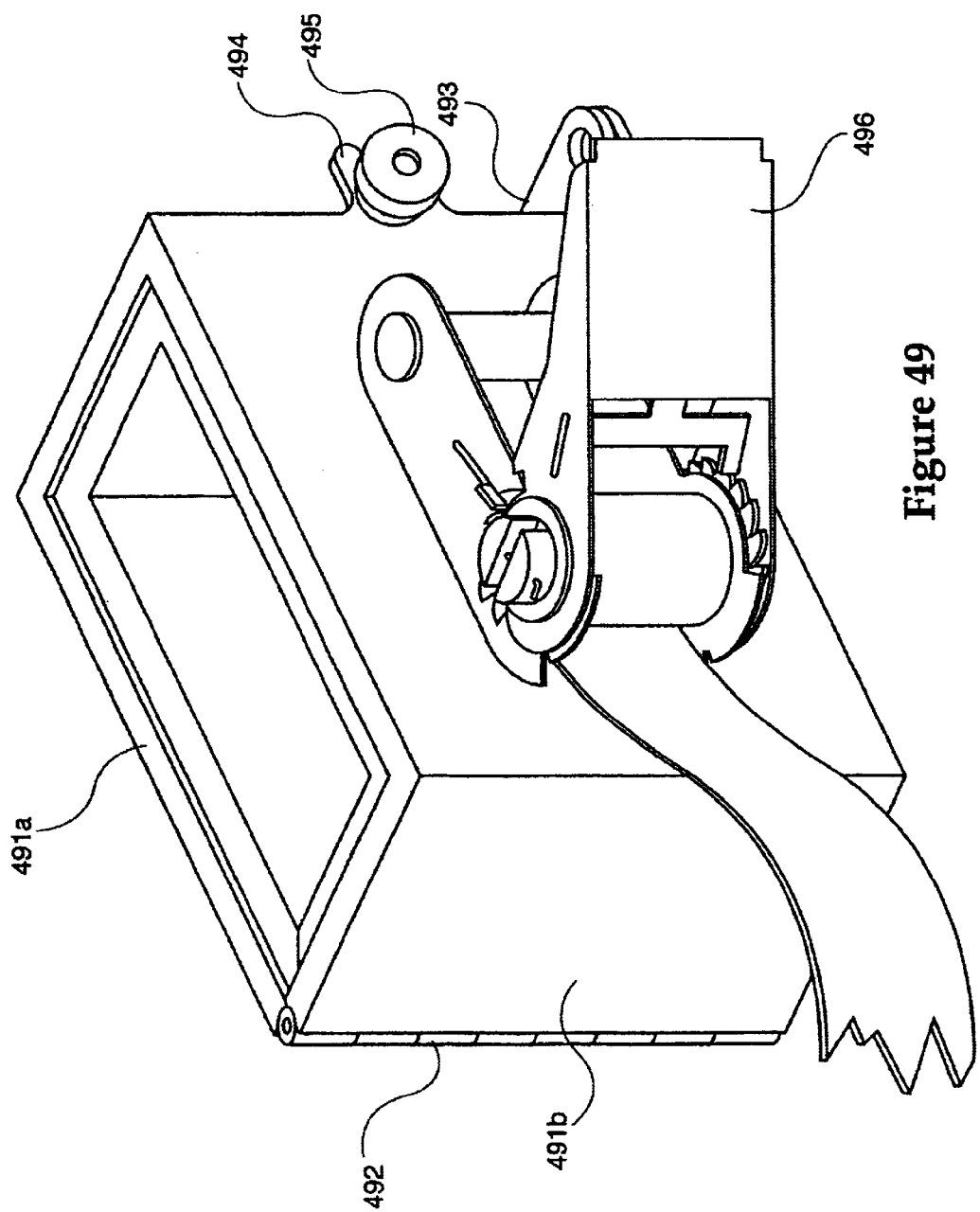
FIG. 49 is a perspective view of one version of the SUREFOOT™ embodiment of the present invention with a ratchet strap attached.

FIG. 49 is a perspective view of one version of the SUREFOOT™ embodiment of the present invention with a ratchet strap attached. The Sure-Foot in this embodiment may include a box clamp device encompassing parts 491*a* and 491*b* which may be wrapped around a ladder leg. The box clamp device 491*a*, 491*b* may be lined with foam rubber to securely grip various ladder leg sizes without damaging or marring the ladder leg.

A threaded shaft may be provided with knurled knob 495 to lock portion 491*a* to 491*b* around a ladder leg. Knurled knob 495 may be secured to the device via a small chain to prevent it being dropped or lost. Lock hasp 493 may be provided to securely lock the device to a ladder to prevent theft or to prevent an unauthorized worker from removing the device before work is complete.

Figure 50:
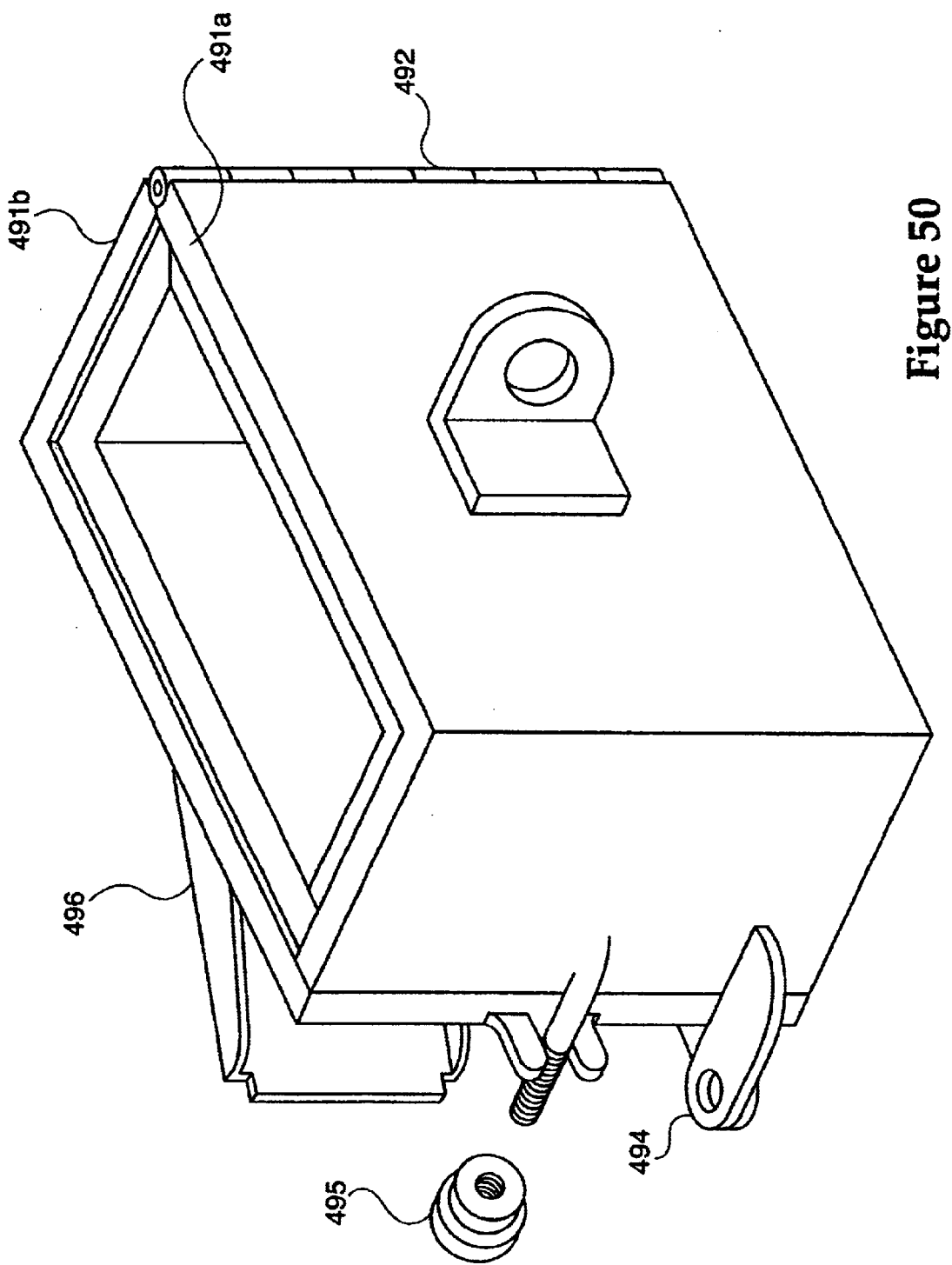
FIG. 50 is a perspective view of one version of the SUREFOOT™ embodiment of the present invention with a ratchet strap attached, showing the reverse side.
Figure 51:
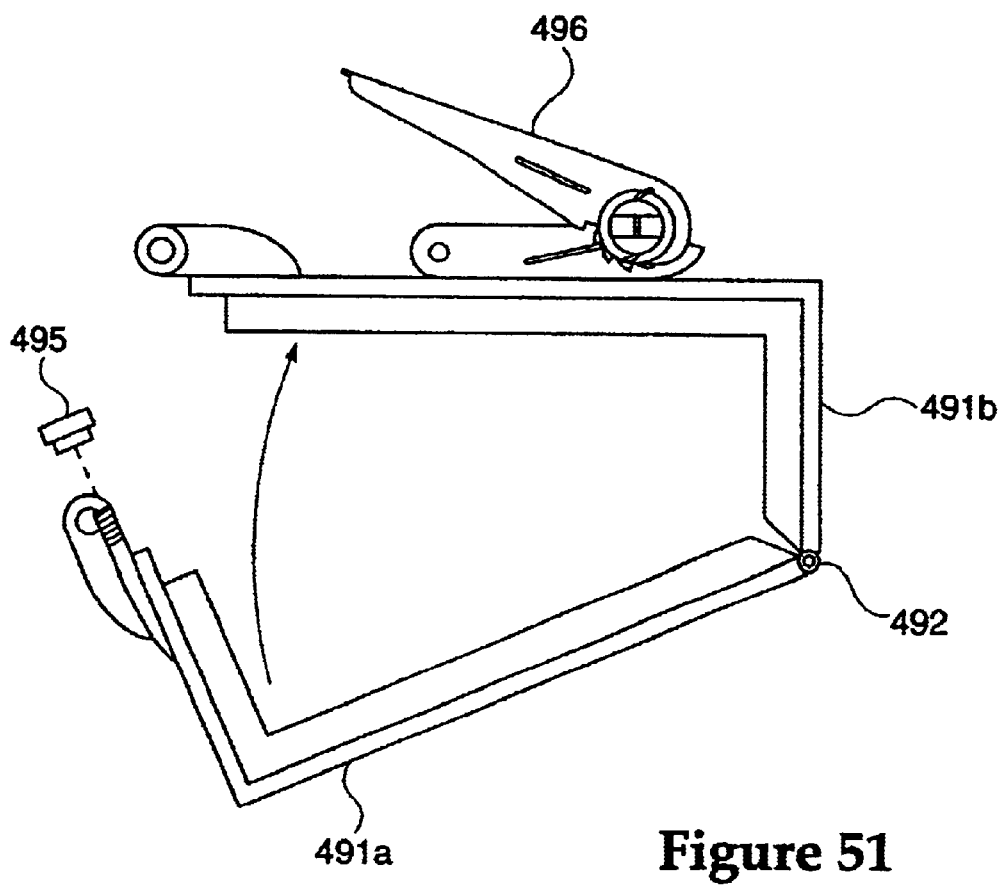
FIG. 51 is a top view of one version of the SUREFOOT™ embodiment of the present invention with a ratchet strap attached, shown open.

FIG. 50 is a perspective view of one version of the SUREFOOT™ embodiment of the present invention with a ratchet strap attached, showing the reverse side. FIG. 51 is a top view of one version of the SUREFOOT™ embodiment of the present invention with a ratchet strap attached, shown open. The ratchet strap mechanism is known in the art. The ratchet strap may be wound around a beam, telephone pole, girder, or attached to a nailing plate or the like. The ratchet strap mechanism may then be drawn tight to secure the ladder. The use of multiple devices on a ladder may secure it (e.g., one on each leg at the top of the ladder and/or at the bottom of the ladder).

Figure 52:
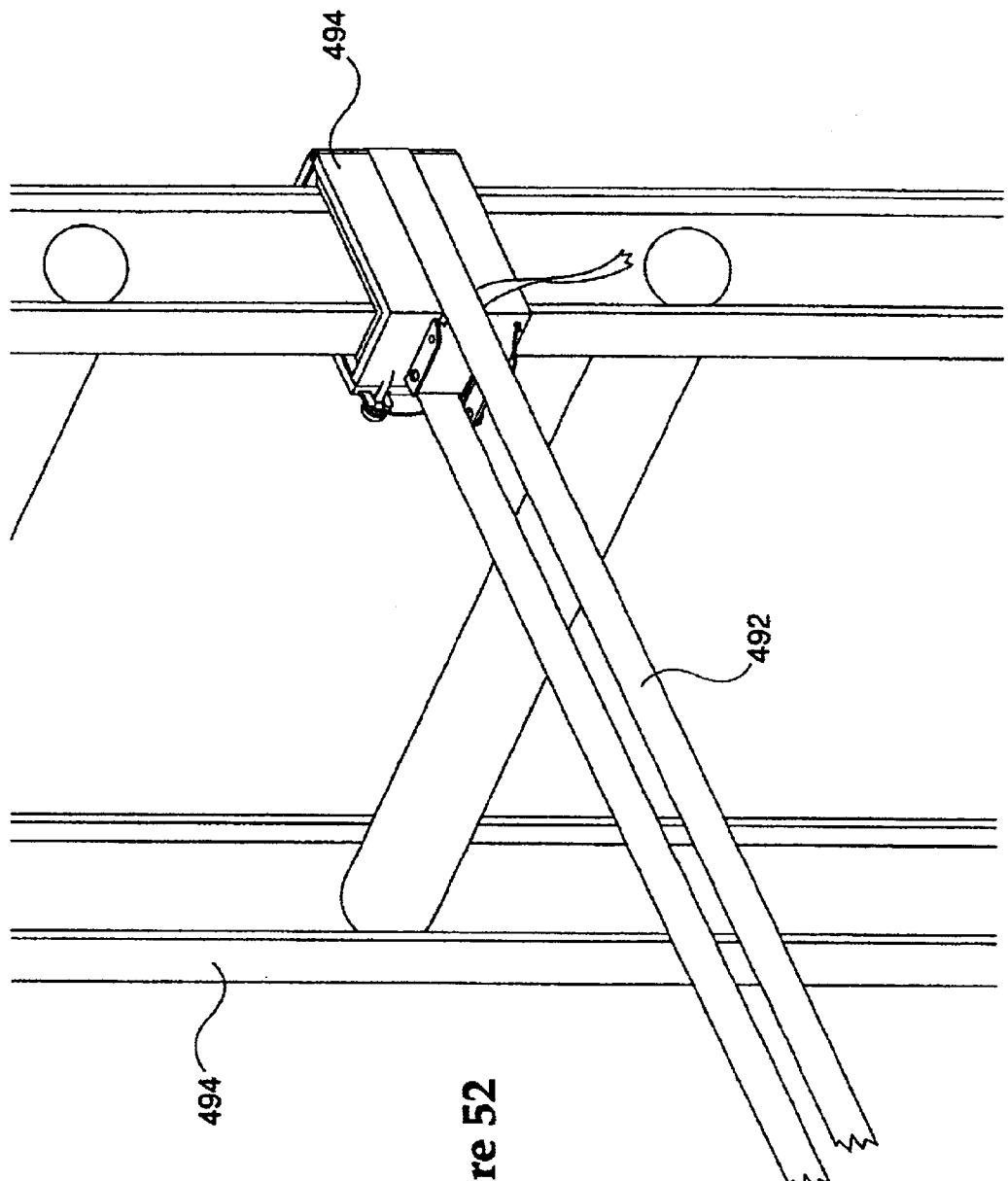
FIG. 52 is a perspective view of one version of the SUREFOOT™ embodiment of the present invention with a draw-tight strap attached shown attached to a ladder.

FIG. 52 is a perspective view of one version of the SUREFOOT™ embodiment of the present invention with a draw-tight strap attached shown attached to a ladder. A draw-tight strap 492, also known in the art, may be used to more readily secure the ladder 494 than the ratchet strap.

Figure 53:
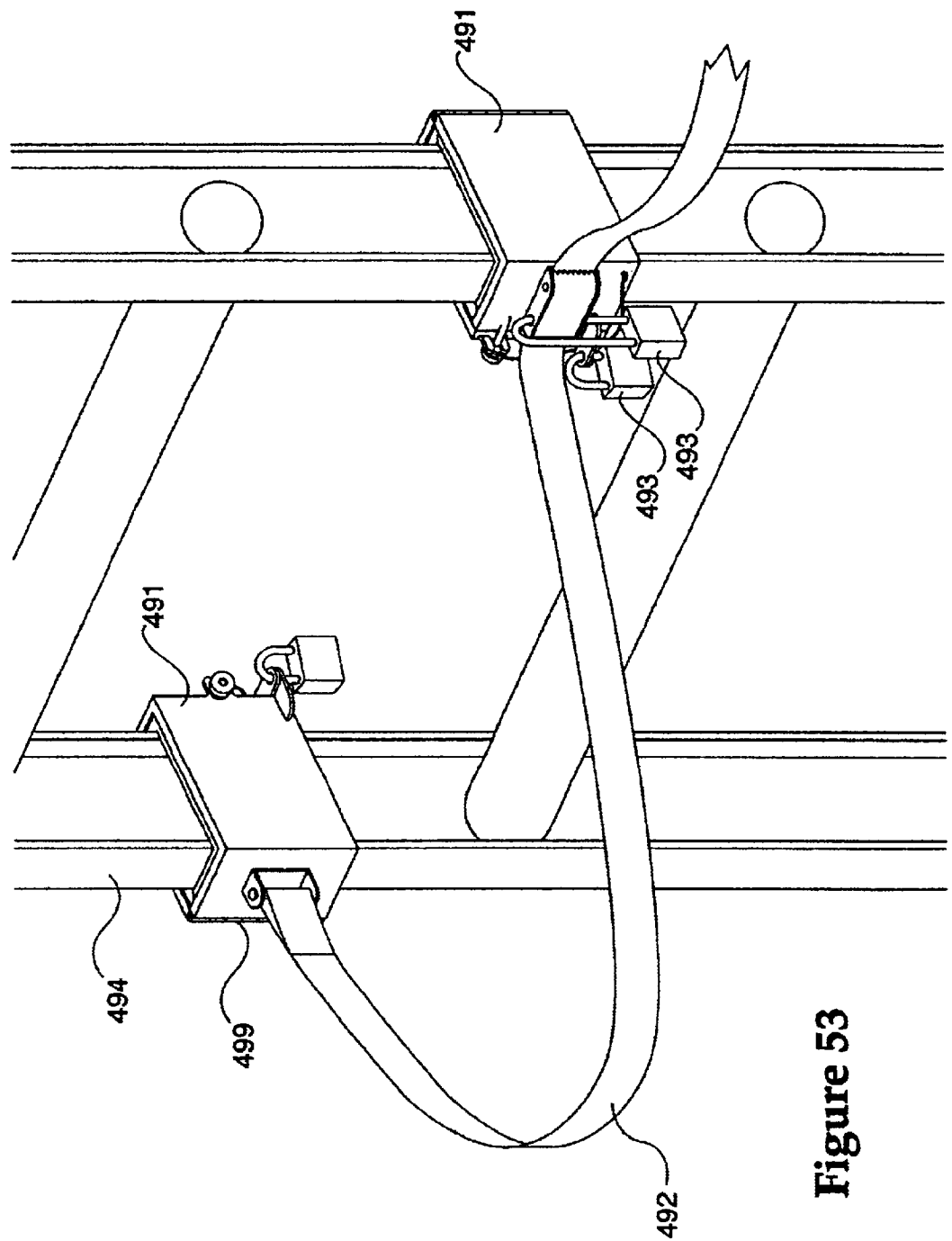
FIG. 53 is a perspective view of one version of the SUREFOOT™ embodiment of the present invention with two units attached to a ladder and coupled to each other through a draw-tight strap attached to each unit.

FIG. 53 is a perspective view of one version of the SUREFOOT™ embodiment 491 of the present invention with two units attached to a ladder and coupled to each other through a draw-tight strap attached to each unit. In this embodiment, for example, the ladder 494 may be readily and securely attached to a telephone pole or the like. Note the use of locks 493 to prevent the strap from being released. The draw-tight strap may be modified from the prior art by providing a drilled hole in the buckle to allow insertion of lock 493. In the embodiment of FIG. 53, a second clamp 491 is provided with a securing pin and bracket 499 to retain one end of strap 492.

Figure 54:
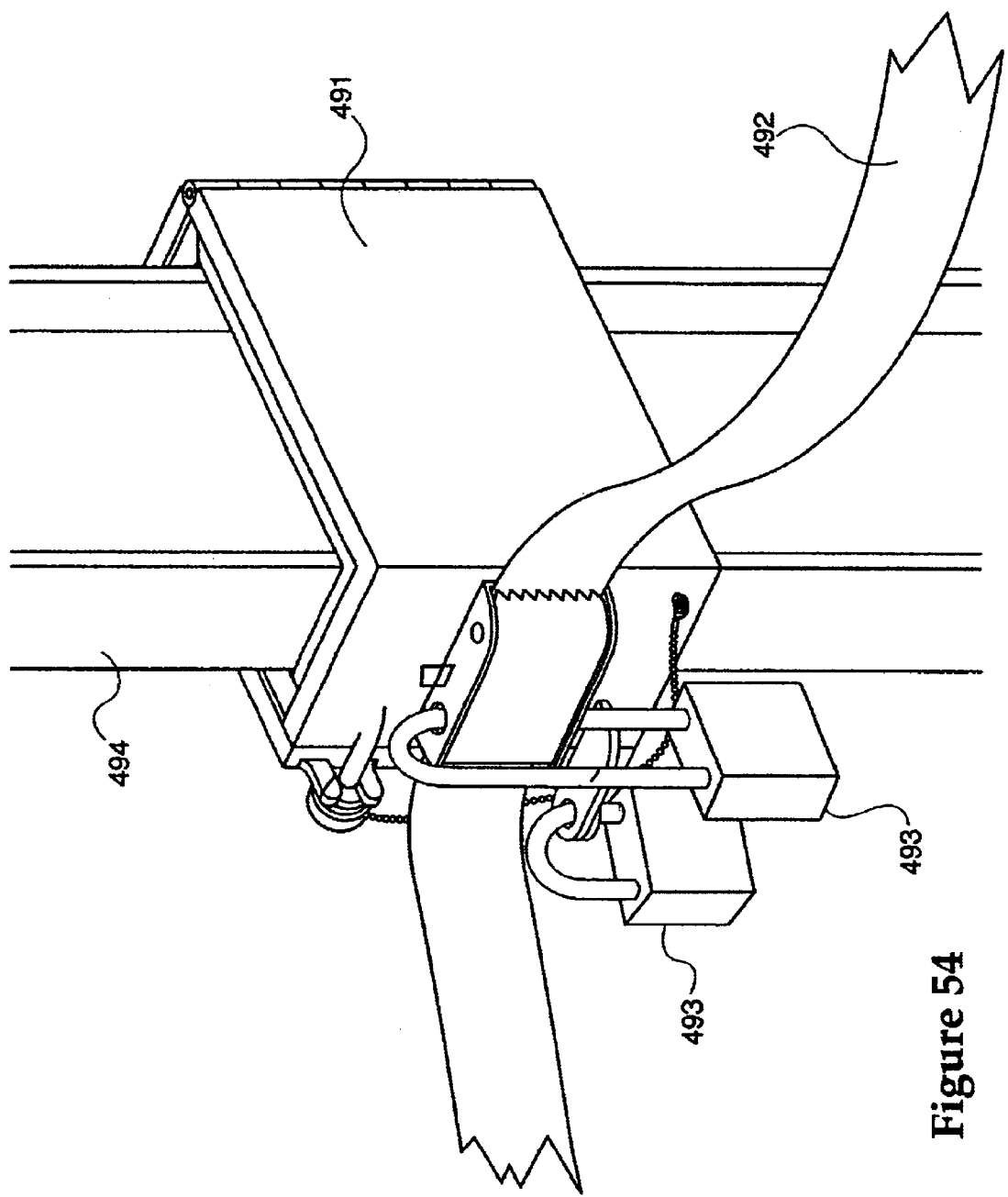
FIG. 54 is a detail perspective view of one version of the SUREFOOT™ embodiment of FIG. 2H.

FIG. 54 is a detail perspective view of one version of the SUREFOOT™ embodiment of FIG. 53. Note the use of a security chain to hold the knurled knob from falling.

Figure 55:
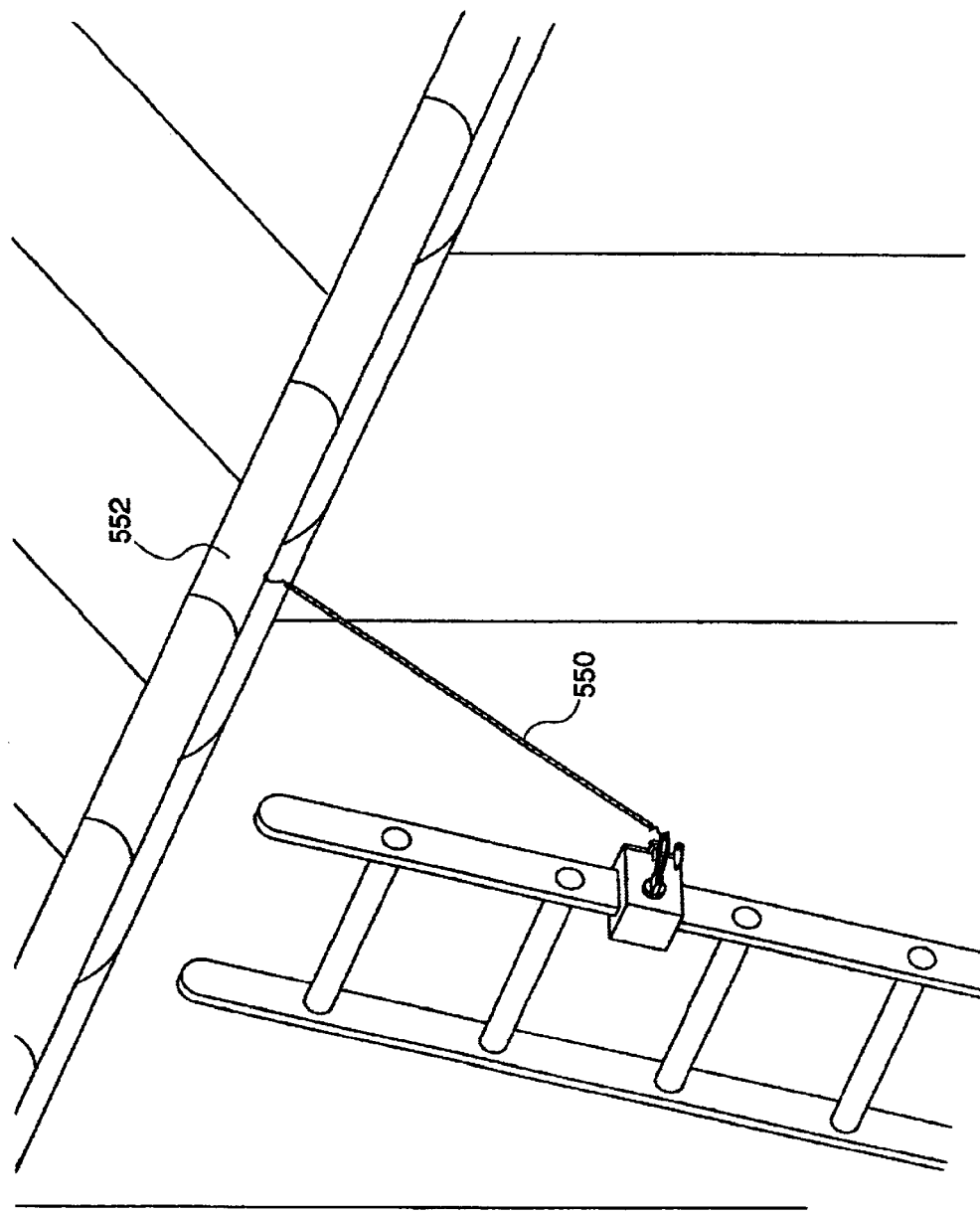
FIG. 55 is a perspective view of one version of the SUREFOOT™ embodiment of the present invention shown attached to a ladder, secured to a gutter spike via a bungee chord.

FIG. 55 is a perspective view of one version of the SUREFOOT™ embodiment of the present invention shown attached to a ladder, secured to a gutter spike via a bungee chord 550. In this embodiment, bungee chord 550 may be used to steady the ladder. Preferably, two chords 550 may be used, one on each side of the ladder. The SUREFOOT™ may be provided with a hook 552 for the bungee chord to attach to, as will be described in more detail below.

Figure 56:
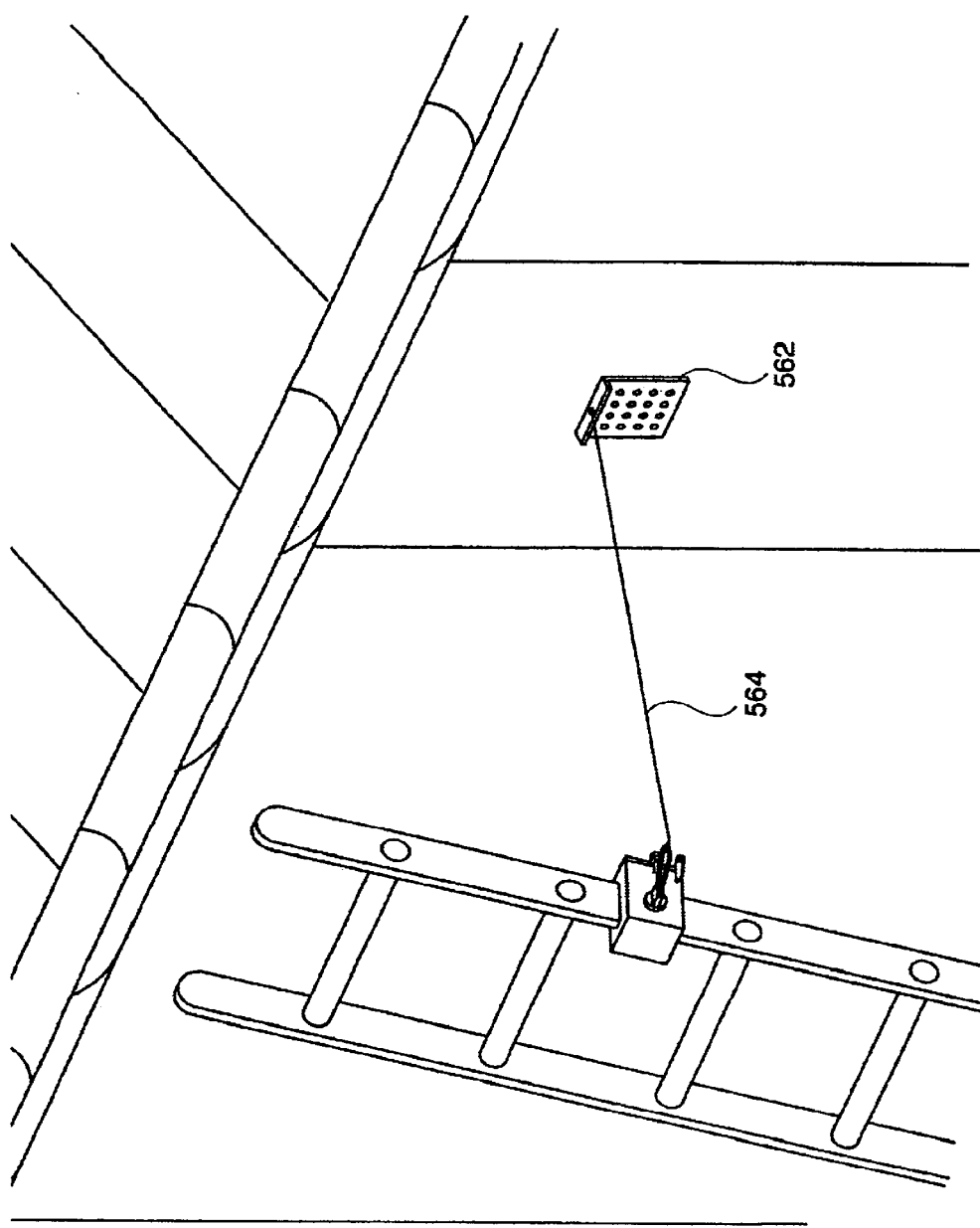

FIG. 56 is a perspective view of one version of the SUREFOOT™ embodiment of the present invention shown attached to a ladder, secured to a nailing plate 562 via a bungee chord, cable, or the like 564. Nailing plate 562 may be attached to a wall or roof temporarily by nails or screws. Cable or bungee 564 may then couple the sure foot to the nailing plate.

Figure 57:
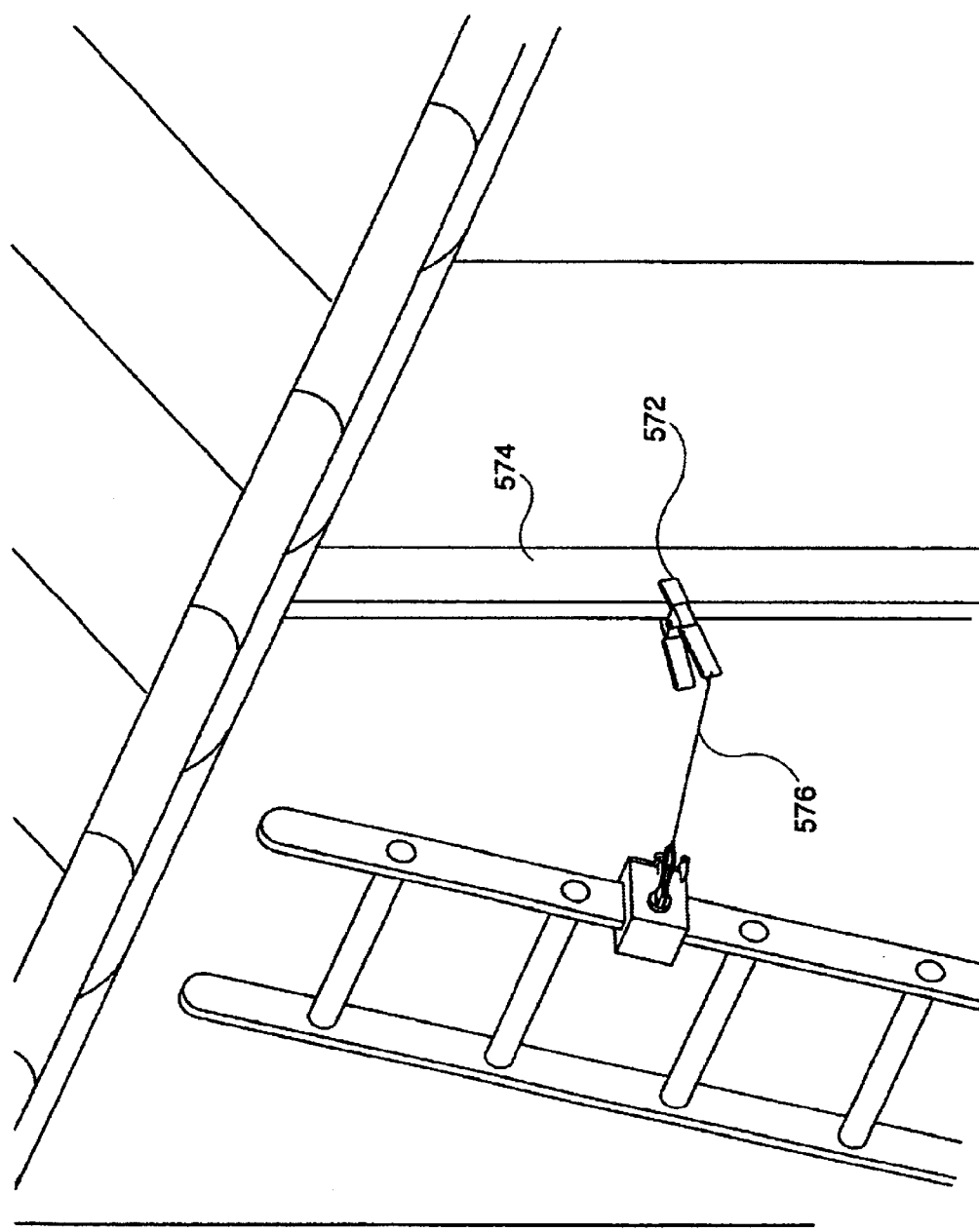

FIG. 57 is a perspective view of one version of the SUREFOOT™ embodiment of the present invention shown attached to a ladder, secured to a beam 574 using a pressure clamp 572 and a bungee chord, cable or the like 576. Again, the purpose of this embodiment is to steady the ladder, not necessarily hold the entire weight of a person or materials.

Figure 58:
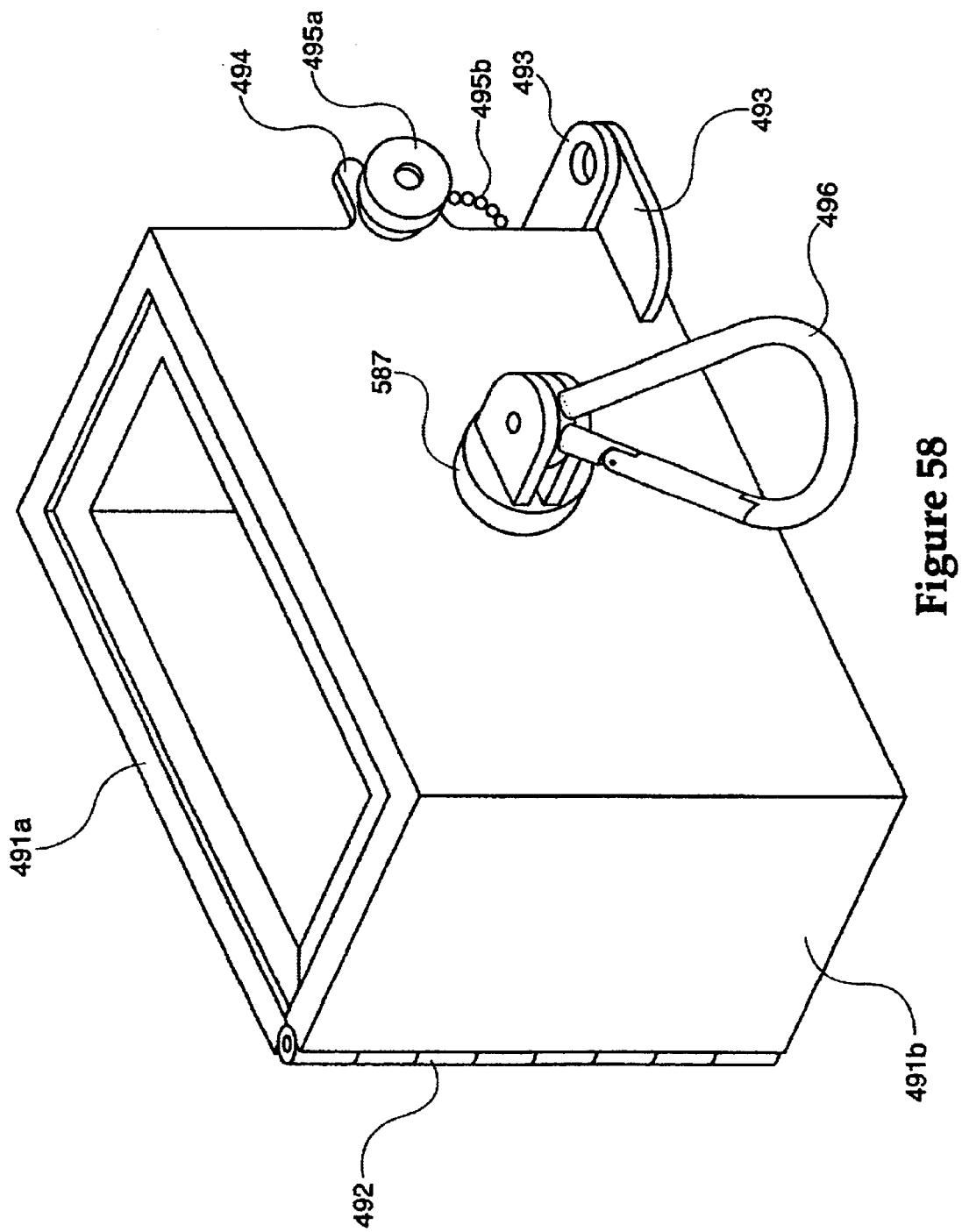

FIG. 58 is a perspective view of another version of the SUREFOOT™ embodiment of the present invention illustrating the swivel clip for use with a bungee, cable, or the like. Clip 587 may be mounted to the sure foot through swivel 587. Clip 587 may be similar to that used in climbing gear and the like. Note the chain 495*b* securing the knurled knob 495*a*.

Figure 59:
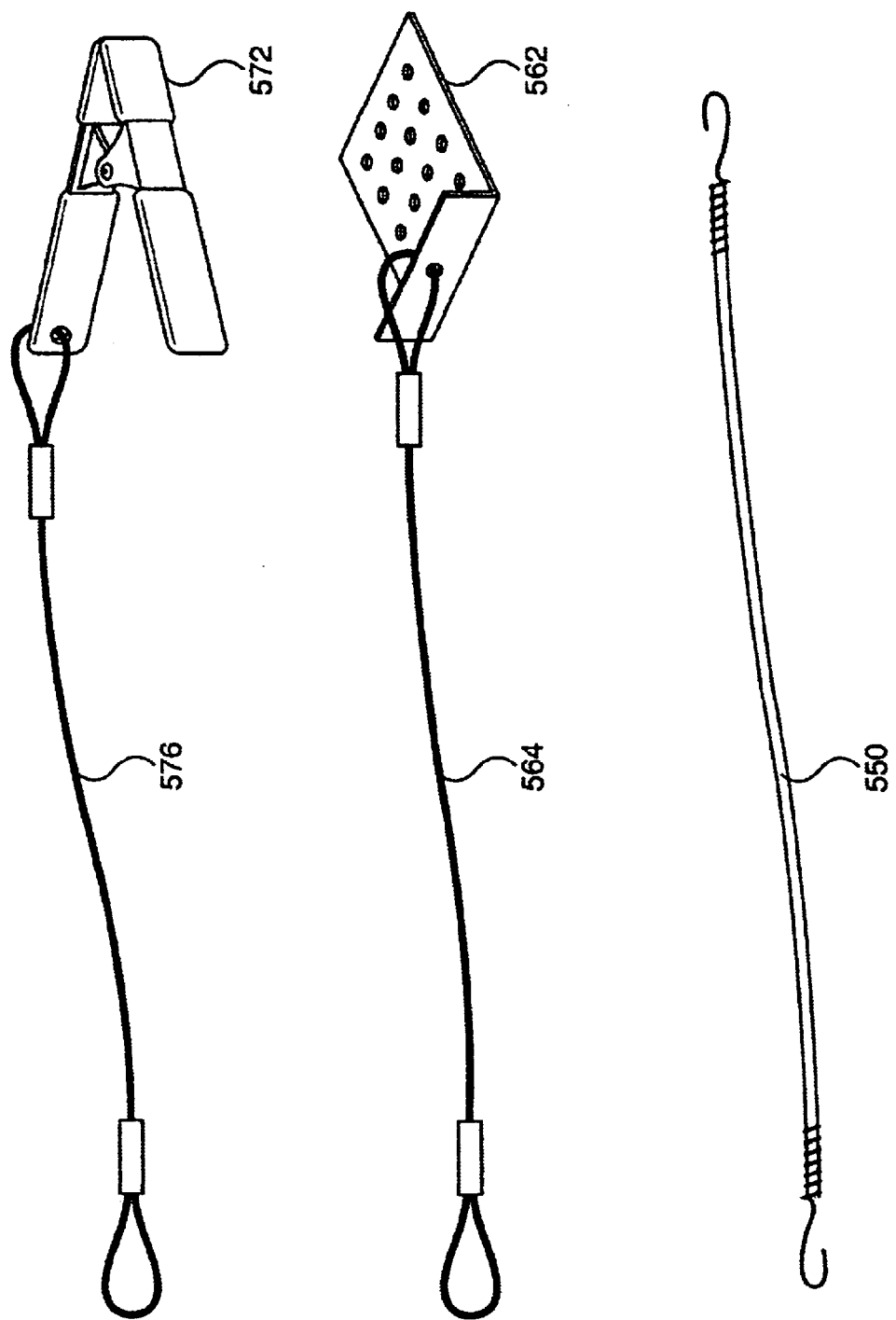
FIG. 59 is a perspective view of three attachment accessories for the swivel clip (or other embodiments) of the SUREFOOT™ embodiment of the present invention.

FIG. 59 is a perspective view of three attachment accessories for the swivel clip (or other embodiments) of the SUREFOOT™ embodiment of the present invention. The top element shows a cable (coated spiral wound stainless steel ¼ cable or the like) attached to a clamp via crimp fittings or the like. The center element shows the same cable attached to a nailing plate. The bottom element is a common bungee chord. Each of these elements may be attached to swivel clip 587 at one end, and attached to a roof or structure at the other.

Figure 60:
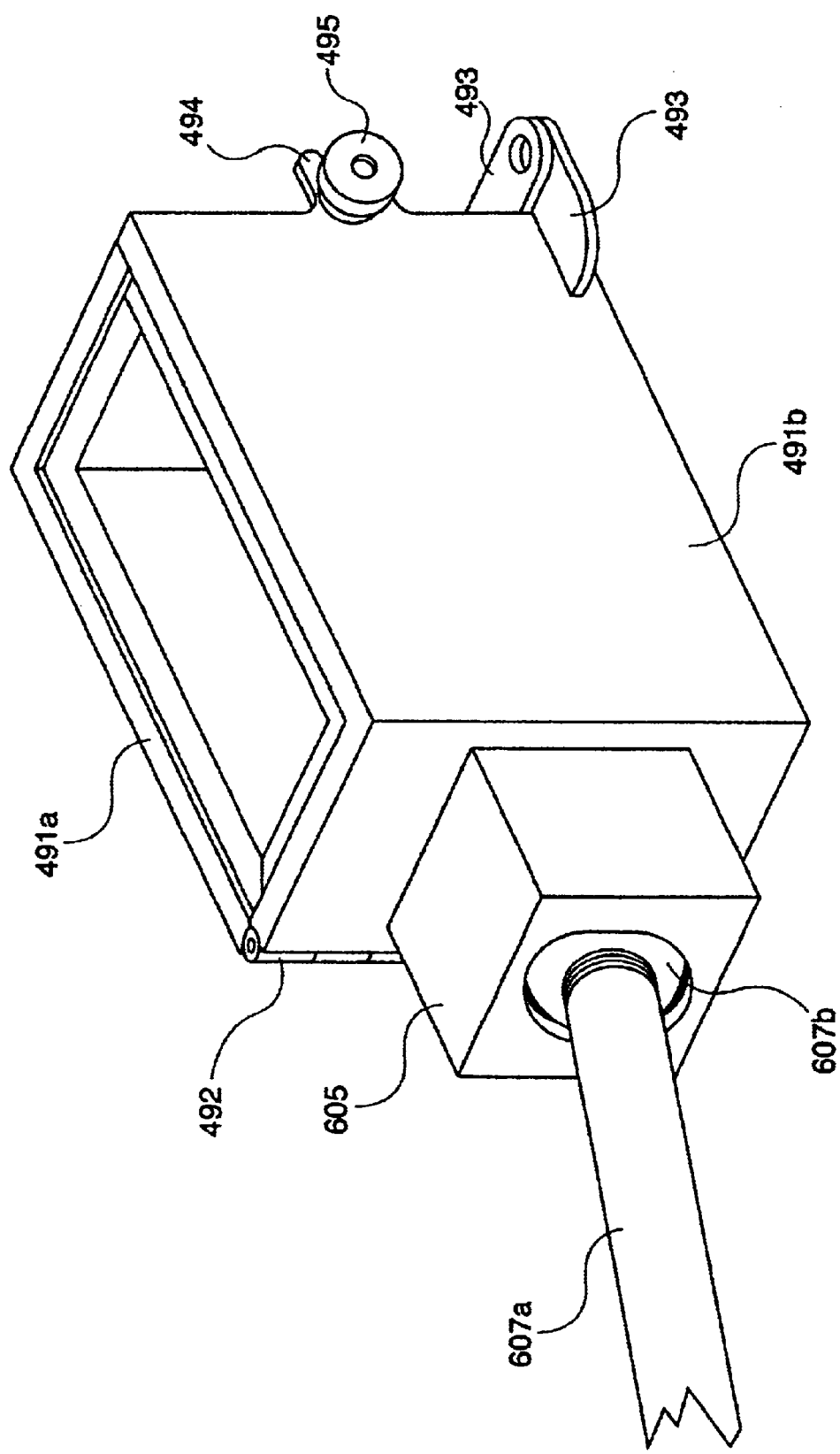
FIG. 60 is a perspective view of yet another version of the SUREFOOT™ embodiment of the present invention, with a pivot jointed shaft.
Figure 61:
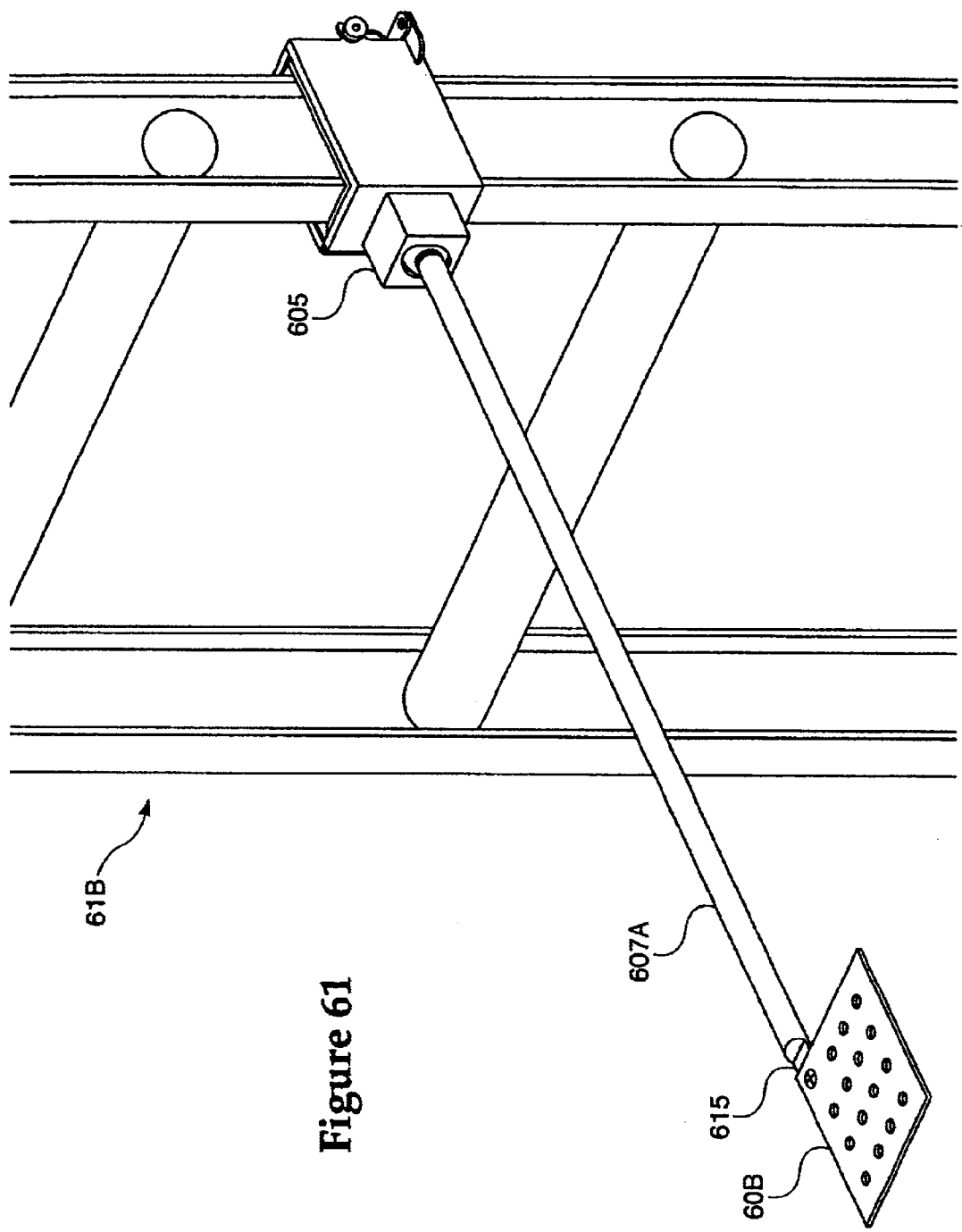
FIG. 61 is a perspective view of yet another version of the SUREFOOT™ embodiment of the present invention, with a pivot jointed shaft, shown attached to a ladder, with the shaft attached to a nailing plate.

FIG. 60 is a perspective view of yet another version of the SUREFOOT™ embodiment of the present invention, with a pivot jointed shaft. Pivot socket 605 is mounted to the sure foot at one end thereof. Socket 605 receives ball 607*b* which is coupled to shaft 607*a*. FIG. 61 is a perspective view of yet another version of the SUREFOOT™ embodiment of the present invention, with a pivot jointed shaft, shown attached to a ladder 61B, with shaft 607*a* attached to nailing plate 608.

Once attached to ladder 61B, nailing plate 608 may be moved to an advantageous position on a roof, wall, or stud and nailed or screwed in place to hold the ladder. Pivot joint 605 allows freedom in placement of nailing plate 608. Nailing plate 608 may be provided with a swivel joint 615 of limited rotation or another ball and socket type joint such as 605.

FIG. 62 is a perspective view of another version of the SUREFOOT™ embodiment of the present invention, illustrating the pivot shaft and nailing plate. FIG. 63 is a side view of another version of the SUREFOOT™ embodiment of the present invention, illustrating the pivot shaft and nailing plate. Pivot ball 607*b* may be secured to shaft 607*a* by set screw 609*a*. Screw 610*a* and nut 610*b* may secure shaft 607*a* to nailing plate 608 in a semi-rotatable or fixed manner. Nailing or screw holes 611 may be provided in nailing plate 608.

Figure 64:
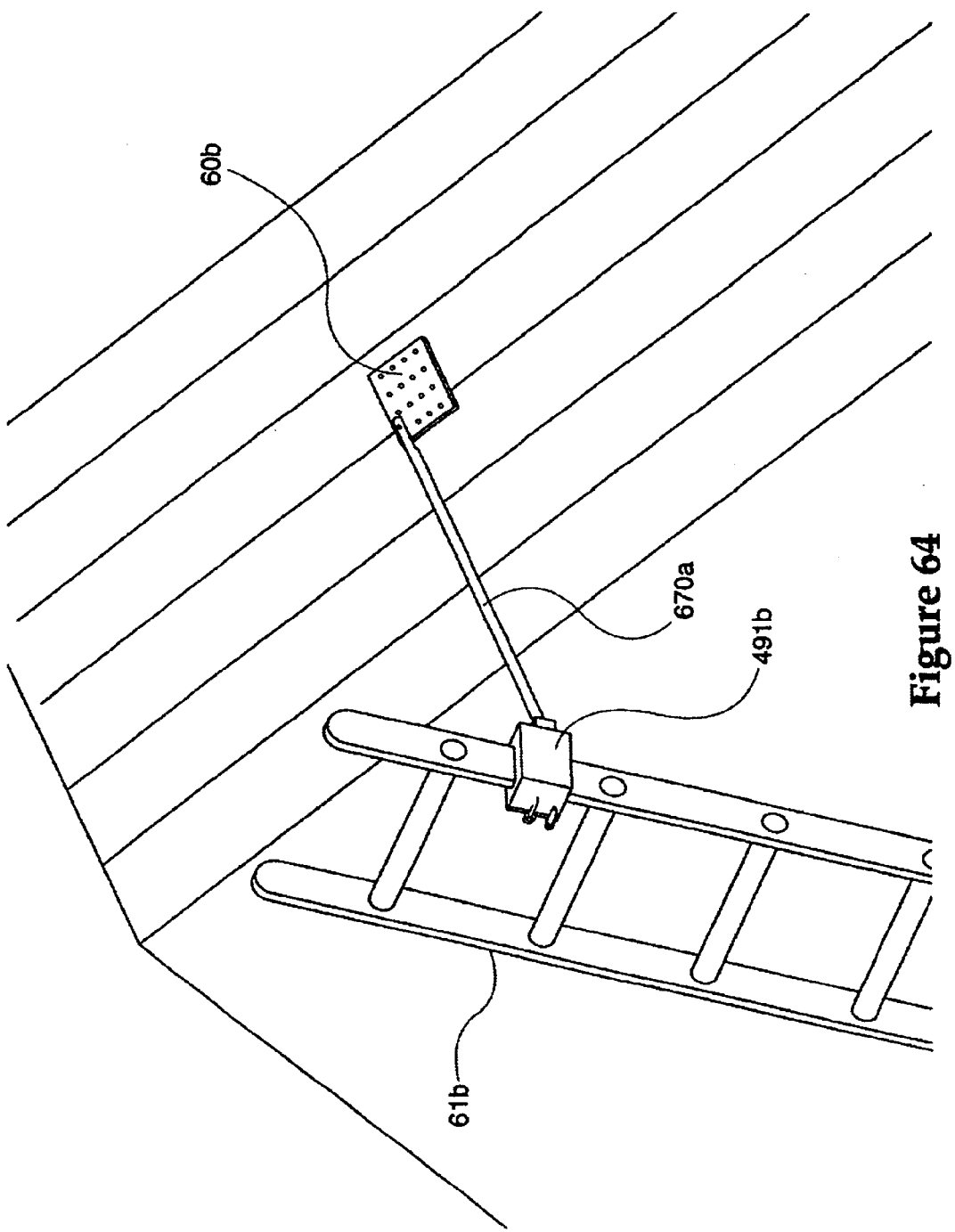
FIG. 64 is a perspective view of another version of the SUREFOOT™ embodiment of the present invention with the pivot shaft, illustrating how the apparatus, attached to a ladder, may attached to a roof via a nailing plate.

FIG. 64 is a perspective view of another version of the SUREFOOT™ embodiment of the present invention with the pivot shaft, illustrating how the apparatus, attached to a ladder, may attached to a roof via a nailing plate.

Figure 65:
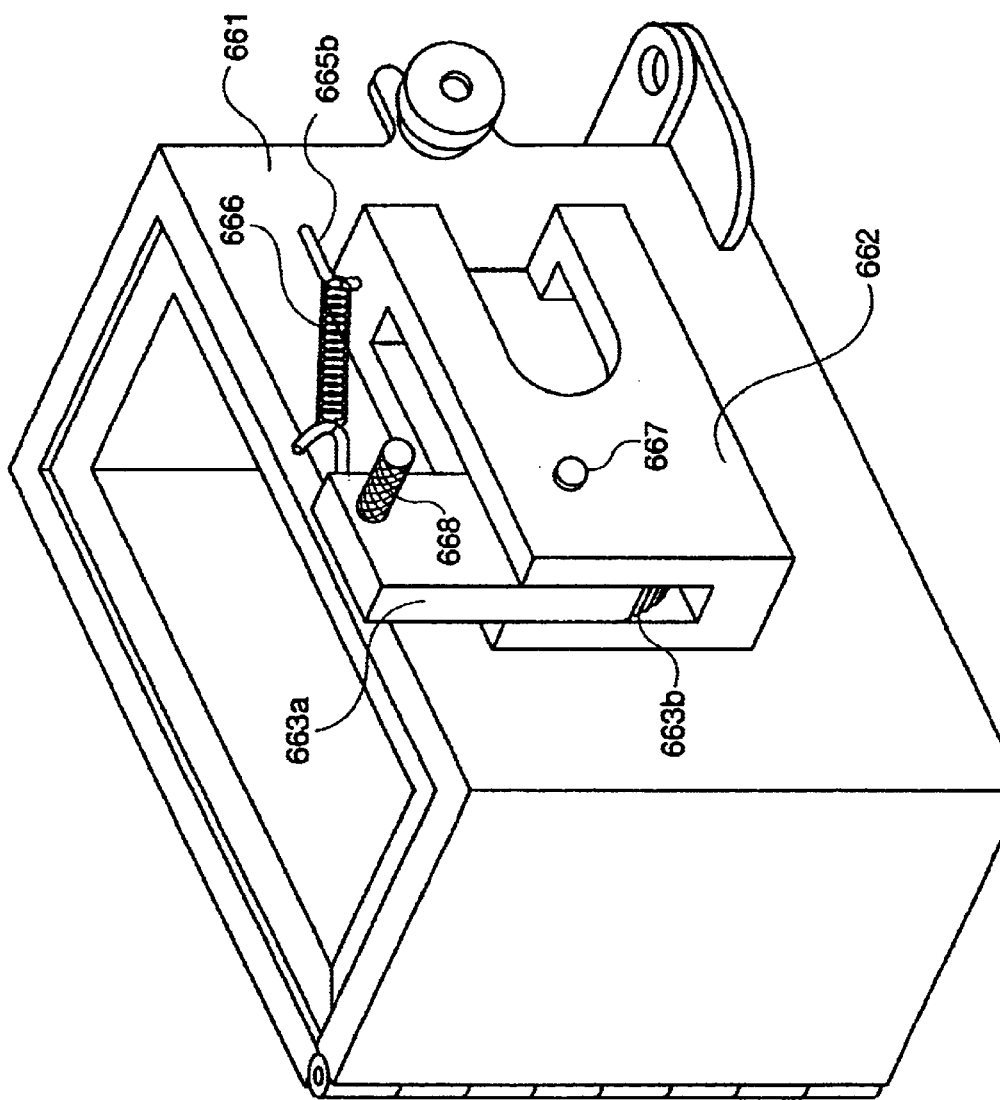
FIG. 65 is a perspective view of another version of the SUREFOOT™ embodiment of the present invention with a rope clamp.
Figure 66:
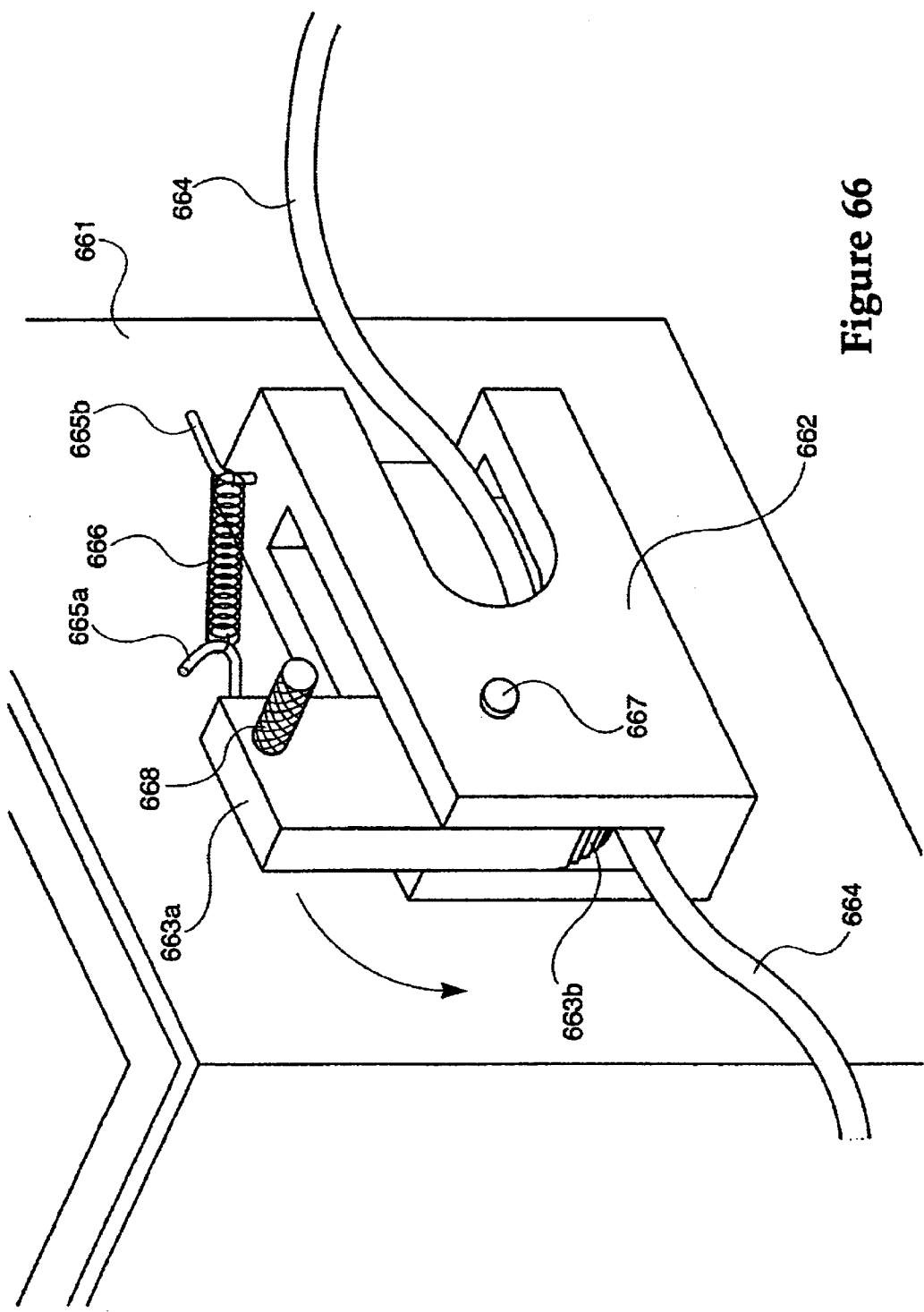
FIG. 66 is a perspective view of another version of the SUREFOOT™ embodiment of the present invention with a rope clamp, showing details of the rope clamp.

FIG. 65 is a perspective view of another version of the SUREFOOT™ embodiment of the present invention with a rope clamp. Such rope clamps per se are known in the nautical arts. A rope may be fed through the rope clamp and secured to a beam, telephone pole, nailing plate, or the like. FIG. 66 is a perspective view of another version of the SUREFOOT™ embodiment of the present invention with a rope clamp, showing details of the rope clamp.

Rope clamp 662 mounted to sure foot 661, may include catch 663a with teeth 663b rotatably mounted via pin 667. Spring 666 attached to catch 663a and clamp 662 via pins 665a and 665b holds catch 663a in tension. Knurled knob 668 may be used to release tension on catch 663a to release a rope 664 from the rope clamp.

Figure 67:
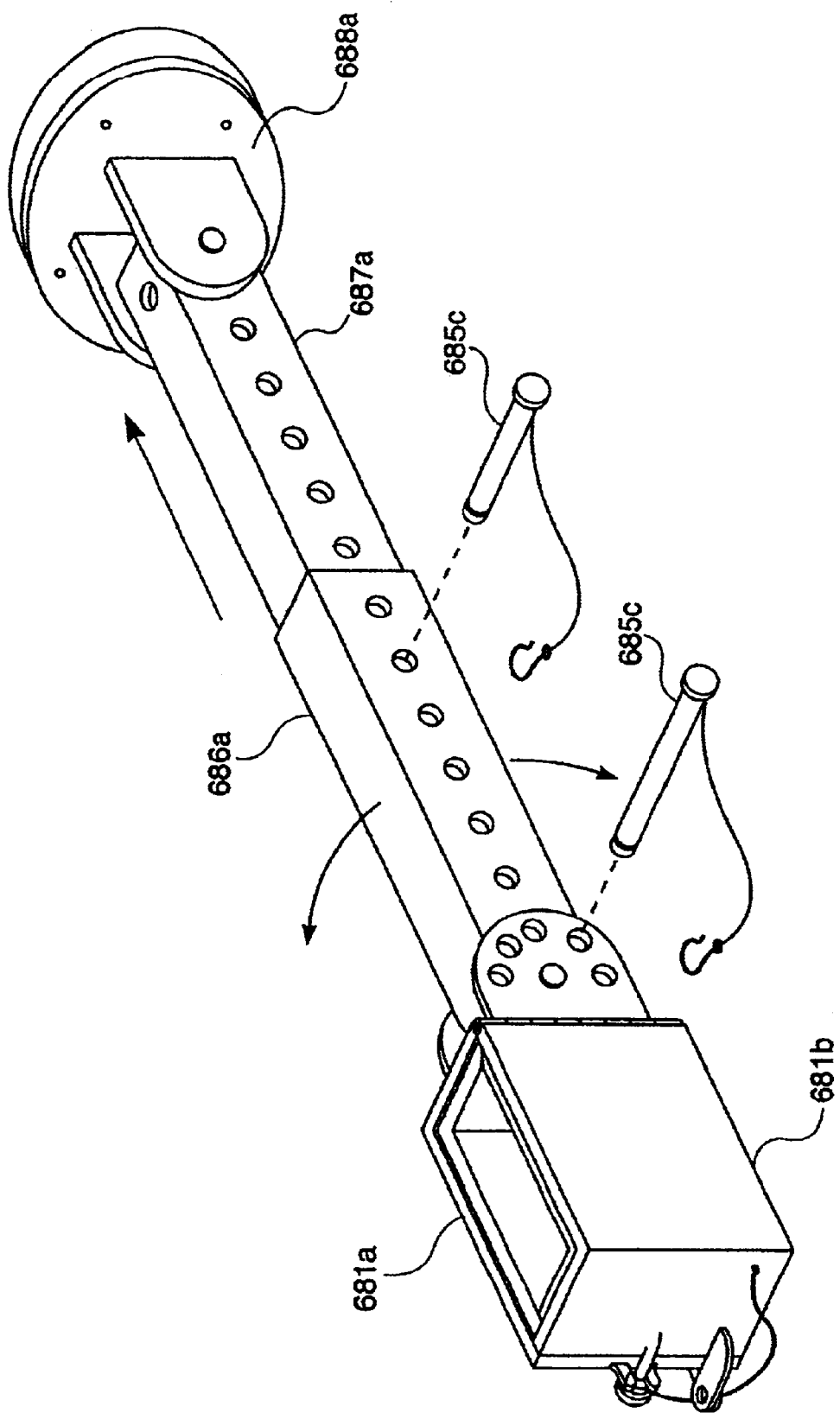
FIG. 67 is a perspective view of another version of the SUREFOOT™ embodiment of the present invention with an attached pivot leg and rubber covered foot.
Figure 68:
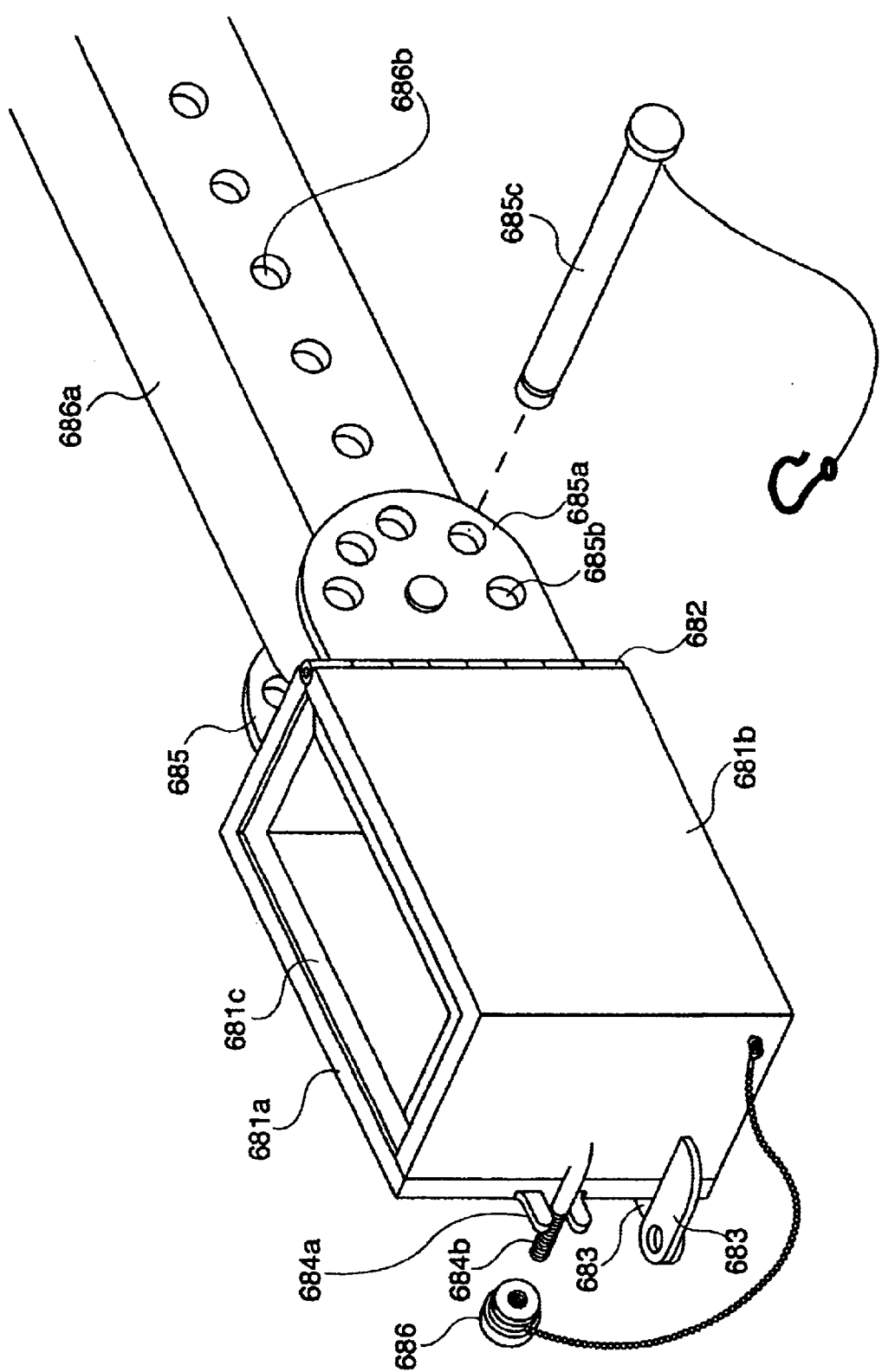
FIG. 68 is a perspective view of another version of the SUREFOOT™ embodiment of the present invention with an attached pivot leg and rubber covered foot showing more detail from FIG. 4A.

FIG. 67 is a perspective view of another version of the SUREFOOT™ embodiment of the present invention with an attached pivot leg and rubber covered foot. FIG. 68 is a perspective view of another version of the SUREFOOT™ embodiment of the present invention with an attached pivot leg and rubber covered foot showing more detail from FIG. 67. Referring to FIGS. 67 and 68, pivot 685 comprising side plates 685a may be mounted to one end of sure foot 681 with a plurality of adjustment holes 685b. Leg 686a may be mounted to side plates via a bolt or pin and adjusted for angle using pin 685c with attached clip (note safety string for clip).

Figure 69:
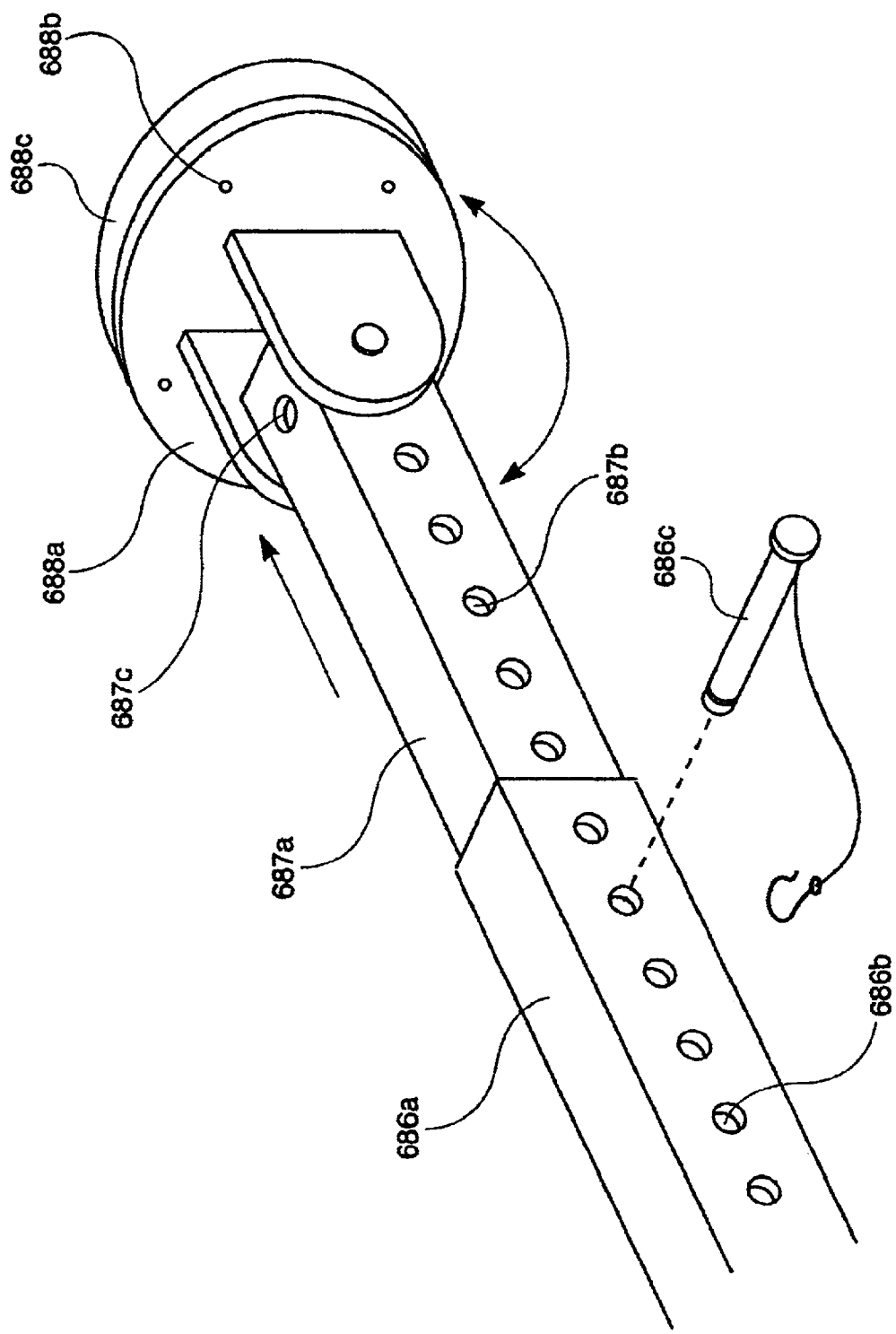
FIG. 69 is a perspective view of another version of the SUREFOOT™ embodiment of the present invention with an attached pivot leg and rubber covered foot, showing detail of the foot attachment.

FIG. 69 is a perspective view of another version of the SUREFOOT™ embodiment of the present invention with an attached pivot leg and rubber covered foot, showing detail of the foot attachment. Referring to FIGS. 68 and 69, foot 688a may be covered with urethane foam 688c to provide grip. Nails holes 688b may also be provided to accept temporary nailing or screwing. Foot 688a may be mounted to lower leg portion 687a via a pivot. Upper leg portion 686a may be adjustably attached to lower leg portion 687a via another pin 686c and clip (note again safety string or wire for clip).

In use, the device may be attached to a ladder leg an nailed to a roof, wall or other surface (either at the top or bottom of the ladder). In addition, the device may be used by attaching to the bottom of a ladder to steady the ladder as an extra leg, or to act as a ladder extension for one leg when, for example, setting up a ladder on steps. In addition, the device may be used to hold a ladder away from a wall to prevent gutters form being crushed.

Figure 70:
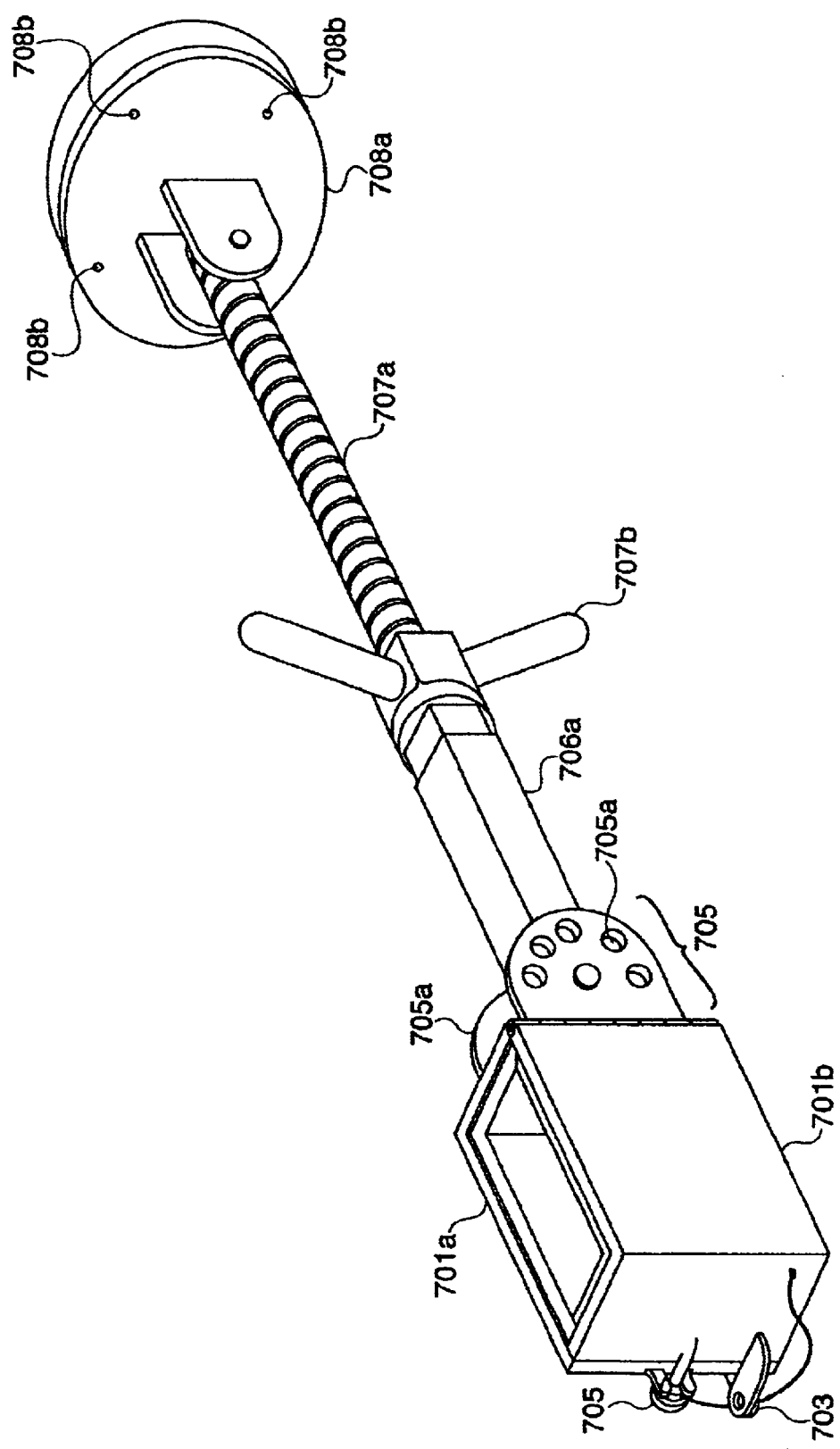
FIG. 70 is a perspective view of an alternative embodiment of the SUREFOOT™.

FIG. 70 is a perspective view of an alternative embodiment of the SUREFOOT™ embodiment of the present invention. The SUREFOOT™ in this embodiment may include a box clamp device encompassing parts 701a and 701b which may be wrapped around a ladder leg. The box clamp device 701a, 701b may be lined with foam rubber to securely grip various ladder leg sizes without damaging or marring the ladder leg.

A threaded shaft may be provided with knurled knob 705 to lock portion 701a to 701b around a ladder leg. Knurled knob 705 may be secured to the device via a small chain or cable to prevent it being dropped or lost. Lock hasp 703 may be provided to securely lock the device to a ladder to prevent theft or to prevent an unauthorized worker from removing the device before work is complete.

Pivot 705 comprising side plates 705a may be mounted to one end of sure foot 701 with a plurality of adjustment holes 705b. upper leg portion 706a may be mounted to side plates via a bolt or pin and adjusted for angle using a pin (not shown) with attached clip (with a safety string for the clip).

Foot 708a may be covered with urethane foam 708c to provide grip. Nails holes 708b may also be provided to accept temporary nailing or screwing. Foot 708a may be mounted to lower leg portion 707a via a pivot.

Upper leg portion 706a may be adjustably attached to lower leg portion 707a via a screw jack mechanism comprising threaded lower leg portion 707a, internally threaded upper leg portion 706a and locking wing-nut 707b. In use, the device may be attached to a ladder leg and nailed to a roof, wall or other surface (either at the top or bottom of the ladder). In addition, the device may be used by attaching to the bottom of a ladder to steady the ladder as an extra leg, or to act as a ladder extension for one leg when, for example, setting up a ladder on steps. In addition, the device may be used to hold a ladder away from a wall to prevent gutters form being crushed.

Figure 71:
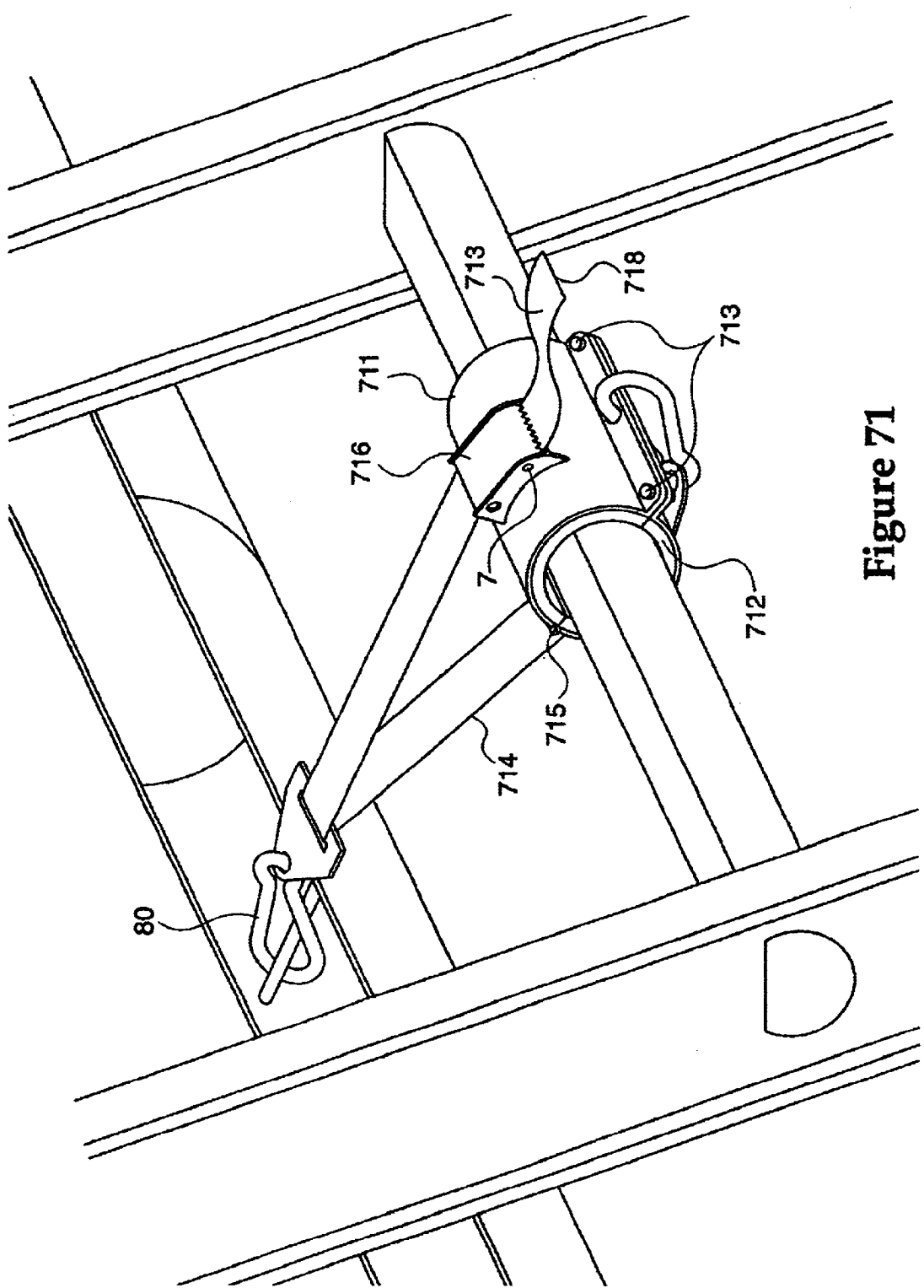
FIG. 71 is a perspective view of an alternative embodiment of the SUREFOOT™

FIG. 71 is a perspective view of a alternative embodiment of the SUREFOOT™ invention. In the embodiment of FIG. 8, the SUREFOOT™ apparatus is adapted for use in securing ladders by the rung rather than the side rail. This technique may be applied to all embodiments of the SUREFOOT™ set forth above.

The apparatus of FIG. 71 may operate in a similar manner as the SUREFOOT™ embodiments set forth above, except that the shape has been optimized for a ladder step. Other shapes may also be used (e.g., hexagon) without departing from the spirit and scope of the present invention.

Clamp 711 may be mounted to a ladder step, or the like. Clamp 711 may be lined with compressible foam rubber 712 so as to securely grip various ladder step cross-sections without slipping. Clamp 711 may be provided in two halves joined by hinge 715. The two halves may be attached though use of bolts or fasteners 713 which may be further secure by use of a safety clip as illustrated. The safety clip doubles as an attachment point for strap 714.

Strap 714 may be tightened by passing an end portion 718 through buckle 716 which is provided with a lock hole 717. Excess portions 713 of strap 714 may be tied off or may be left to hang. In operation, clamp 711 may be securely clamped around a ladder step as illustrated in FIG. 71. Note that in FIG. 71, clamp 711 is illustrated as round. However, clamp 718 may be suitably shaped (e.g., with a flat portion) so as to more closely follow the cross-sectional contour of a ladder step. Alternately, clamp 711 may be shaped to fit the contours of a ladder side bar, so as to free up step space.

Once clamp 711 is clamped to the ladder step, strap 714 may be attached to a gutter, nailing plate, or other support, via safety clip 80 (or the like) as illustrated in FIG. 71. Cinching up strap 714 through buckle 716 will hold the ladder tightly to a building or the like.

Figure 72:
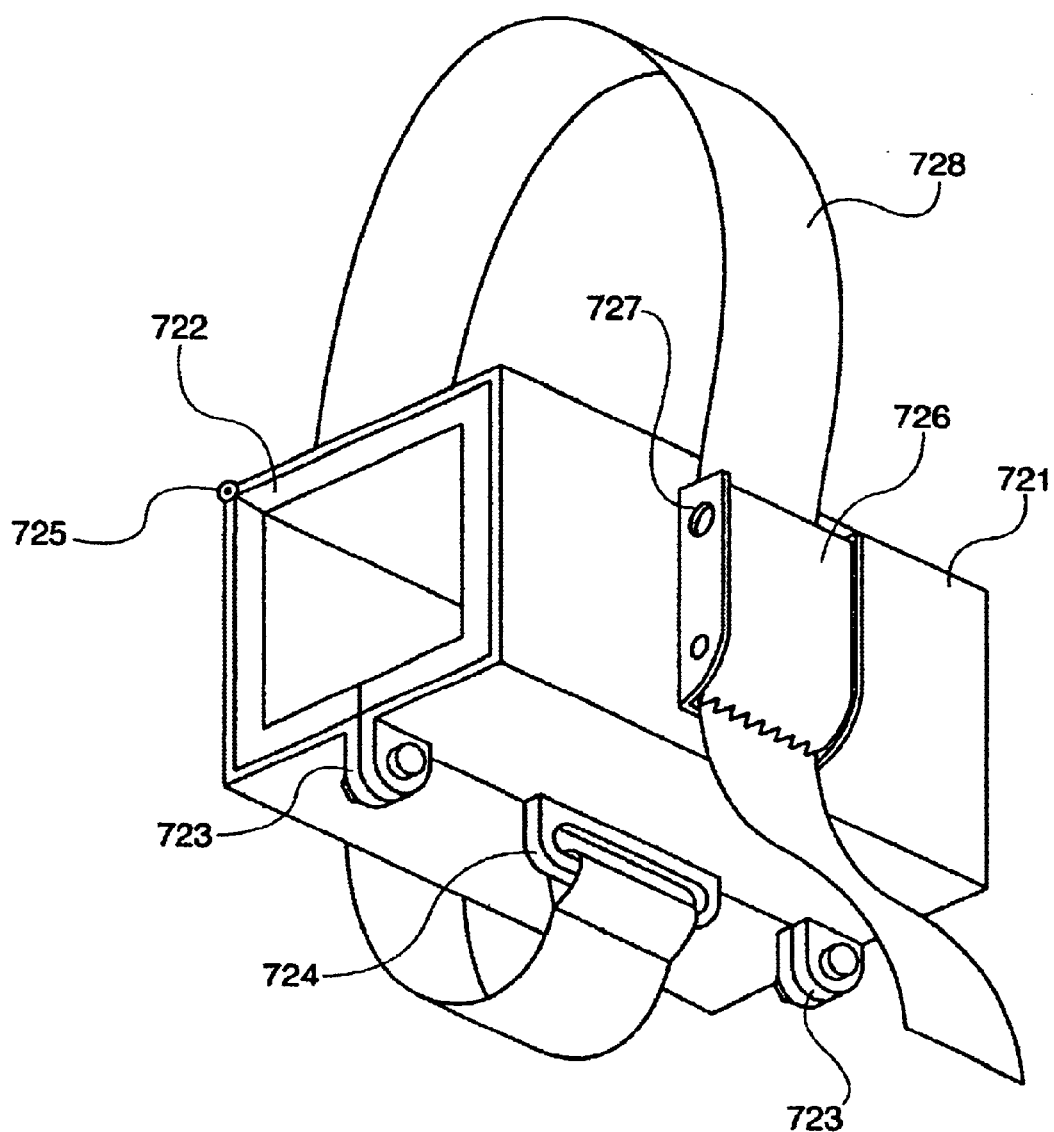
FIG. 72 is a perspective view of the rack strap of the first embodiment of the present invention.

FIG. 72 is a perspective view of the rack strap of the first embodiment of the present invention. Clamp 721 may be mounted to a truck ladder rack, car luggage rack, or the like. Clamp 721 may be lined with compressible foam rubber 722 so as to securely grip various rack channel cross-sections without slipping.

Clamp 721 may be provided in two halves joined by hinge 725. The two halves may be attached though use of bolts or fasteners 723 which may be further secure by use of a safety clip as illustrated. The safety clip doubles as an attachment point for strap 724. Strap 724 may be tightened by passing an end portion 728 through buckle 726 which is provided with a lock hole 727. Excess portions 723 of strap 724 may be tied off or may be left to hang.

Figure 73:
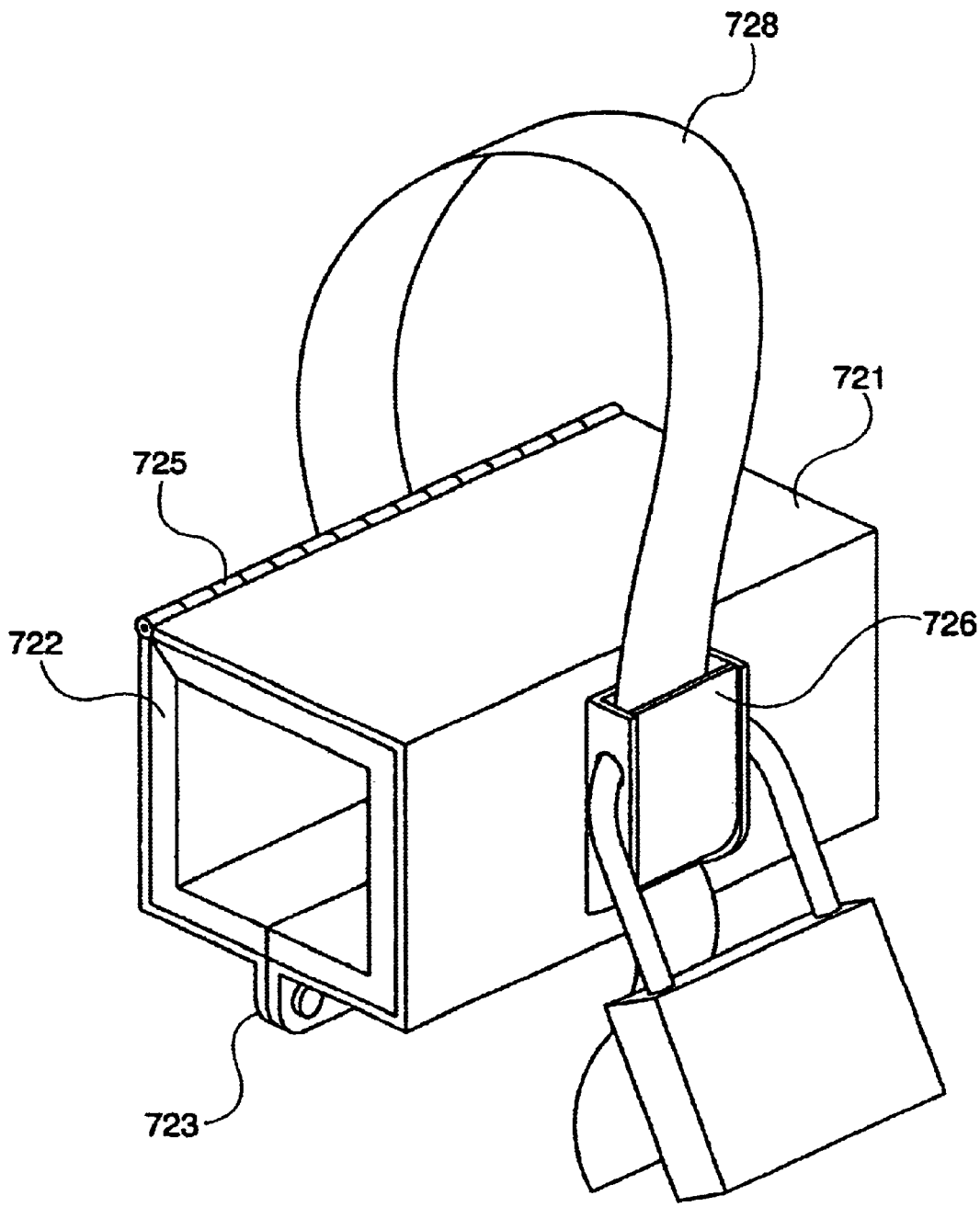
FIG. 73 is another perspective view of the rack strap of the first embodiment of the present invention illustrating how a lock may be applied.

FIG. 73 is another perspective view of the rack strap of the first embodiment of the present invention illustrating how a lock may be applied. A padlock may be passed through lock hold 727 to prevent buckle 726 from being released. The strap may be locked to prevent loosening of the strap or petty theft or borrowing of the objects secured to the strap. Workers on a job site will be less inclined to "borrow" a ladder that is so locked. Of course, a determined thief may be able to cut strap 724 to release the ladder. However, an armored strap 724 may be provided to prevent or discourage such theft.

Figure 74:
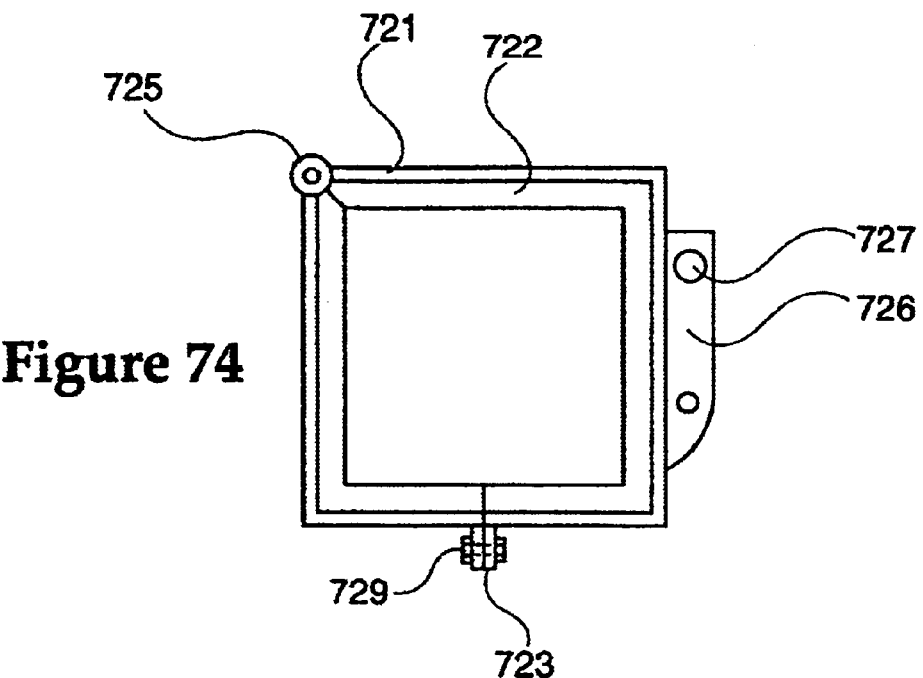
FIG. 74 is a top view of the rack strap of the first embodiment of the present invention in the closed position.
Figure 75:
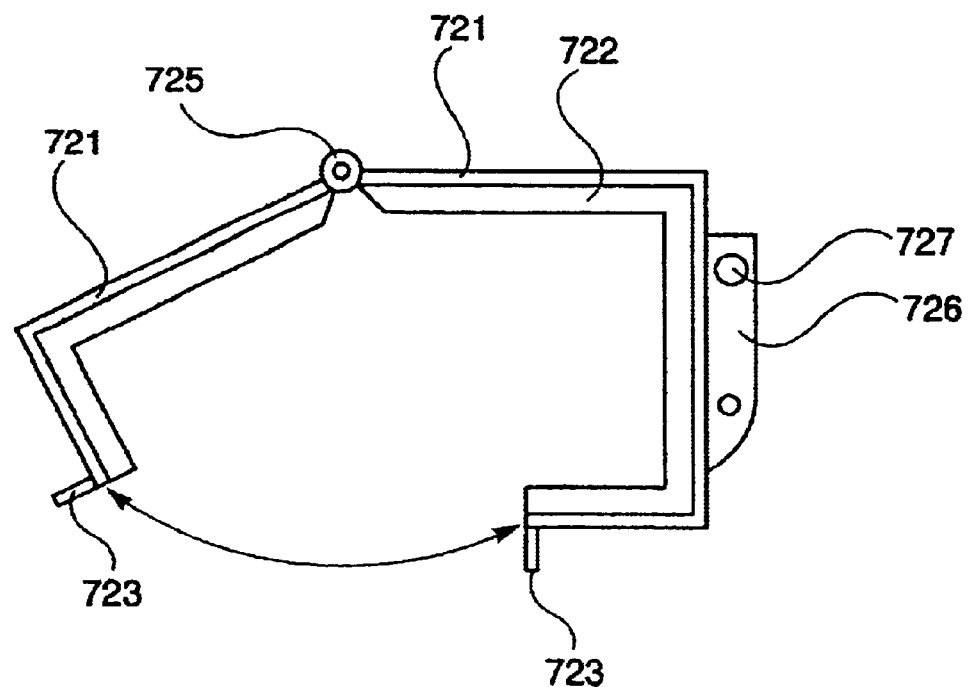
FIG. 75 is a top view of the rack strap of the first embodiment of the present invention in the open position.

Note that the strap may be wound around the device when the strap is secured to the buckle. Note that although disclosed here in terms of a draw-tight strap, the present invention may also be applied to ratchet straps. FIG. 74 is a top view of the rack strap of the first embodiment of the present invention in the closed position. FIG. 75 is a top view of the rack strap of the first embodiment of the present invention in the open position.

Figure 76:
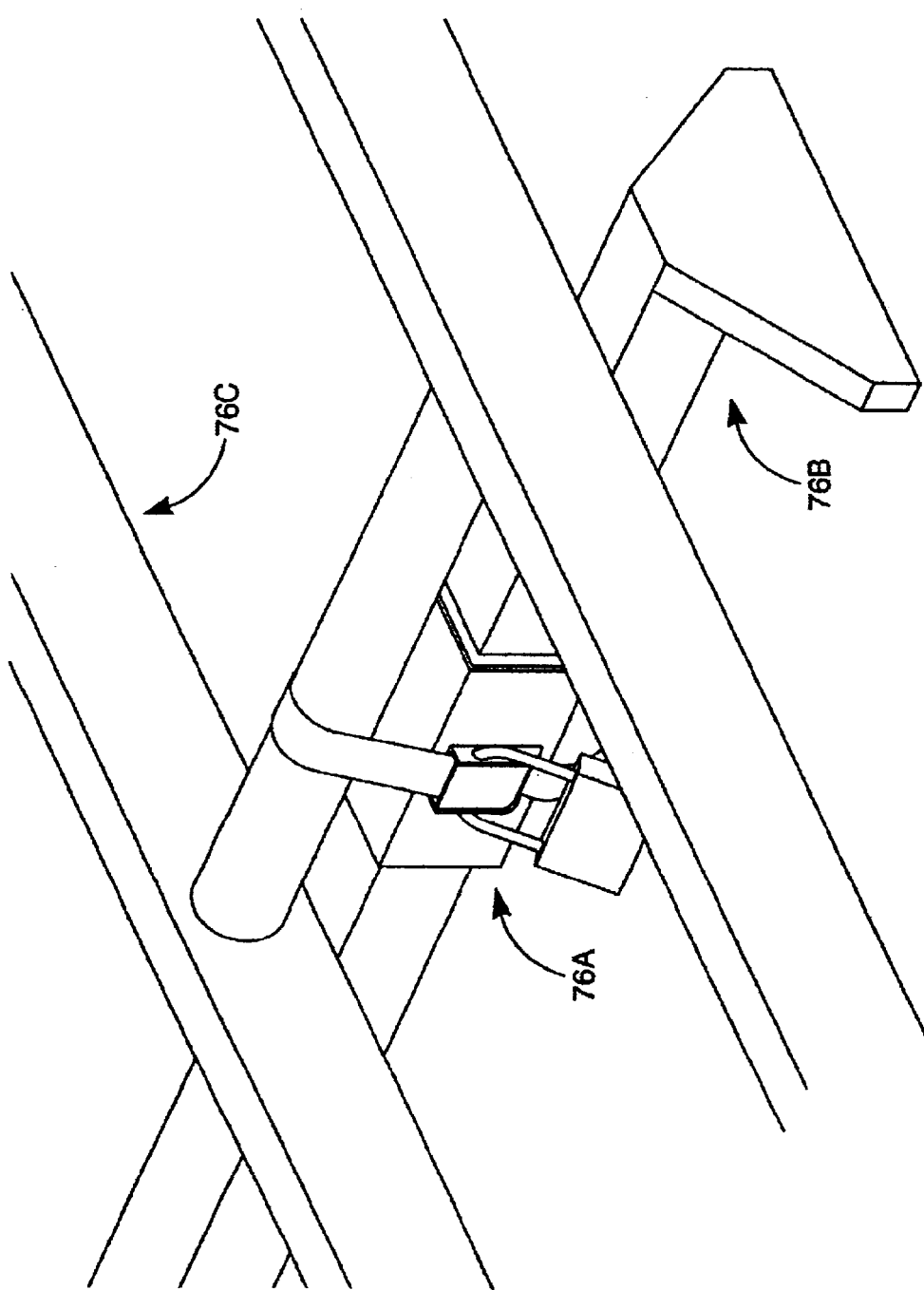
FIG. 76 is another perspective view of the rack strap of the first embodiment of the present invention illustrating how the apparatus may be installed on a ladder rack.

FIG. 76 is another perspective view of the rack strap of the first embodiment of the present invention illustrating how the apparatus 76A may be installed on a ladder rack. As illustrated in FIG. 76, a ladder 76C may be cinched down tightly to a roof rack 76B by means of the strap. Note that the present invention may be used in a number of ways in addition to that shown in FIG. 76. For example, two such devices may be used on either side of a roof rack to secure a large load by passing straps between two devices.

Figure 77:
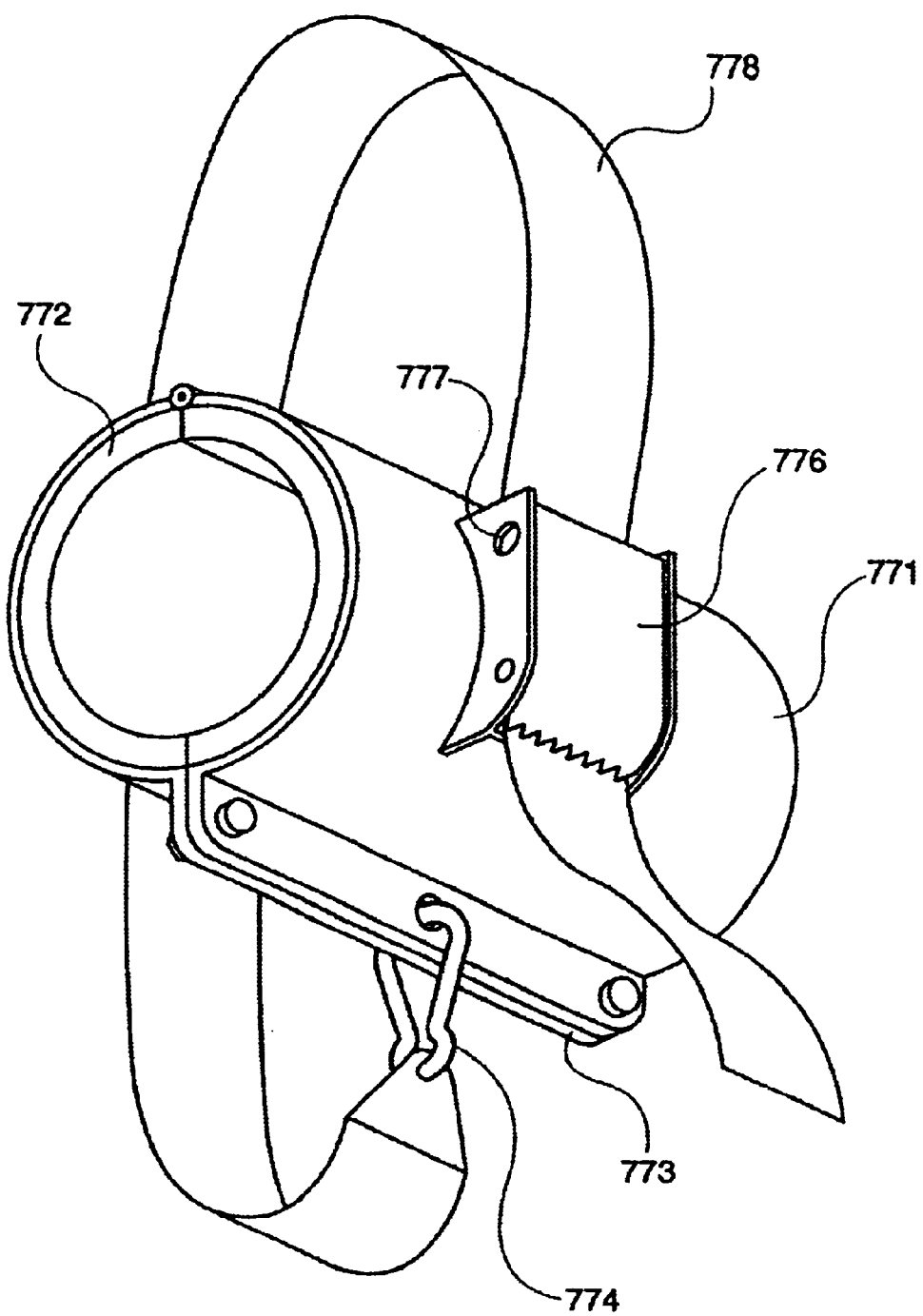
FIG. 77 is a perspective view of an alternative embodiment of the rack strap of the present invention for round tube racks.

FIG. 77 is a perspective view of an alternative embodiment of the rack strap of the present invention for round tube racks. The apparatus of FIG. 77 operates in the same manner as that of FIGS. 72–76, except that the shape has been optimized for round tubing. Other shapes may also be used (e.g., hexagon) without departing from the spirit and scope of the present invention.

Figure 78:
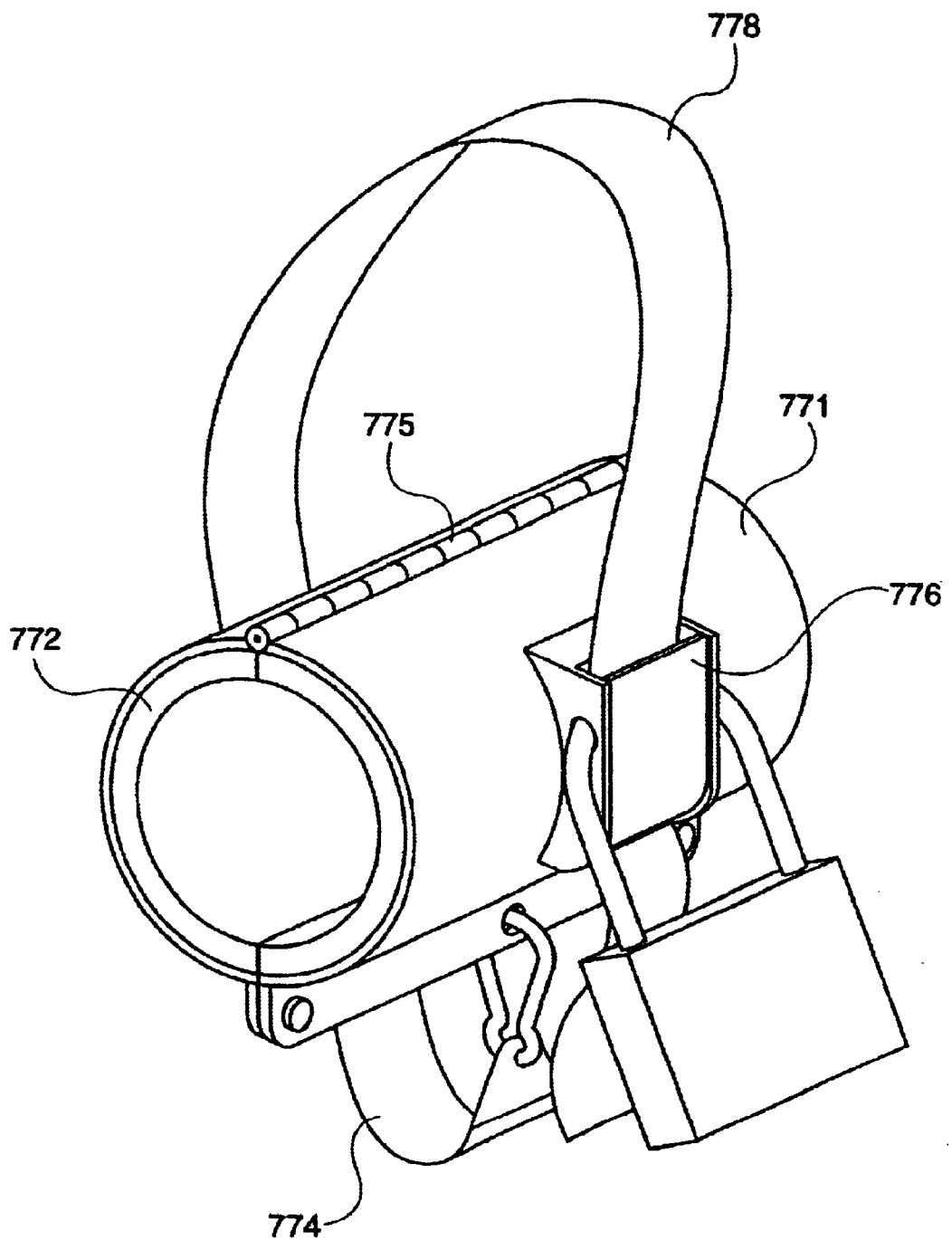
FIG. 78 is another perspective view of the alternative embodiment of rack strap of the present invention illustrating how a lock may be applied.

Clamp 771 may be mounted to a truck ladder rack, car luggage rack, or the like. Clamp 771 may be lined with compressible foam rubber 772 so as to securely grip various rack channel cross-sections without slipping. Clamp 771 may be provided in two halves joined by hinge 775. The two halves may be attached though use of bolts or fasteners 773 which may be further secure by use of a safety clip 774 as illustrated. The safety clip doubles as an attachment point for strap 778. Strap 778 may be tightened by passing an end portion through buckle 776 which is provided with a lock hole 777. Excess portions of strap 778 may be tied off or may be left to hang. FIG. 78 is another perspective view of the alternative embodiment of rack strap of the present invention illustrating how a lock may be applied.

Figure 79:
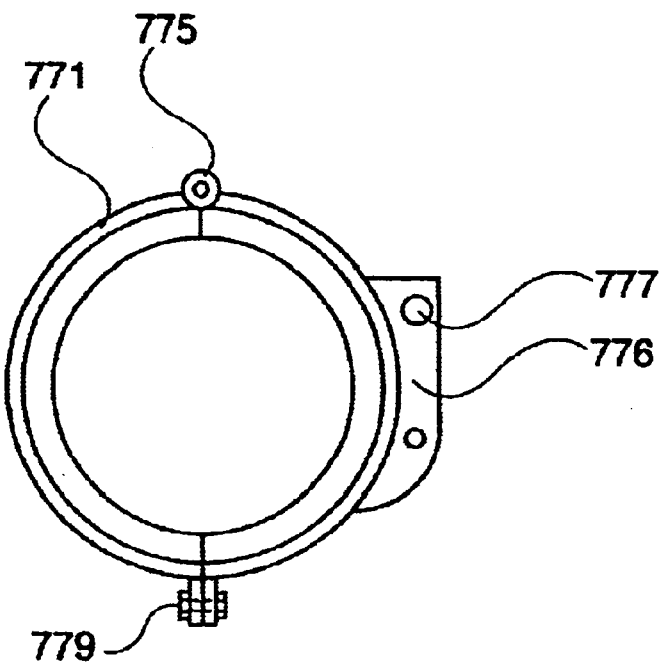
FIG. 79 is a top view of the alterative embodiment of the rack strap of the present invention in the closed position.
Figure 80:
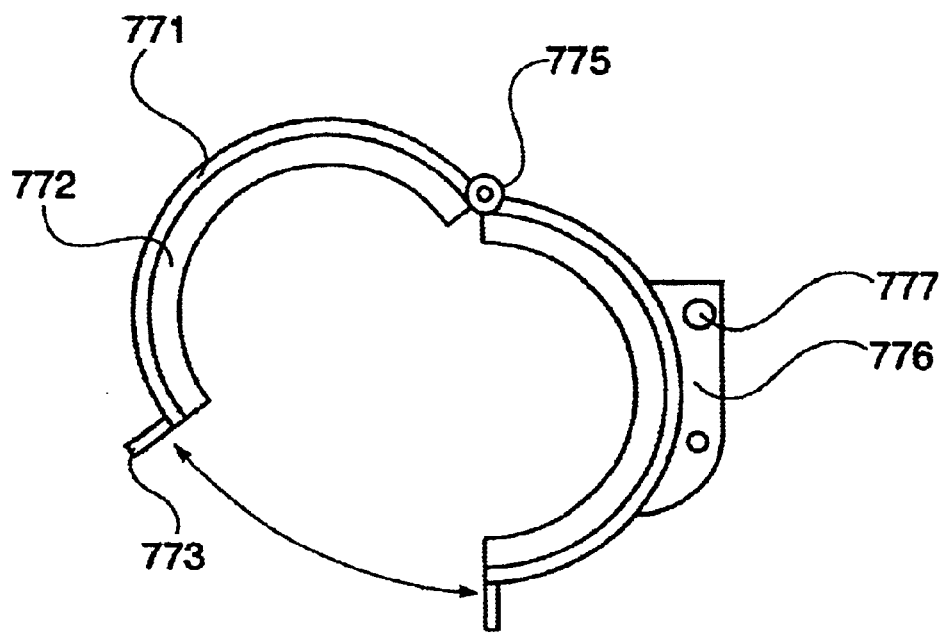
FIG. 80 is a top view of the alternative embodiment of the rack strap of the present invention in the open position.
Figure 81:
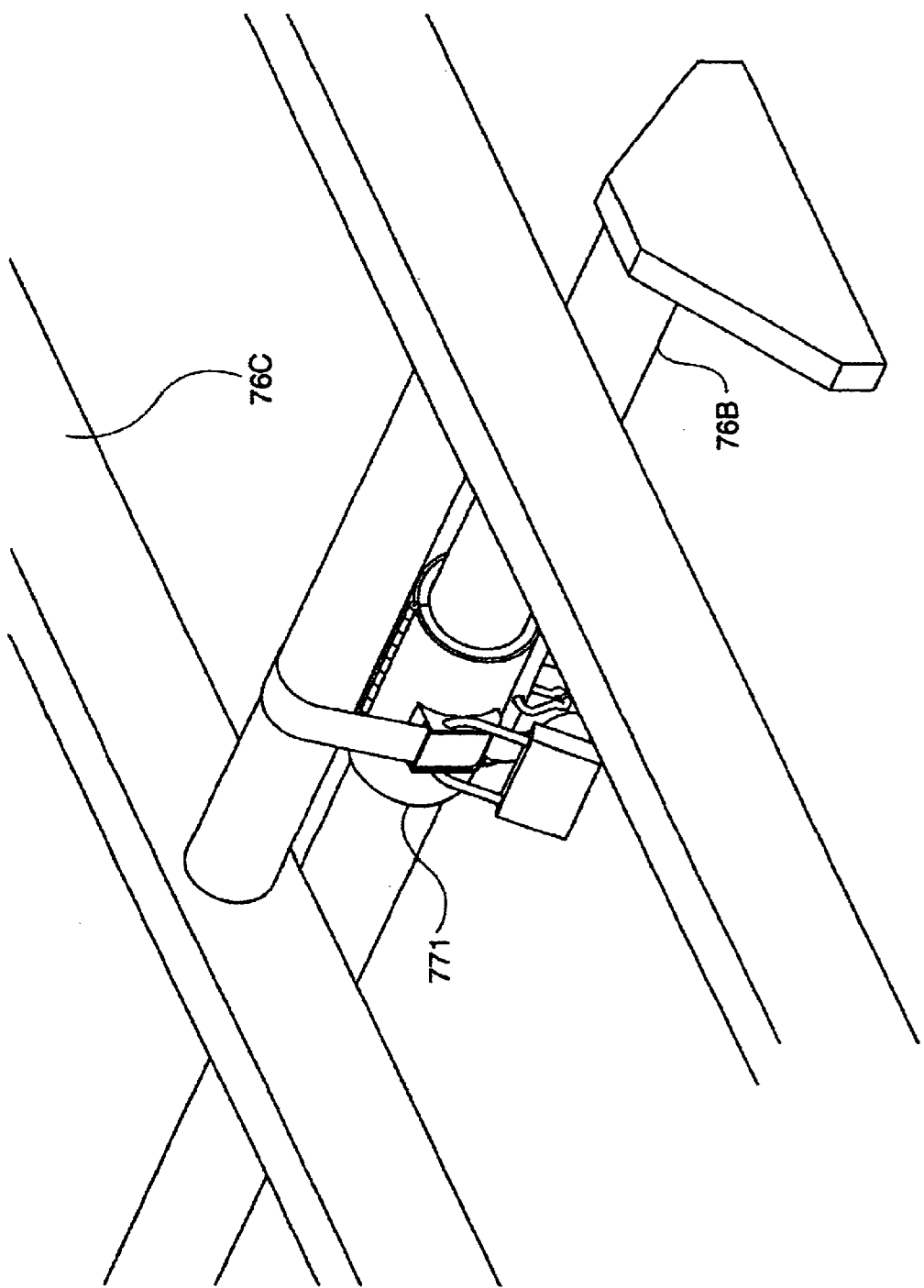
FIG. 81 is another perspective view of the alterative embodiment of the rack strap of the present invention illustrating how the apparatus may be installed on a ladder rack.

FIG. 79 is a top view of the alterative embodiment of the rack strap of the present invention in the closed position. FIG. 80 is a top view of the alternative embodiment of the rack strap of the present invention in the open position. FIG. 81 is another perspective view of the alterative embodiment of the rack strap of the present invention illustrating how the apparatus may be installed on a ladder rack.

It should be noted that all of the embodiments of the present invention, the use of ratchet straps or draw-tight straps on various embodiments is largely interchangeable. Thus, any disclosure illustrating the use of a draw-tight strap should be understood to encompass a ratchet strap and vice-versa.

Figure 82:
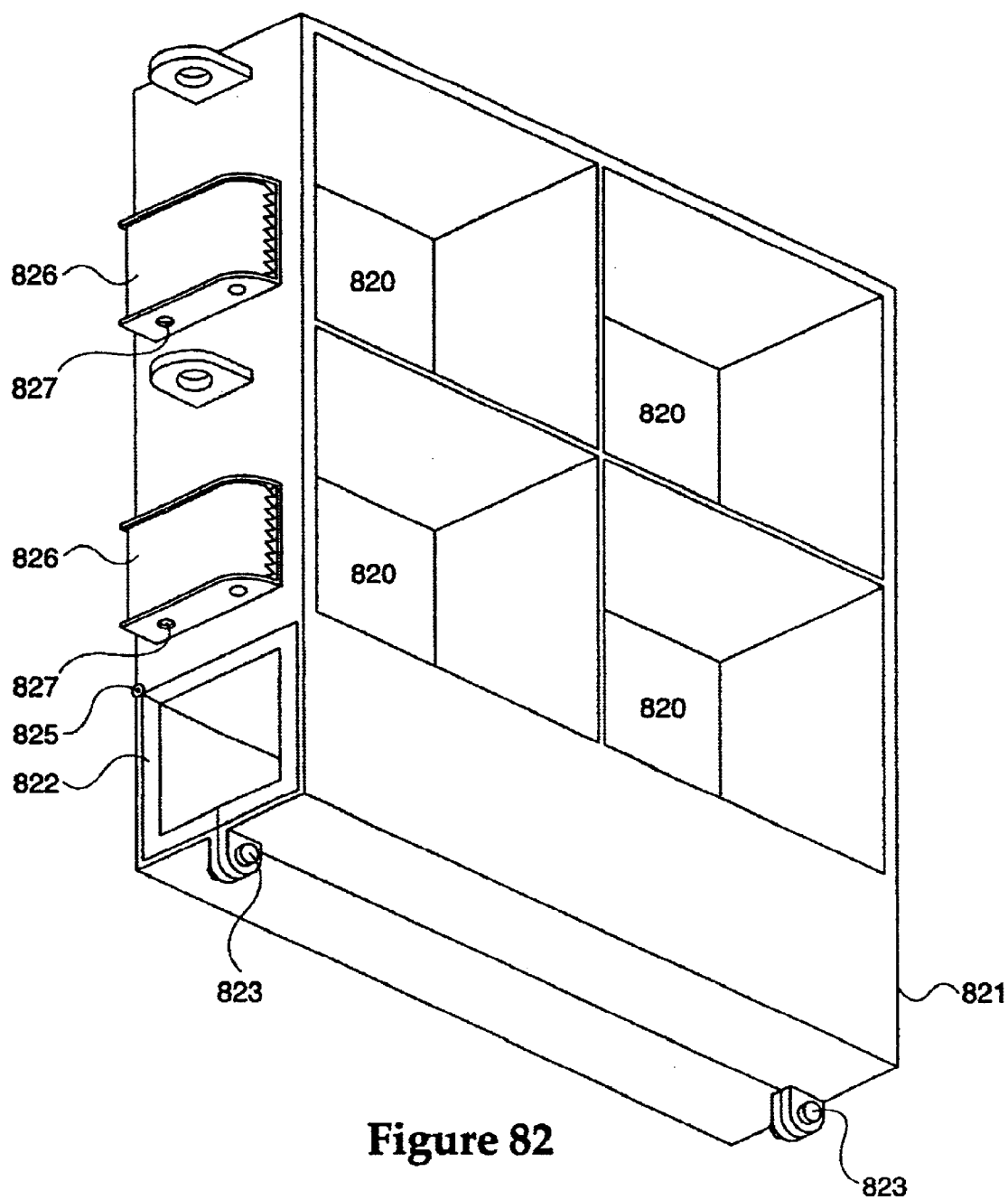
FIG. 82 is a perspective view of a jack post roof rack holder of the second embodiment of the present invention.

FIG. 82 is a perspective view of a jack post roof rack holder of the second embodiment of the present invention. This embodiment is a variation on one invention set forth above. In this embodiment of the present invention, a clamp 821 is provided which may be mounted to a truck ladder rack, car luggage rack, or the like. The clamp may be lined with compressible foam rubber 822 so as to securely grip various rack channel cross-sections without slipping. The use of the foam rubber allows the apparatus to be made for a number of different rack styles.

A draw-tight or ratchet strap 826 may be mounted to clamp 821 to secure a ladder or other object to the roof rack. Hooks for the strap may thus not be required. In addition, the strap may be locked to prevent loosening of the strap or petty theft or borrowing of the objects secured to the strap.

Figure 83:
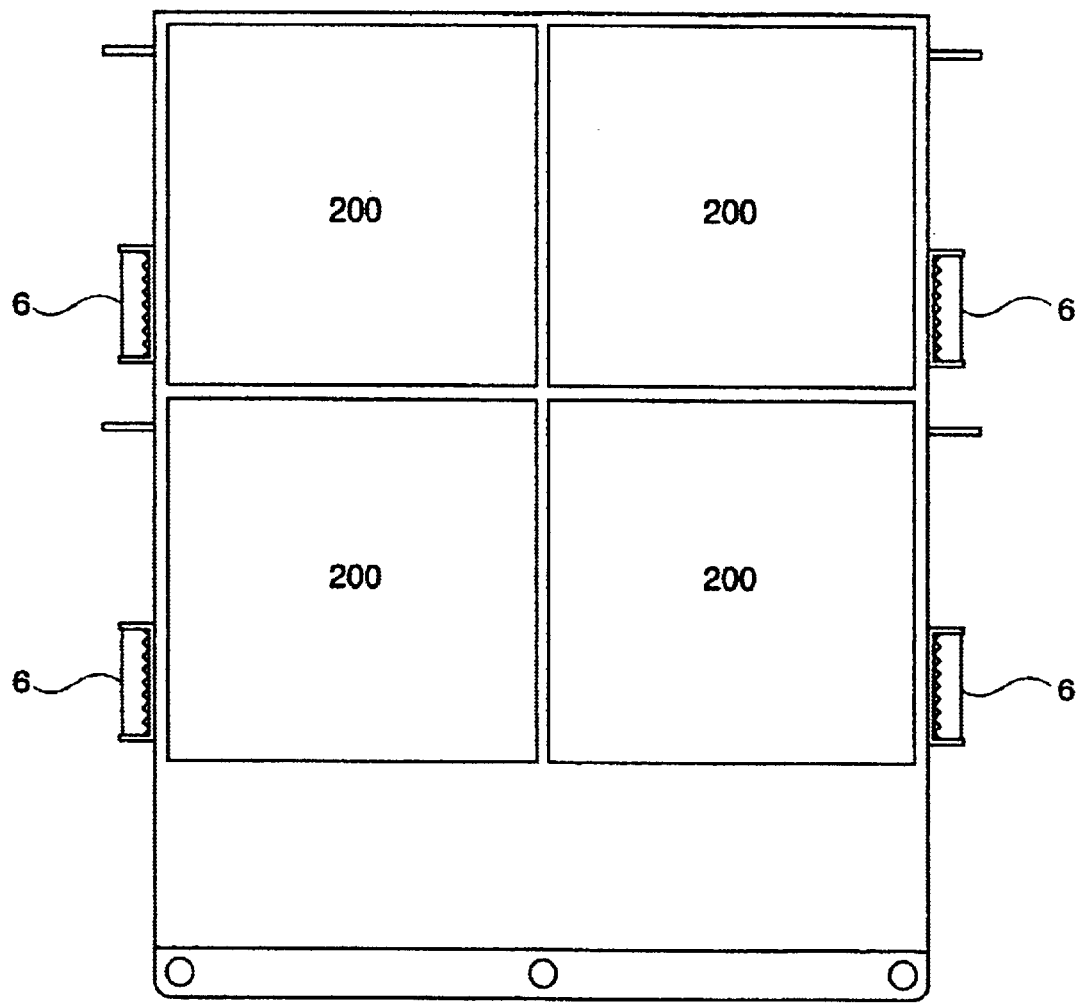
FIG. 83 is a front view of the jack post roof rack holder of the second embodiment of the present invention.

FIG. 82 is a perspective view of the rack strap of this embodiment of the present invention. FIG. 83 is an end view of the same. Clamp 821 may be mounted to a truck ladder rack, car luggage rack, or the like. Clamp 821 may be lined with compressible foam rubber 822 so as to securely grip various rack channel cross-sections without slipping.

Clamp 821 may be provided in two halves joined by hinge 825. The two halves may be attached though use of bolts or fasteners 823 which may be further secured by use of a safety clip. A strap (not shown) may be tightened by passing an end portion through one or more of buckles 826 which may be provided with a lock hole 827. Excess portions of the strap may be tied off or may be left to hang.

A padlock may be passed through lock hole 827 to prevent buckle 826 from being released. The strap may be locked to prevent loosening of the strap or petty theft or borrowing of the objects secured to the strap. Workers on a job site will be less inclined to "borrow" a jack post that is so locked. Of course, a determined thief may be able to cut the strap to release the jack post. However, an armored strap may be provided to prevent or discourage such theft.

In use, the strap may be wound around a portion of a jack post which may be inserted into one of openings 820. Note that although disclosed here in terms of a draw-tight strap, the present invention may also be applied to ratchet straps.

Two such devices may be used on either ends of a roof rack to secure several jack posts by placing the jack posts through openings 820 in the two devices.

The embodiment of the rack strap of the present invention may also be suitably modified for round tube racks. Other shapes may also be used (e.g., hexagon) without departing from the spirit and scope of the present invention.

Figure 84:
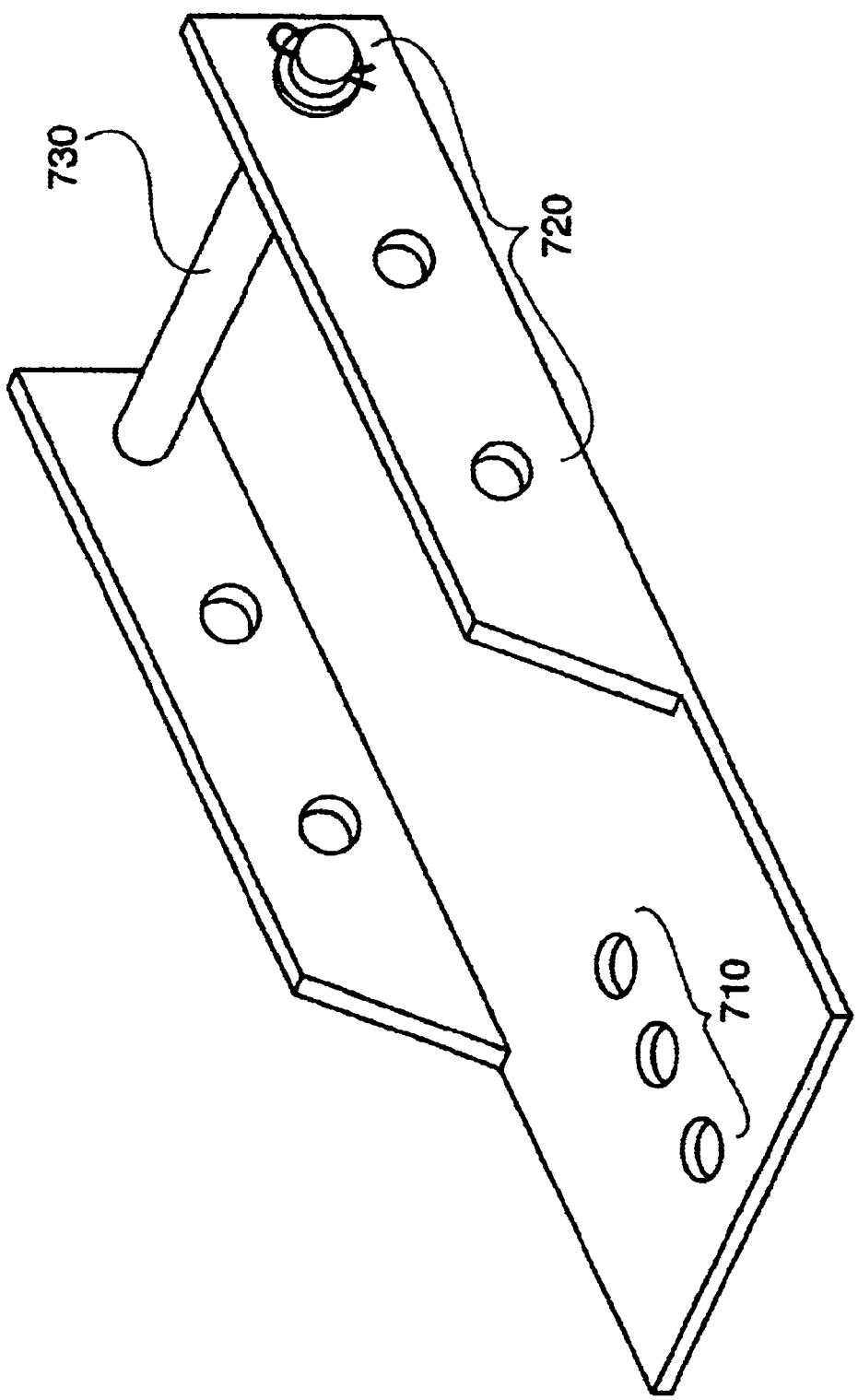
FIG. 84 is a perspective view of one embodiment of the SURETETHER™ invention.

FIG. 84 is a perspective view of another embodiment, a tie-off called Sure-Tether is provided to allow roofers to secure safety harnesses and ropes.

Plate 700 may be secured to a roof by nails or screws driven through nailing holes 710. Adjustable pin 730 may be placed through holes 720. In use, a safety line or the like may be secured to pin 730 to secure an individual or an apparatus such as a ladder or the like.

Figure 85:
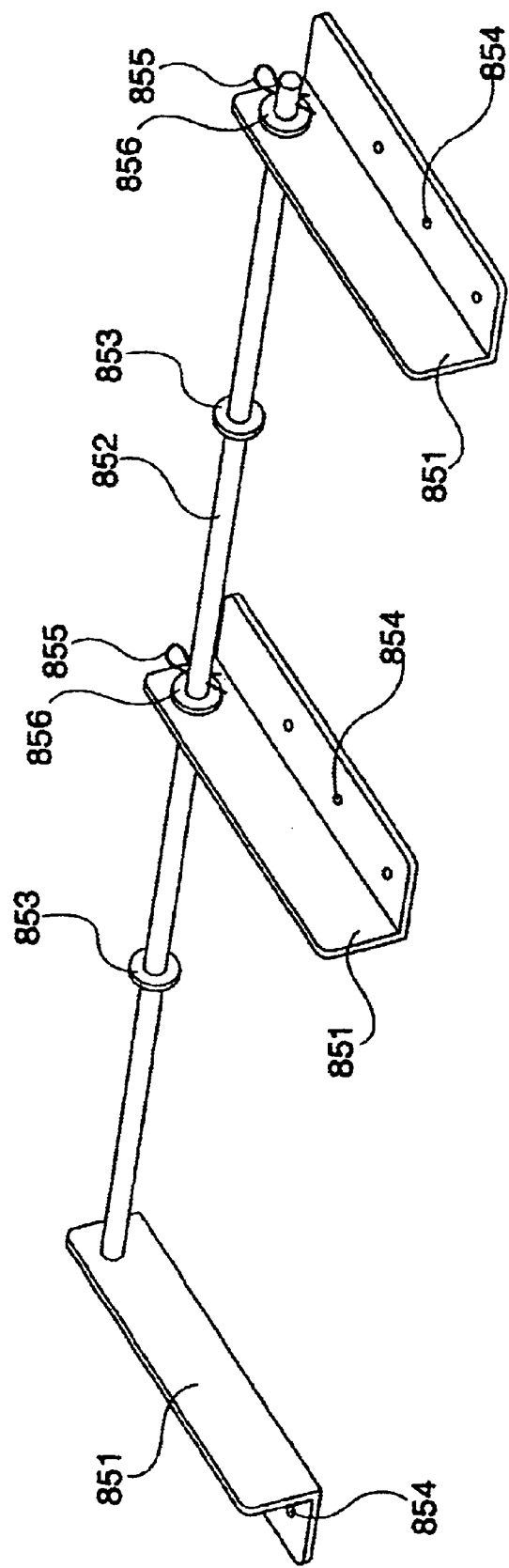
FIG. 85 is a perspective view of another embodiment of the SURETETHER™ of the present invention for roof trusses.

FIG. 85 is a perspective view of another embodiment of the SURETETHER™ embodiment of the present invention for roof trusses. This apparatus may be nailed or screwed to roof trusses (directly or through sheathing or other layers) to provide a tie-off point for tethers. Tethers amy be safety lines attached to safety harnesses for men, materials, and equipment, as well as scaffolding, ladders, and the like.

Bar 852 may be on the order of ¾" to 1" in diameter and may be made of steel or aluminum. A number of holes may be drilled in bar 852 in one foot increments (or the like) to allow insertion of pins 855 securing washers 853 and 855 (not shown for washer 853 in this drawing). A workman may clip or tie a line to bar 852. Washers 853 prevent the line from sliding along bar 852 very far.

Plates 851 may be nailed or screwed through holes 854 into roof trusses. Plates 851 are adjustable on bar 852 for different roof truss center distances (e.g., 16", 24" and the like). The overall length of bar 852 may be on the order of 6 feet, allowing for multiple tie-offs or allowing a roofer to move his tie-off as work progresses.

Figure 86:
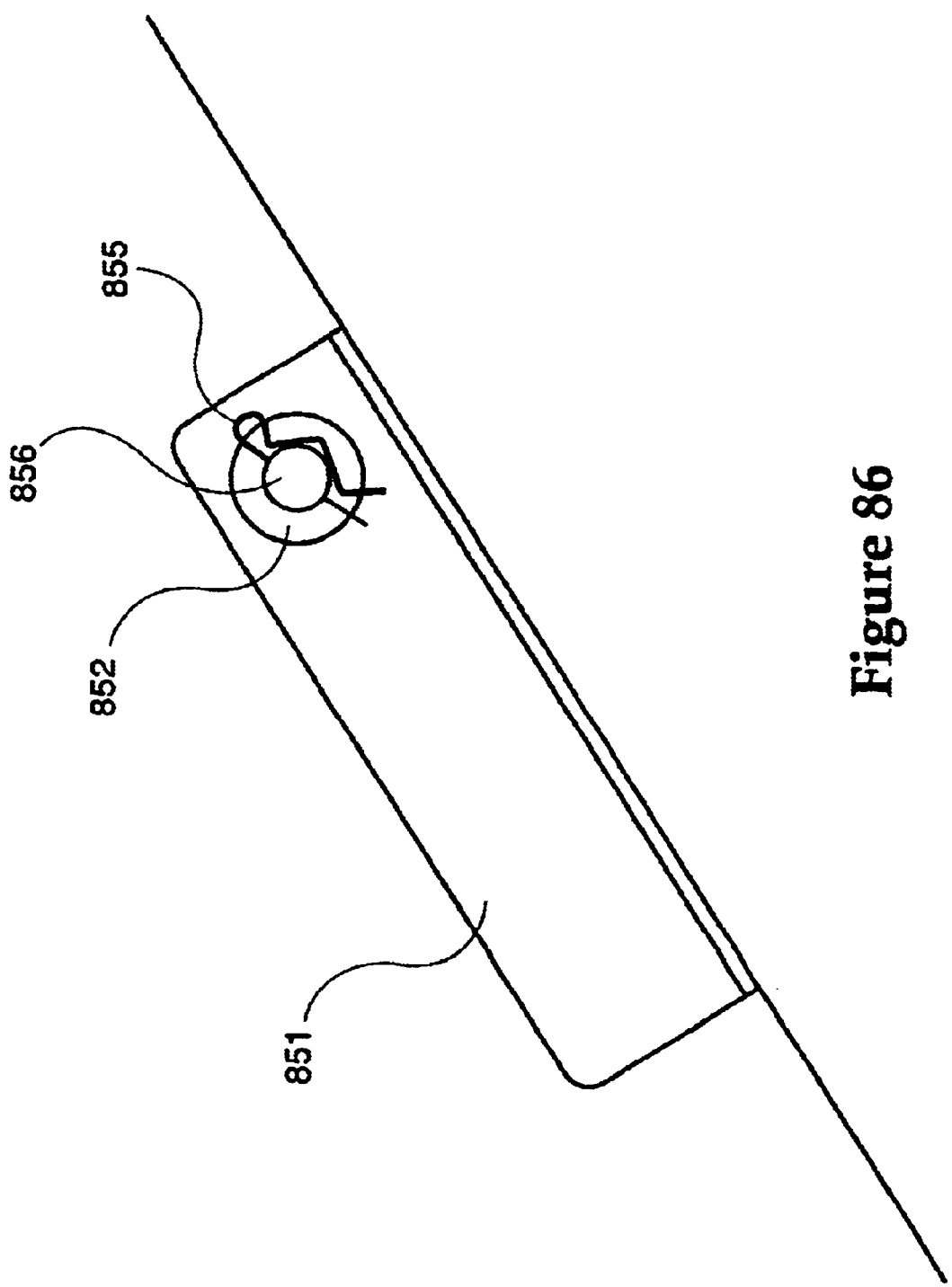
FIG. 86 is a side view of the SURETETHER™ embodiment of the present invention.
Figure 87:
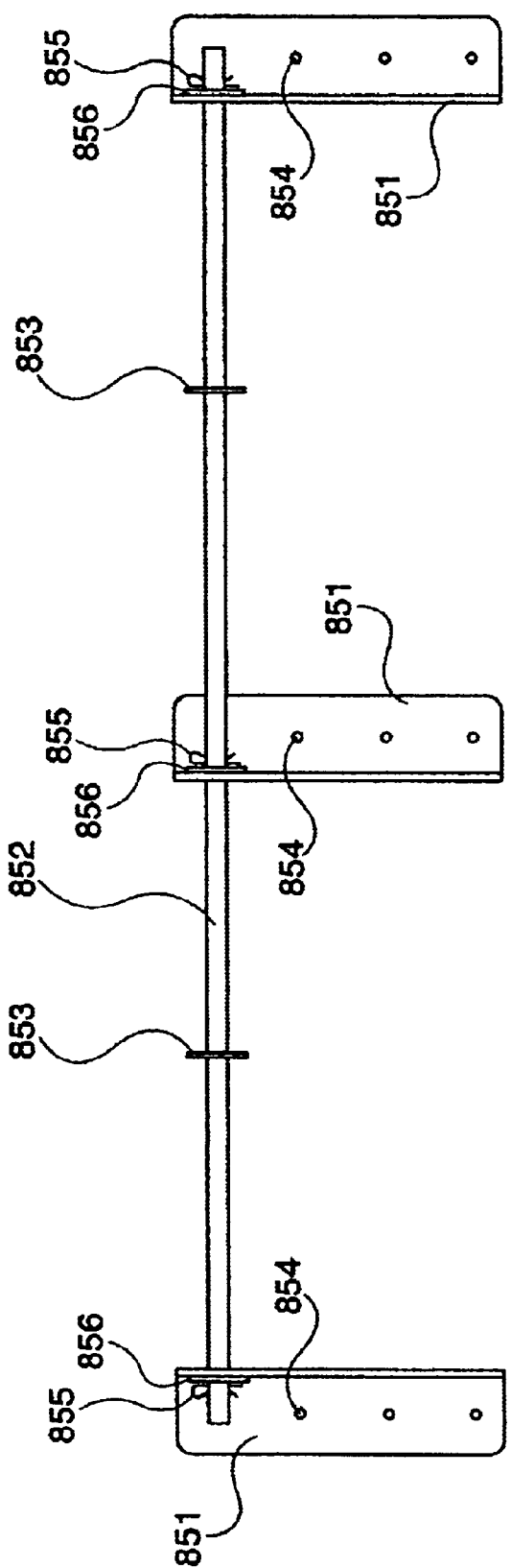
FIG. 87 is a top plan view of the SURETETHER™ embodiment of the present invention for roof trusses.

FIG. 86 is a side view of the SURETETHER™ embodiment of the present invention illustrating how the unit would appear on an inclined roof. FIG. 87 is a top plan view of the SURETETHER™ embodiment of the present invention for roof trusses.

Figure 89:
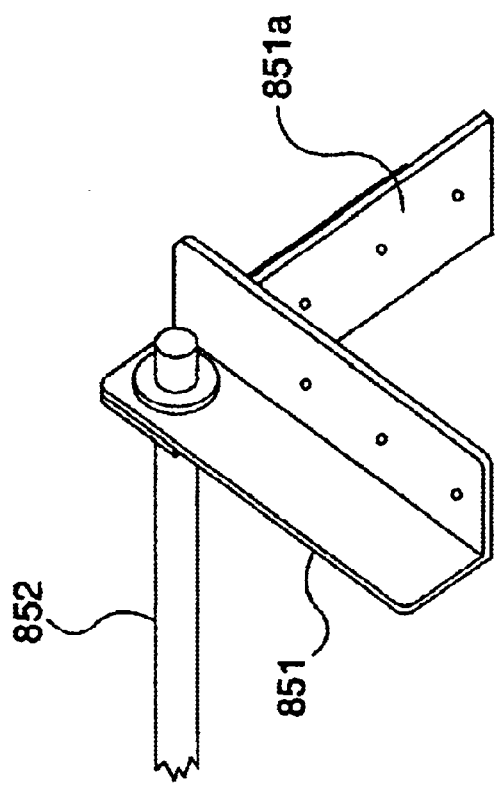
FIG. 89 is a perspective view of the alternative version SURETETHER™ embodiment of the present invention of FIG. 1E.
Figure 88:
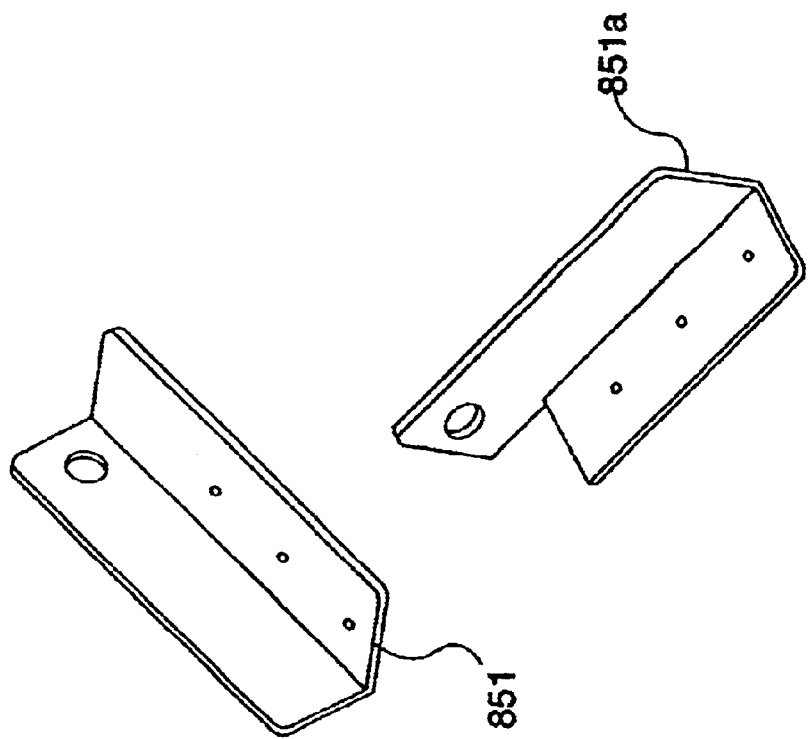
FIG. 88 is an exploded perspective view of an alternative version of the SURETETHER™ embodiment of the present invention.

FIG. 88 is an exploded perspective view of an alternative version of the SURETETHER™ embodiment of the present invention. In this embodiment, individual plates 88A or 88B may be nailed to roof trusses to provide individual tie-off points through the bar hole. FIG. 89 is a perspective view of the alternative version SURETETHER™ embodiment of the present invention of FIG. 88. In this embodiment, plates A and B are assembled on a bar to hold a tie-off bar on a roof peak such that the tie-off bar is accessible to both sides of the roof.

Figure 90:
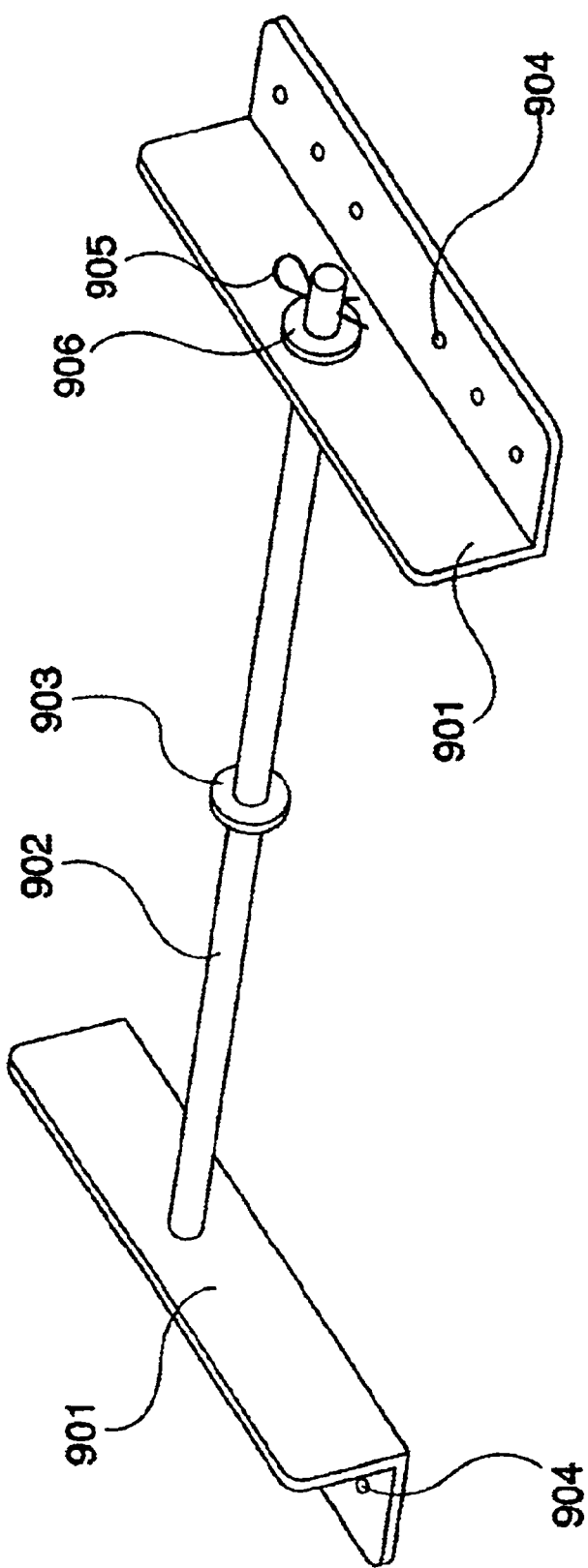
Figure 91:
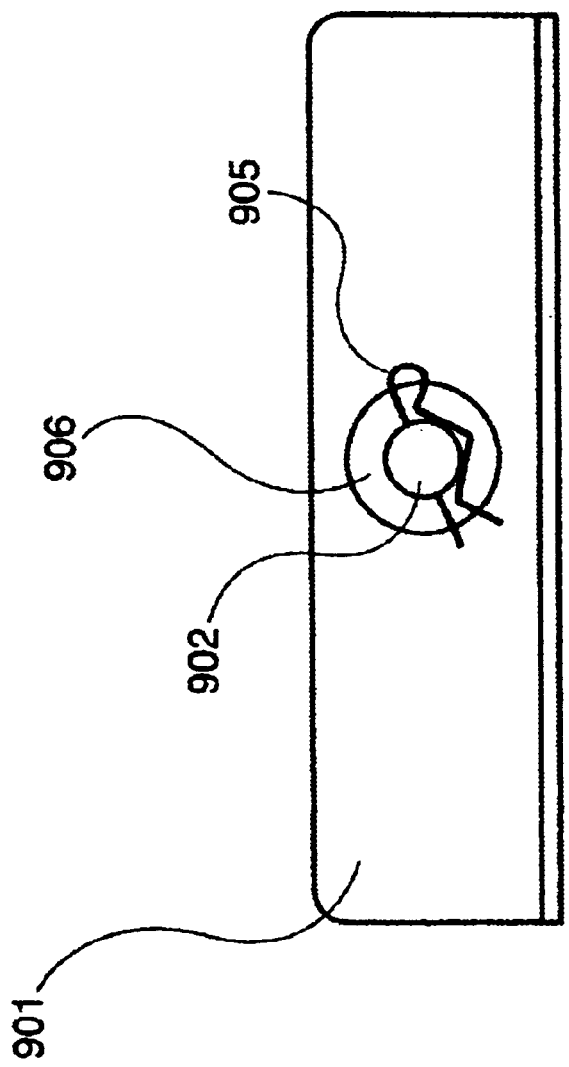
FIG. 91 is a side view of the SURETETHER™ embodiment of the present invention.
Figure 92:
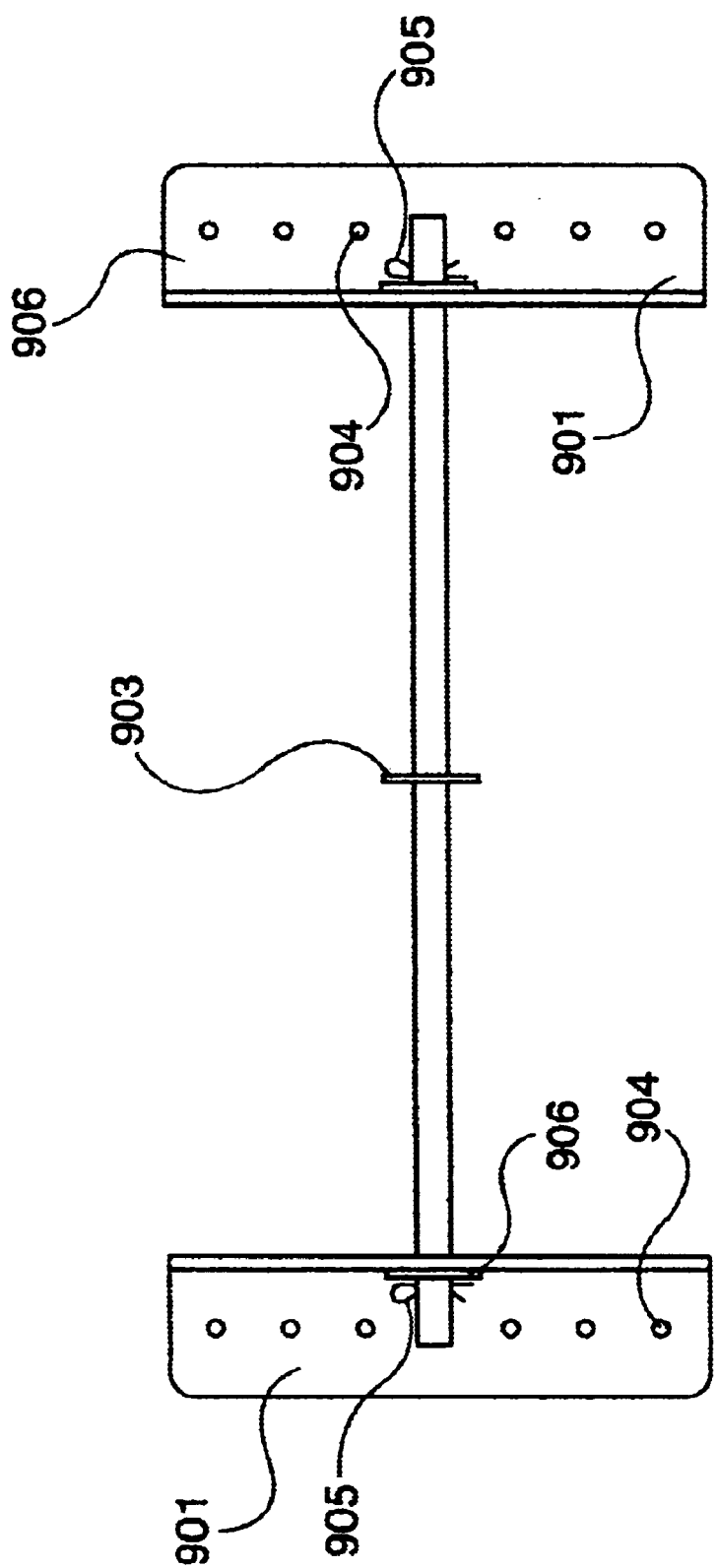

FIG. 90 is a perspective view of the SURETETHER™ embodiment of the present invention for walls and the like. This shorter, smaller embodiment may be used also on roofs. The spacing between plates 901 may be on the order of two feet to allow nailing to wall studs. FIG. 91 is a side view of the SURETETHER™ embodiment of the present invention. FIG. 92 is a side view of the SURETETHER™ embodiment of the present invention shown on a wall or flat surface.

In FIGS. 90–92, plates 901 may be secured to a roof by nails or screws driven through nailing holes 904. Bar 902 may be on the order of ¾" to 1" in diameter and may be made of steel or aluminum. Holes may be drilled in bar 902 in to allow insertion of pins 905 securing washers 906. A workman may clip or tie a line to bar 902. A washers 903 may be welded to bar 902 or secured by clips, to prevent the line from sliding along bar 902 very far.

Plates 901 may be nailed or screwed through holes 904 into roof trusses. Plates 901 may be adjustable on bar 902 for different roof truss center distances (e.g., 16", 24" and the like). The overall length of bar 902 may be on the order of two feet, allowing for multiple tie-offs or allowing a roofer to move his tie-off as work progresses.

Figure 93:
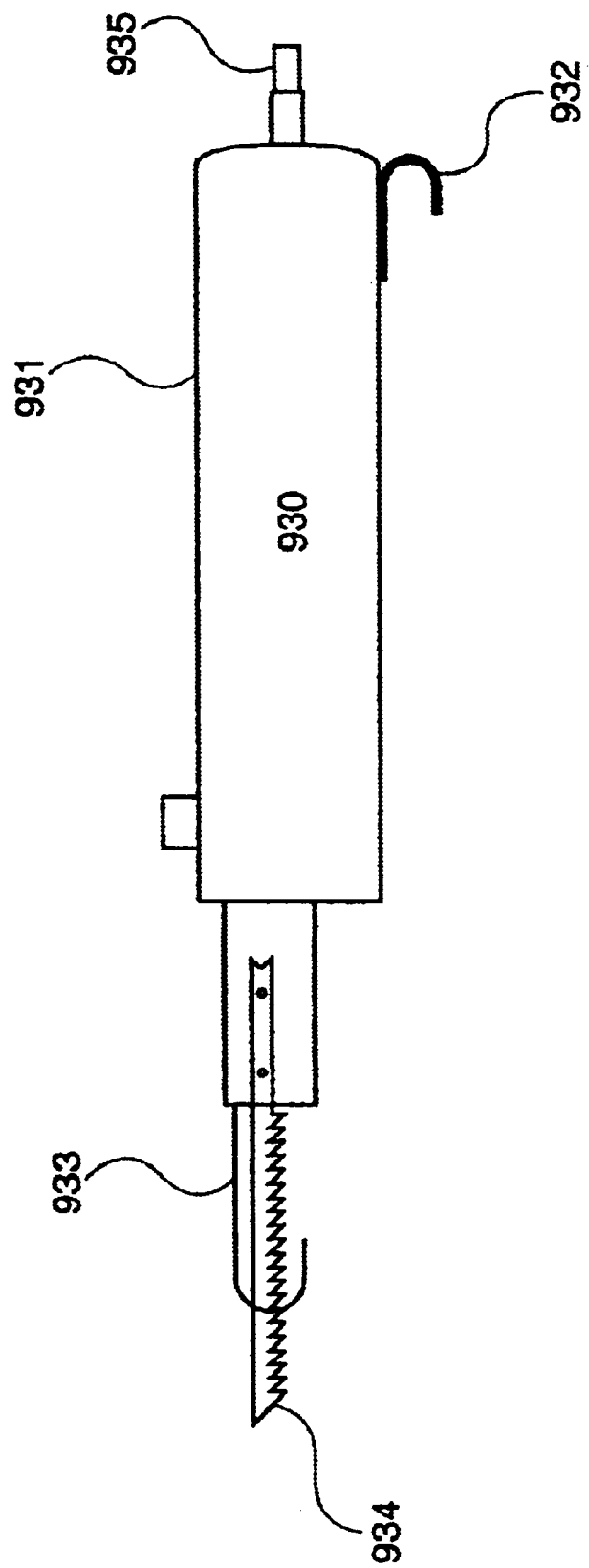
FIG. 93 is a side view of a pneumatic powered roof shingle cutting tool of the present invention.

FIG. 93 is a side view of a pneumatic powered roof shingle cutting tool of the present invention. When installing roofing materials, it is often necessary to cut shingles either before installation, or in situ. For example, when building a roof "Valley", shingles may be installed over the valley, and then later cut to the valley "V" shape. Traditionally, a knife has been used for such cuts. However, there is little precision in depth of cut with a knife, and in addition, such a cut can be laborious and difficult. Too deep a cut may create roof leaks.

Power tools are generally not well suited to cutting shingles. Most are heavy and require electrical power. In addition, large power tools present a hazard to workers below if they fall off the roof. What is needed is a small powered tool which can cut shingles accurately and cleanly. The SHINGLESAW™ 930 of FIG. 93 is, in the preferred embodiment, a pneumatically powered miniaturized reciprocating saw designed especially for roofing applications. In an alternative embodiment, SHINGLESAW™ 930 may be powered by rechargeable battery packs or the like.

SHINGLESAW™ 930 may be provided with a cutting blade 932 of approximately 2" in length. SHINGLESAW™ 930 may be sized to fit in one hand, much as a prior art razor knife is designed to fit. Adjustable depth gauge 933 may be adjusted to control depth of cut and prevent blade 932 for piercing underlayment or the like. A hook 932 may be provided to allow SHINGLESAW™ to be clipped to a belt or the like. Air chuck 935 allows SHINGLESAW™ to be connected to an air line (such as used for roofing nail guns or the like).

Figure 94:
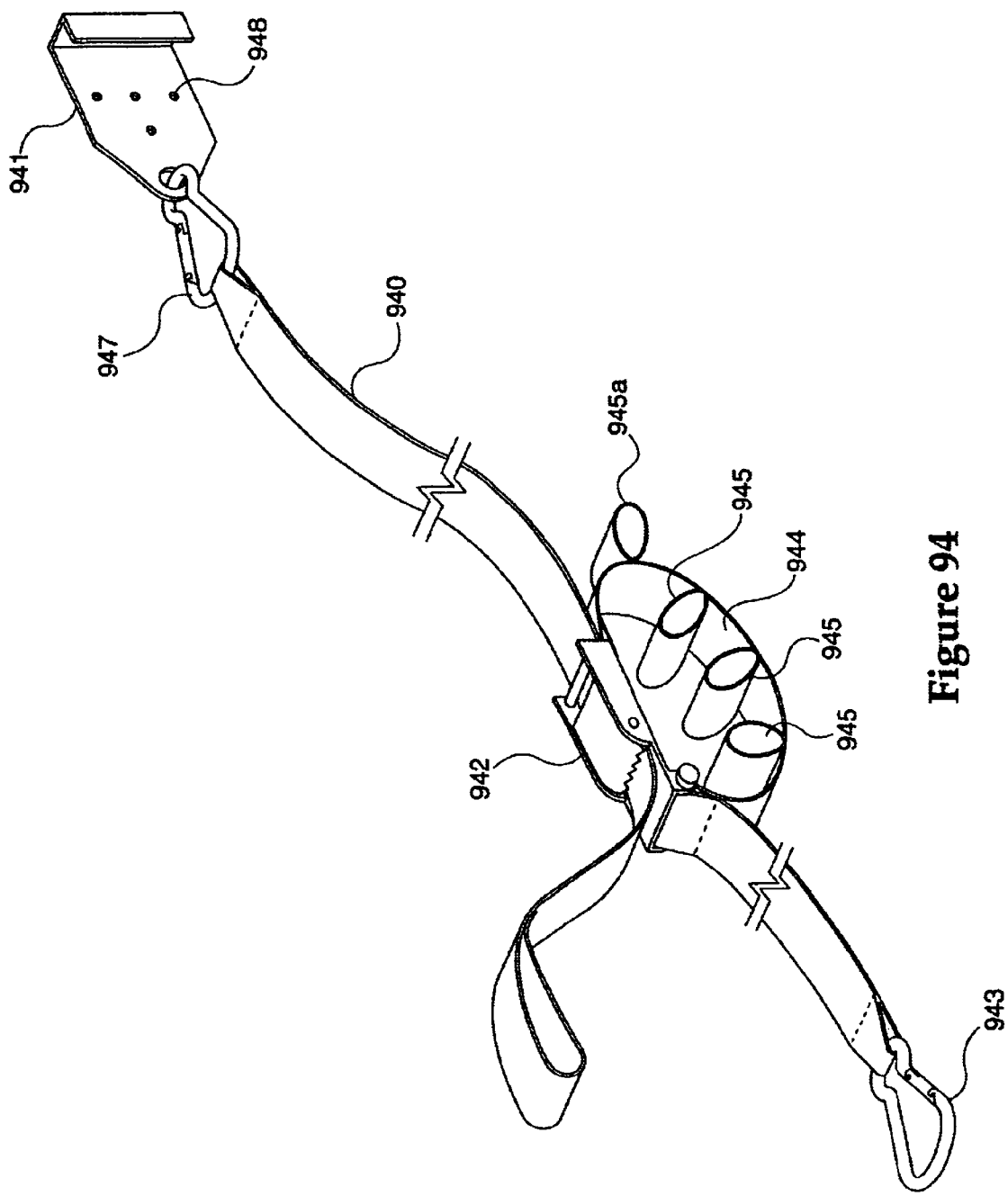
FIG. 94 is a perspective view of another embodiment of the "soft" version of the SUREFOOT™ invention of the present invention.

FIG. 94 is a perspective view of an embodiment of the "soft" version of the SUREFOOT™ invention of the present invention. In the embodiment of FIG. 94, a clip 941 may be provided which may be attached to a roof surface or other feature via its clip portion of by nail holes 948. The main portion of this embodiment comprises a strap 940 which may be fed through buckle 942. Also attached to buckle 942 is loop-strap 944 provided with sewn loops 945. loop-strap 944 may be wrapped around one leg of a ladder or the like, with sewn loops 945 gripping the ladder leg. Buckles 943, 947 may be used to tie-off to clip 941, other features, or to a user.

Figure 95:
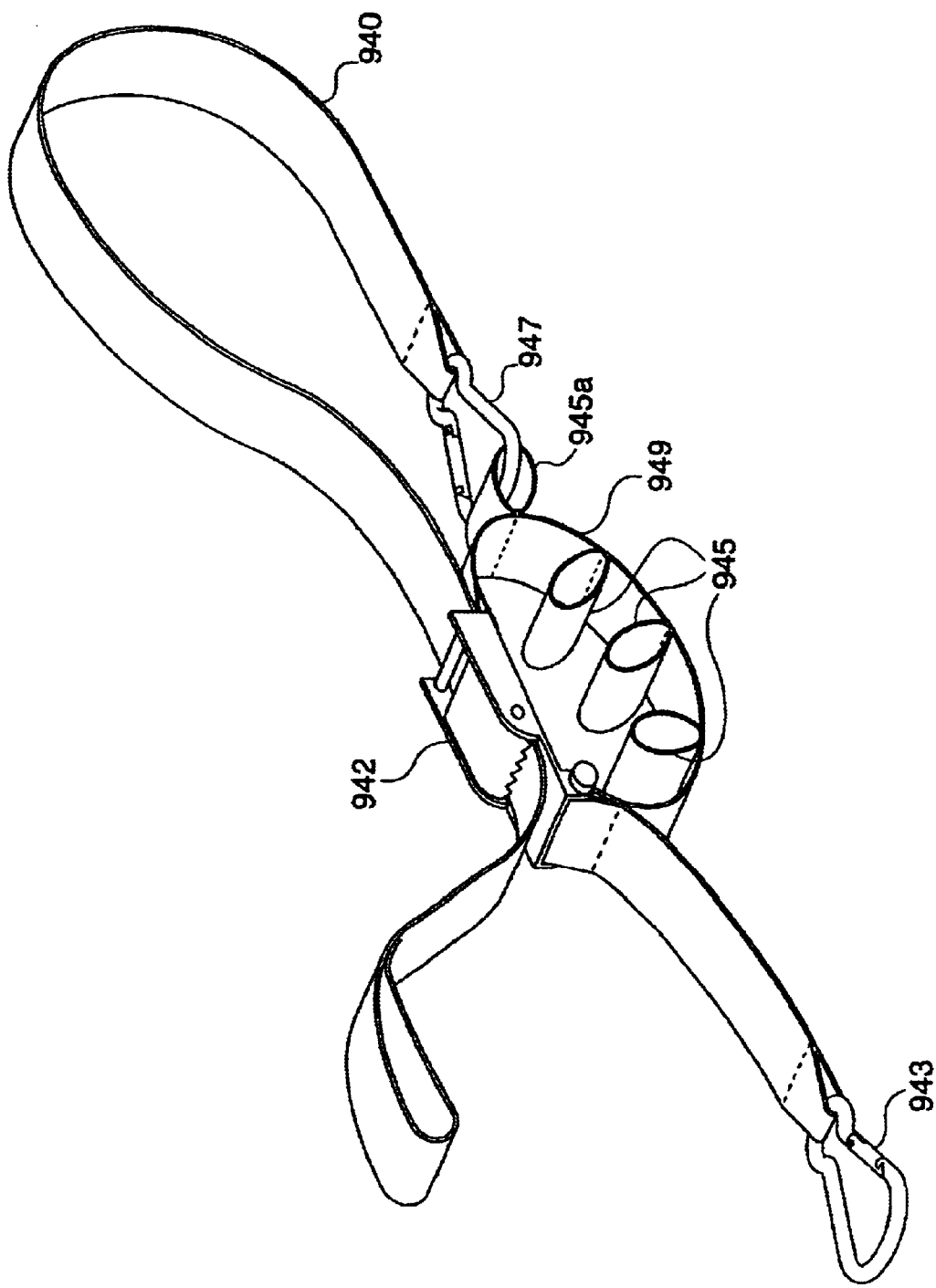
FIG. 95 is a perspective view of another embodiment of the "soft" version of the SUREFOOT™ invention of the present invention.

FIG. 95 is a perspective view of another embodiment of the "soft" version of the SUREFOOT™ invention of the present invention. In the illustration of FIG. 95, clip 947 may be attached to outer sewn loop 945a. In this manner, strap 940 may be secured around an object, such as a tree or utility pole or the like.

Figure 96:
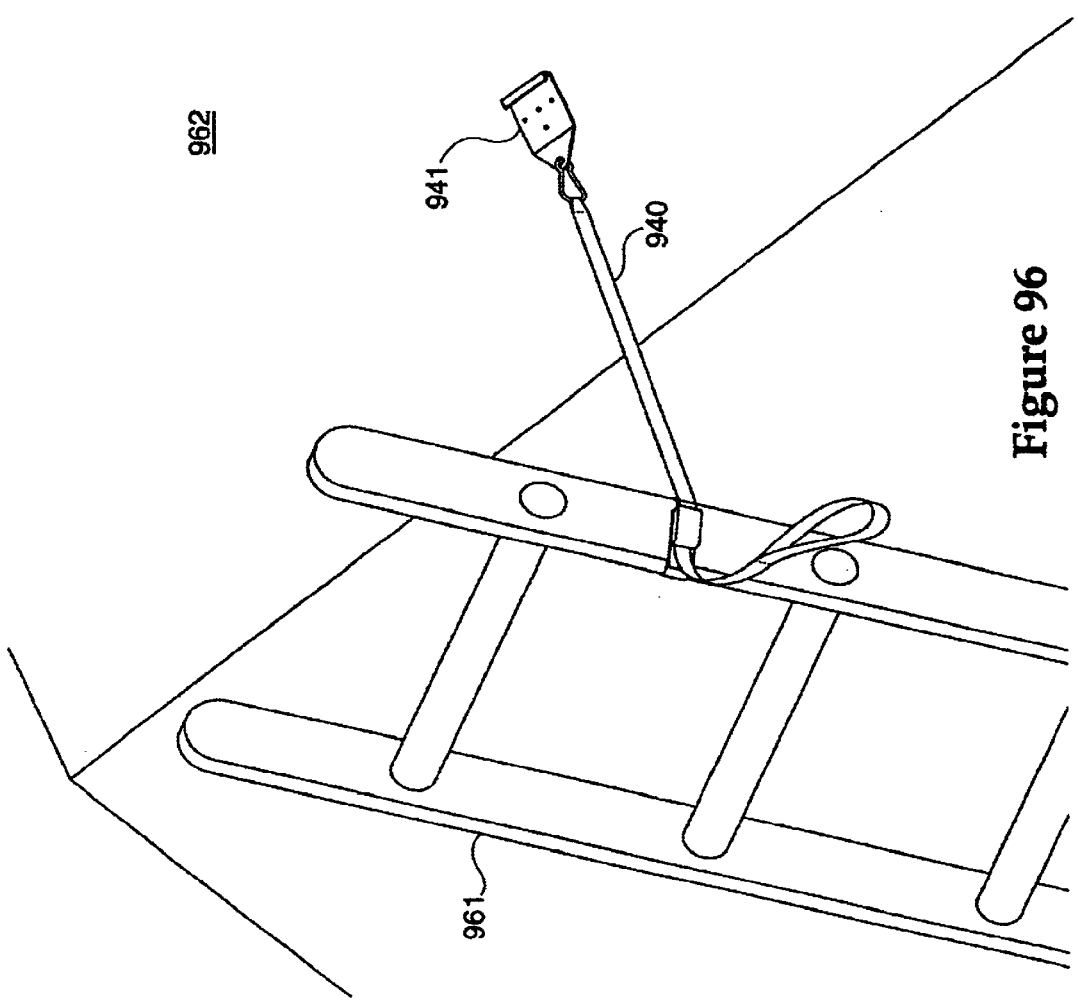
FIG. 96 is a perspective view of another embodiment of the "soft" version of the SUREFOOT™ invention of the present invention, illustrating how the invention may be used to secure a ladder to a roof.

FIG. 96 is a perspective view of another embodiment of the "soft" version of the SUREFOOT™ invention of the present invention, illustrating how the invention may be used to secure a ladder 961 to a roof 962. In this embodiment, clips 941 may be secured to the roof 962 by nails or the like. In an alternative embodiment, clops 941 may be permanently attached to roof 962 at predetermined intervals at the roof edge (e.g., portion of clip beneath shingle edge) or may be attached to soffits, gutter hardware, or the like. In this manner, clips may be installed for later use in cleaning gutters, roof access, and the like. Clips 941 may be suitably shaped for such applications.

Figure 97:
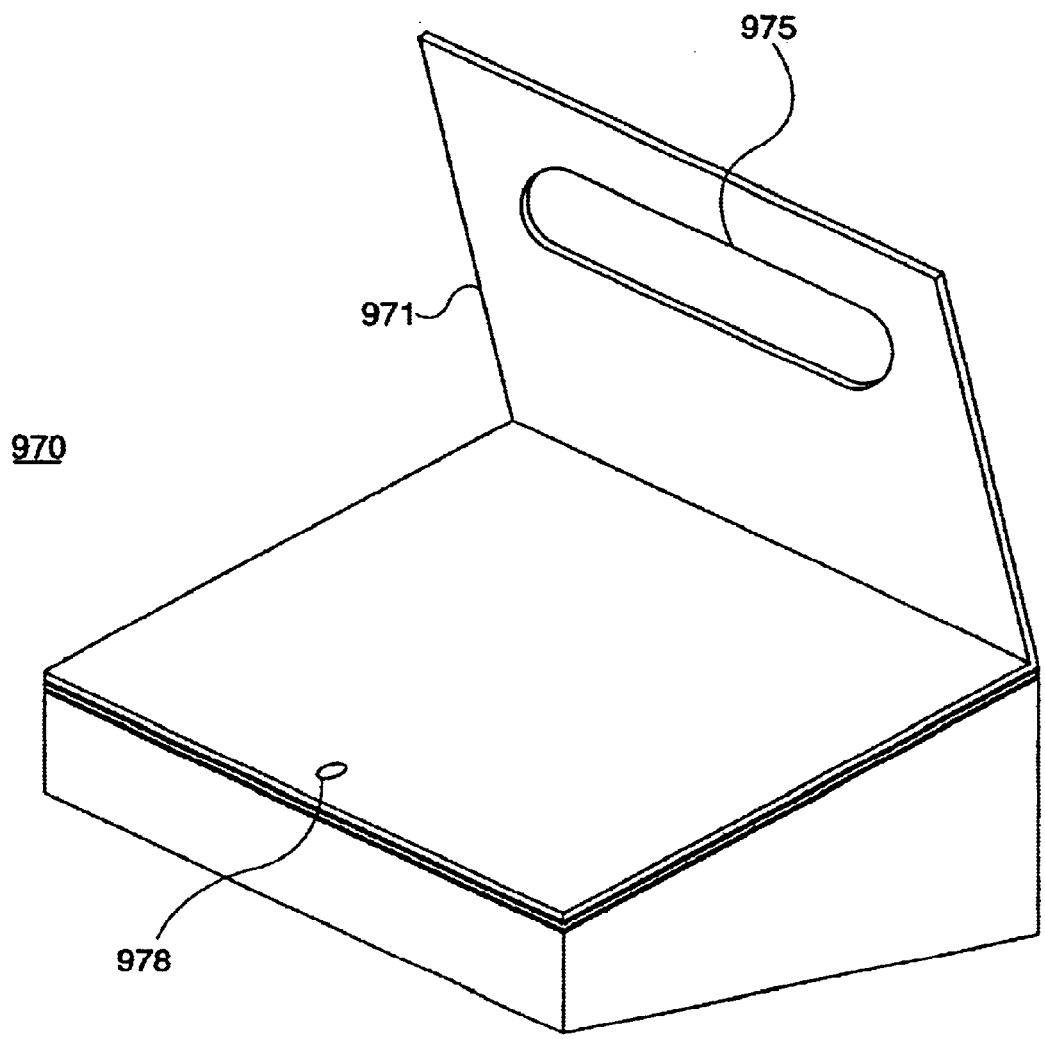
FIG. 97 is a perspective view of another embodiment of the SHINGLE WEDGE™ the present invention.
Figure 98:
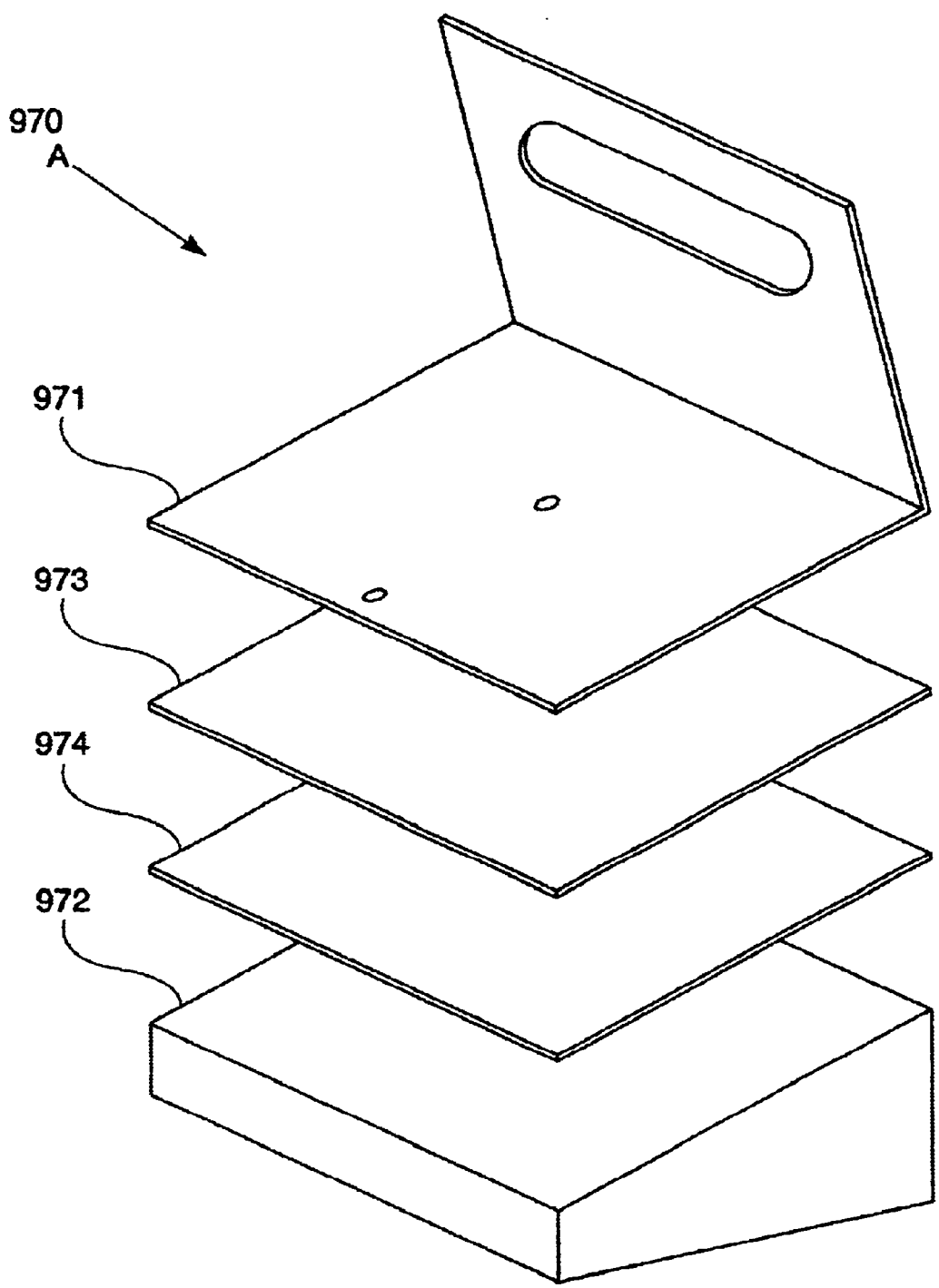
FIG. 98 is an exploded perspective view of the SHINGLE WEDGE™ of FIG. 97.
Figure 99:
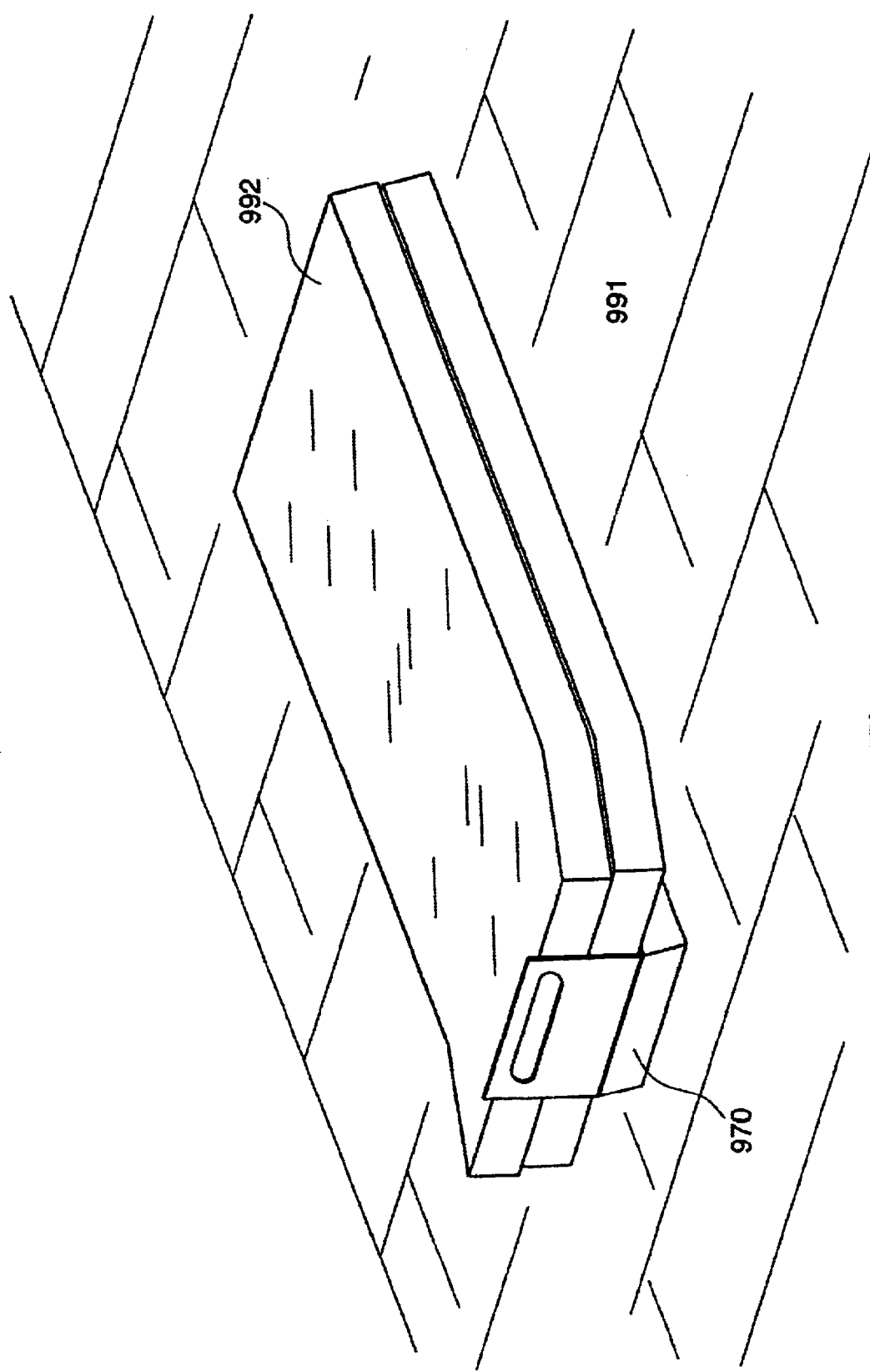
FIG. 99 is a perspective view of the SHINGLE WEDGE™ of FIG. 97, in use on a roof.

FIG. 97 is a perspective view of another embodiment of the SHINGLE WEDGE™ of the present invention. FIG. 98 is an exploded perspective view of the SHINGLE WEDGE™ of FIG. 97. FIG. 99 is a perspective view of the SHINGLE WEDGE™ of FIG. 97, in use on a roof. SHINGLE WEDGE™ 970 comprises an aluminum or steel base plate 971 bent into an "L" shape with handle 975 and nail hole 978. Wedge-shaped foam insert 972 may be attached to base plate 971 via velcro pieces 973 and 974.

Thus, as foam insert 972 wears, it may be replaced simply by removing it using the velcro fasteners 973 and 973. In an alternative embodiment, foam insert 972 may be glued or otherwise fastened to base plate 971. Foam insert 972 may comprise expanded polyurethane foam such as that used for furniture cushions and the like and commonly available at fabric stores and the like. Other elastomeric materials may be substituted for foam insert 972 without departing from the spirit and scope of the present invention.

As illustrated in FIG. 99, SHINGLE WEDGE™ may be placed on a roofing surface, preferably with one end wedged beneath the lower edge of an existing shingle. A nail, screw, or other fastener may be driven through nail hole 978 to secure the apparatus to the roof 991. Packages (bundles) of shingles 992 may then be placed on the roof 991 and SHINGLE WEDGE™ 970. SHINGLE WEDGE™ 970 prevents the shingles 992 from sliding off the roof. When in use, the apparatus can be easily and readily moved about the roof as work progresses.

Figure 100:
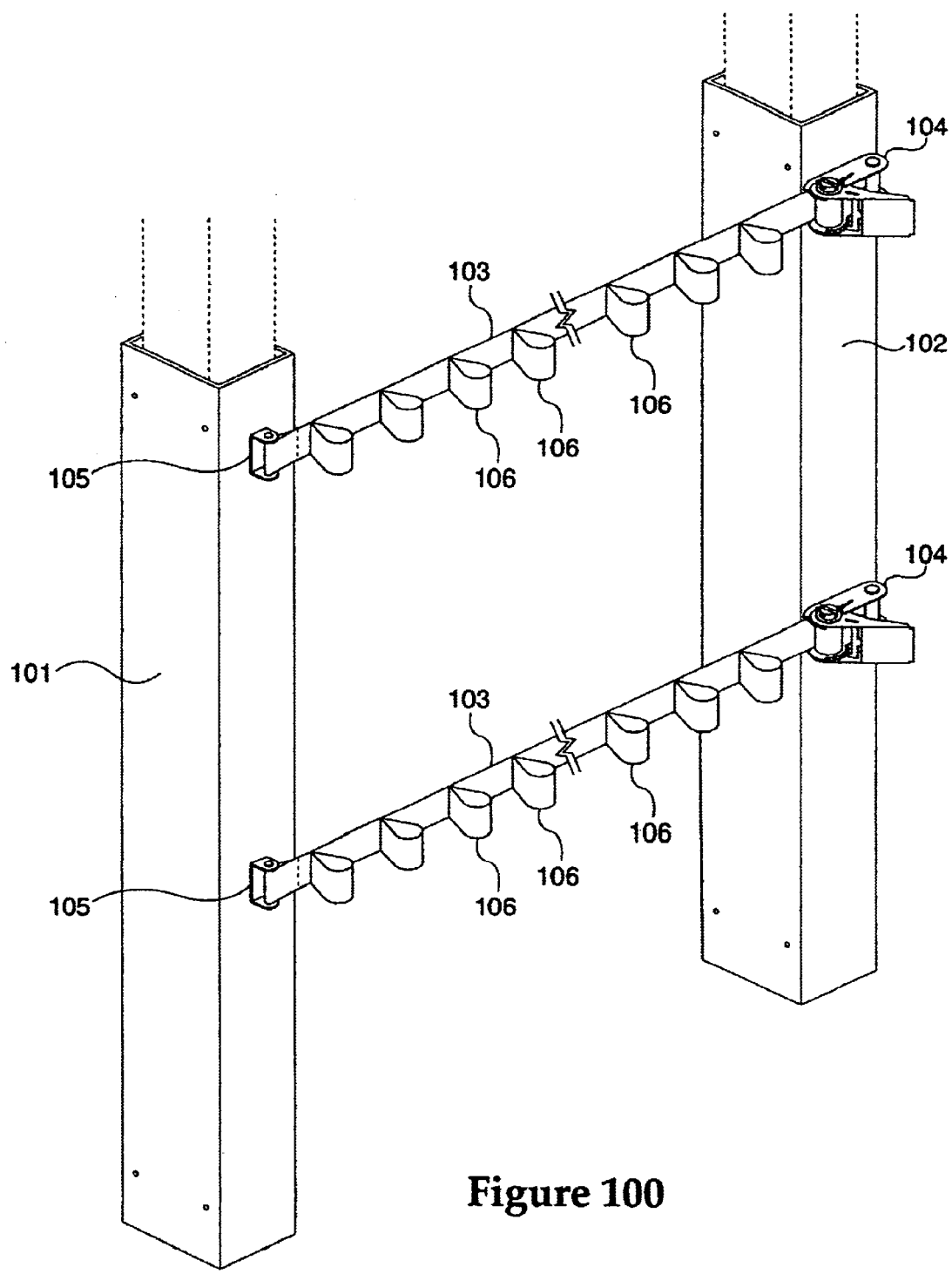
FIG. 100 is a perspective view of an embodiment of the "soft" version of the SURETETHER™ invention of the present invention, illustrating installation using jack post sleeves.

FIG. 100 is a perspective view of an embodiment of the "soft" version of the SURETETHER™ invention of the present invention, illustrating installation using jack post sleeves 101 and 102. Jack post sleeves 101 and 102 may be slid over scaffold jack posts and held in place by gravity (e.g., against scaffold supports) or by a clamping mechanism or the like.

Attached to jack post sleeve 101 is a attachment point 105 for a strap 103 which is attached to jack post sleeve 102 via ratchet strap 104. When properly set up, strap 103 is maintained in tension. Strap 103 is provided with a plurality of sewn-in loops 106 to use as tie-off locations for workers.

Figure 101:
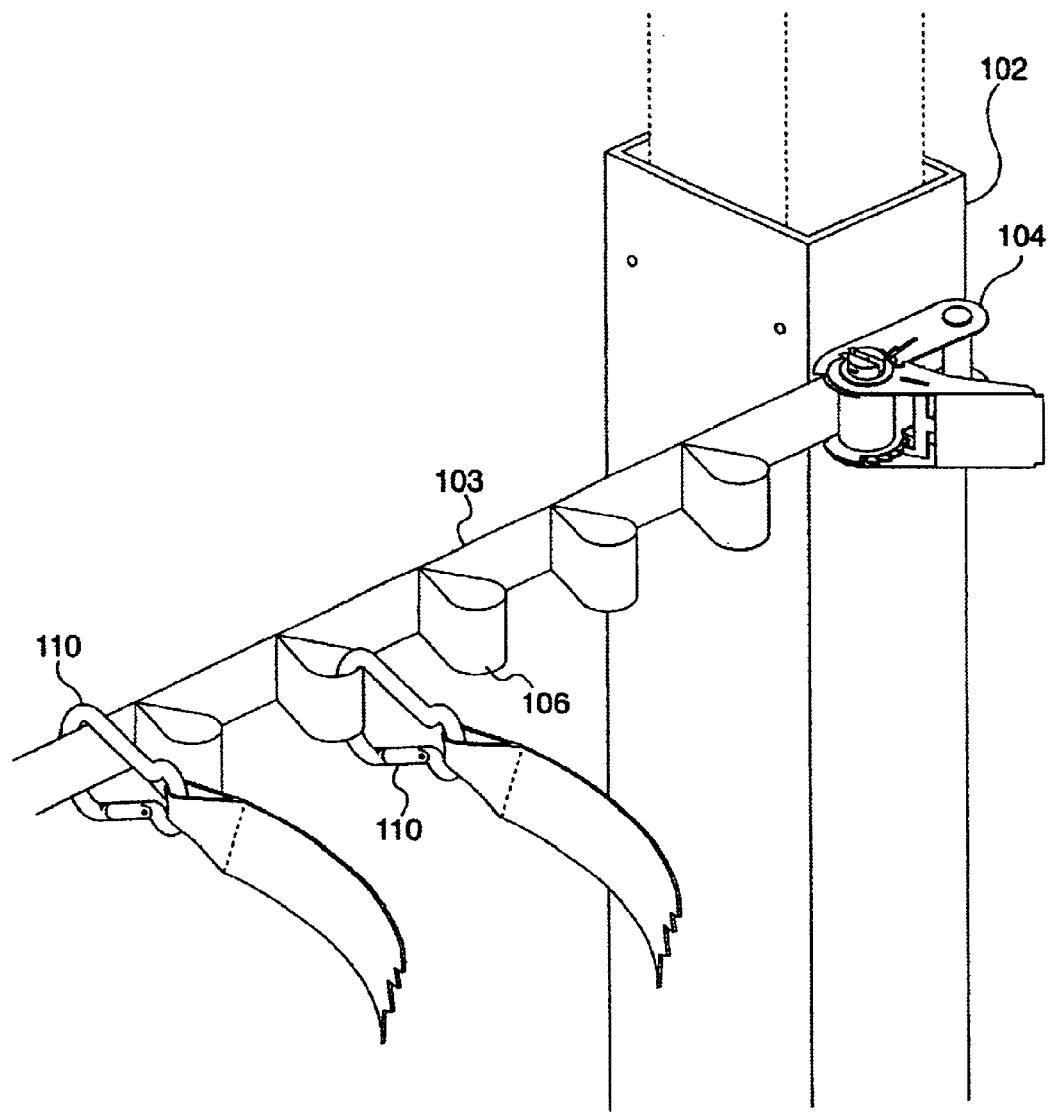

FIG. 101 is a perspective view of another the "soft" version of the SURETETHER™ of FIG. 100 illustrating how safety straps may be clipped on. A worker can move down the strap by attaching his safety harness clip 110 over the strap and sliding it along as he moves. Once in a localized position, the worker can then attach to one of the plurality of sewn-in strap loop 106, as illustrated in FIG. 101.

Figure 102:
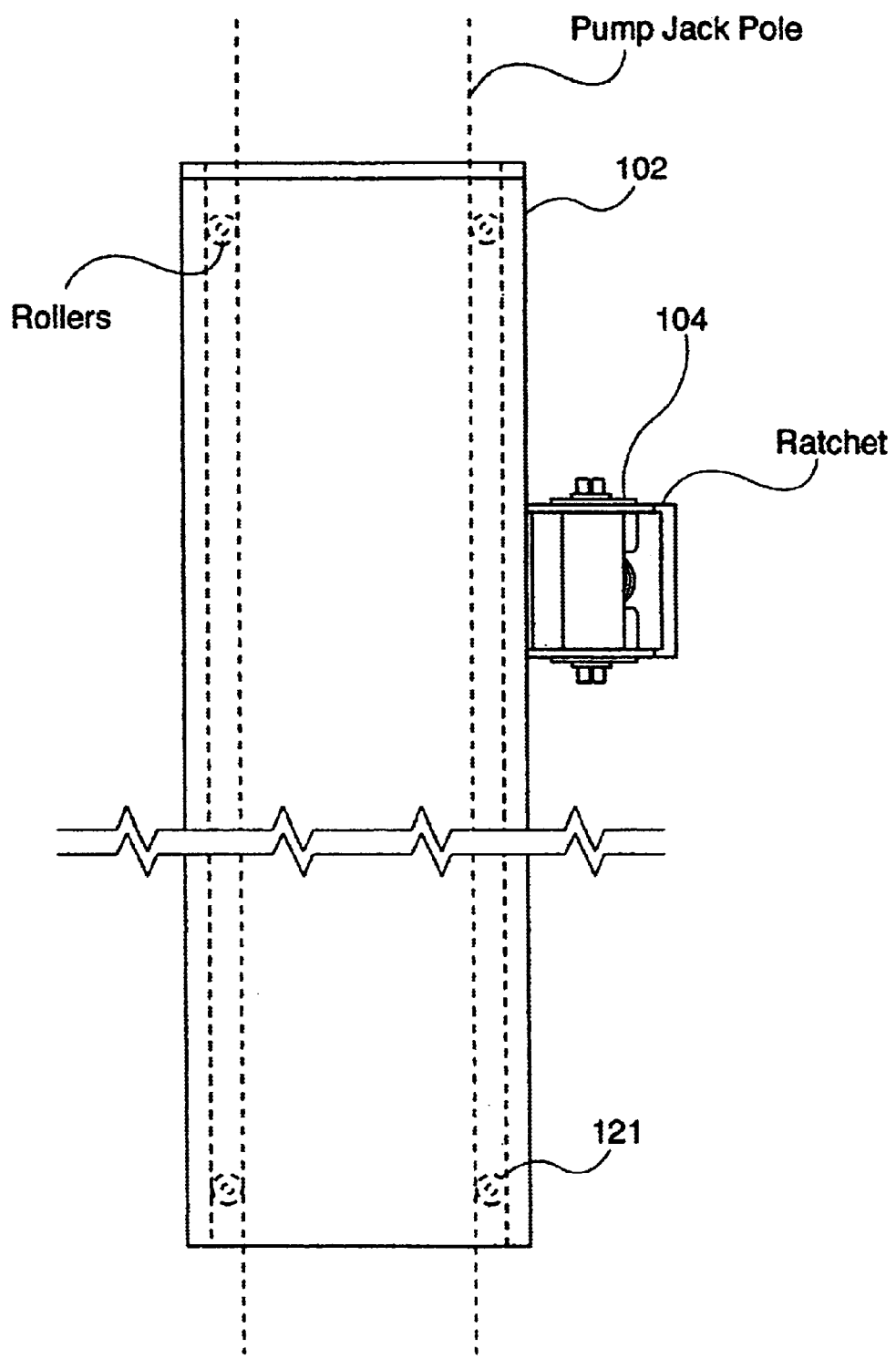
FIG. 102 is a perspective view of another embodiment of the "soft" version of the SURETETHER™ invention of the present invention, illustrating how the pump jack sleeves may be provided with a rolling mechanism to allow for movement with work.

FIG. 102 is a perspective view of another embodiment of the "soft" version of the SURETETHER™ invention of the present invention, illustrating how the pump jack sleeves may be provided with a rolling mechanism to allow for movement with work. Rollers 121 may be provided within jack post sleeve 102 (and 101) to allow the jack post sleeve to freely slide along the jack post as the scaffolding is jacked up the post.

Figure 103:
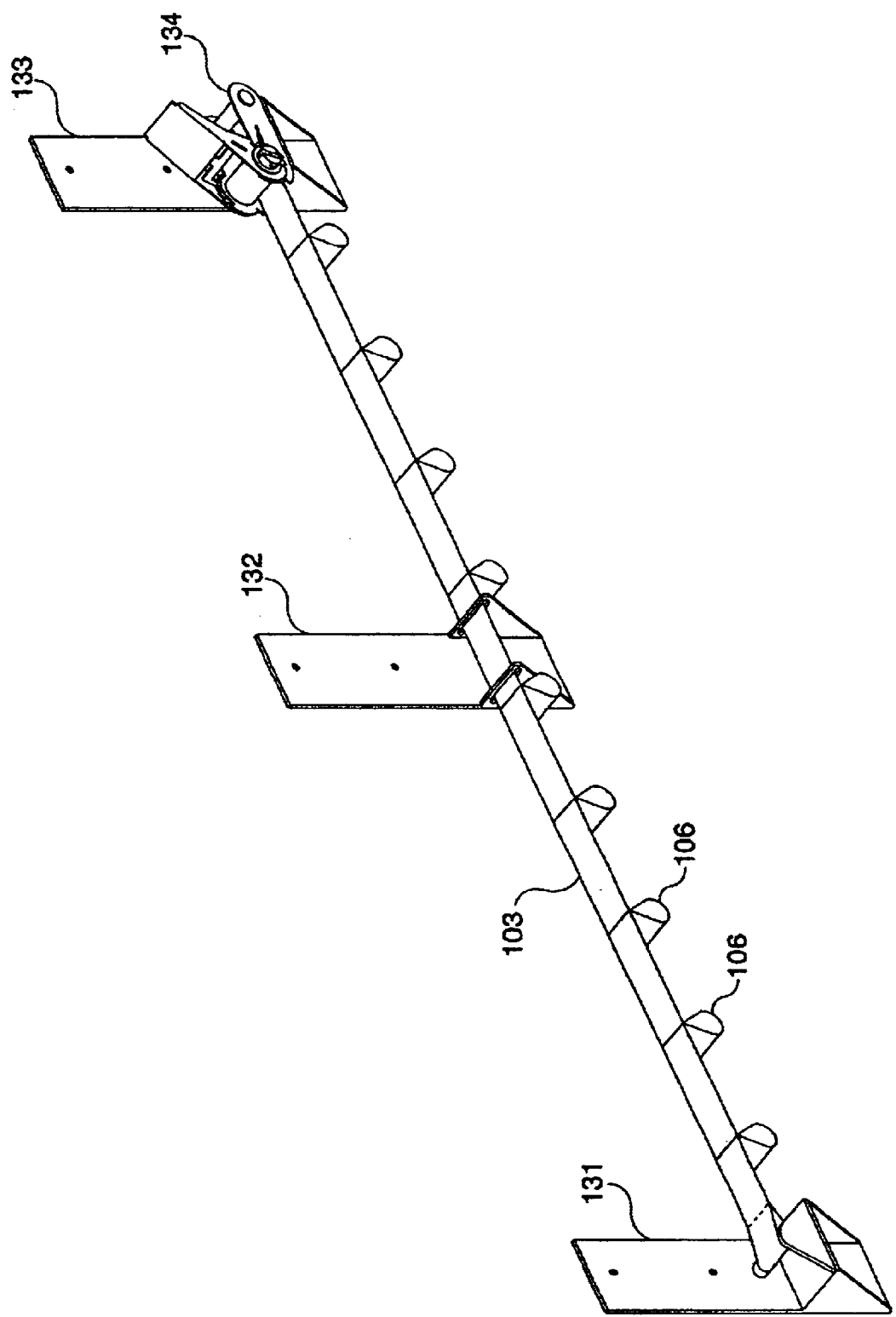
FIG. 103 is a perspective view of another embodiment of the "soft" version of the SURETETHER™ invention of the present invention, illustrating a wall- or roof-mounted embodiment.

FIG. 103 is a perspective view of another embodiment of the "soft" version of the SURETETHER™ invention of the present invention, illustrating a wall- or roof-mounted embodiment. In this embodiment, strap 103 is attached to a roof or wall surface using plate 131, 132, and 133, the latter of which is attached to ratchet 134.

While the preferred embodiment and various alternative embodiments of the invention have been disclosed and described in detail herein, it may be apparent to those skilled in the art that various changes in form and detail may be made therein without departing from the spirit and scope thereof.

It should also be noted that the present inventor has built and tested most, if not all, of the embodiments set forth in the present application, and as a master roofer, has tested all of the apparatus successfully. To the best knowledge of the inventor, no such products are commonly or commercially available to roofers at the time of filing.

Note that the apparatus of FIG. 21 may also be suitably modified for jobs other than roofing. As marketed under the name PAINTMATE™, a trademark of the inventor, the apparatus of FIG. 21 may be suitable sized to hold paint cans (1 or 5 gallon) brushes, rollers, roller trays, and the like. Such an apparatus may be suitable for use both in the commercial (e.g., contractor) market as well as the retail (e.g., homeowner) market.

Also the apparatus of FIGS. 12–26 may be enabled as a double roof peak embodiment. Two of the apparatus of FIGS. 12–26 may be joined together (e.g., by a pin or fastener) to span a roof peak and hold additional materials. In the alternative, a specialized roof peak spanning unit may be manufactured. However, it may reduce inventory and parts count (as well as cost) to provide for two separate units to be joined as one single unit.

The roof peak embodiment may provide additional load carrying capacity as well as area, as the unit, spanning the peak, does not rely upon nails or screws placed in shear to prevent the apparatus from sliding off the roof. Rather, since the apparatus spans the roof peak, the loads are carried directly downward on to the roof structure. As a result, a larger load of materials (e.g., squares or pallets of shingles or the like) may be supported.

We claim:

1. An apparatus for supporting loads of materials or supplies on an inclined roof, comprising:

a pair of rails adapted to be spaced apart substantially by a predetermined standard spacing of roof joists;

a plurality of rods, connected to the rails through corresponding holes and slots;

an adjustable platform, connected to and supported by the plurality of rods; and a disengagable attachment means, formed at one end of the pair of rails such that two of the apparatus may be attached to one another spanning a roof peak, wherein the pair of rails are adapted to be placed on a roof surface and secured with fasteners to roof joists beneath the roof surface, wherein one of said plurality of rods is placed through a corresponding one of said slots adapted to achieve an angle of adjustment corresponding substantially to roof incline such that the adjustable platform is substantially horizontal.

* * * * *